United States Patent
Ohashi et al.

(10) Patent No.: US 6,829,102 B2
(45) Date of Patent: Dec. 7, 2004

(54) ZOOM LENS, AND CAMERA AND PORTABLE INFORMATION TERMINAL FOR UTILIZING ZOOM LENS

(75) Inventors: Kazuyasu Ohashi, Tokyo (JP); Makoto Hirakawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/391,299

(22) Filed: Mar. 19, 2003

(65) Prior Publication Data

US 2004/0004772 A1 Jan. 8, 2004

(30) Foreign Application Priority Data

| Mar. 20, 2002 | (JP) | .................. 2002-078813 |
| Mar. 27, 2002 | (JP) | .................. 2002-088559 |
| Aug. 8, 2002 | (JP) | .................. 2002-231319 |
| Mar. 4, 2003 | (JP) | .................. 2003-056936 |

(51) Int. Cl.$^7$ ............................................. G02B 15/14
(52) U.S. Cl. .................. 359/689; 359/666; 359/667
(58) Field of Search ................... 359/677, 689, 359/666, 667

(56) References Cited

U.S. PATENT DOCUMENTS

| 5,153,779 | A | | 10/1992 | Ohashi |
| 5,398,135 | A | | 3/1995 | Ohashi |
| 5,576,891 | A | | 11/1996 | Ohashi |
| 5,581,319 | A | | 12/1996 | Ohashi |
| 5,617,254 | A | | 4/1997 | Ohashi |
| 5,630,188 | A | | 5/1997 | Ohashi |
| 5,687,401 | A | | 11/1997 | Kawamura et al. |
| 5,930,056 | A | | 7/1999 | Ohashi |
| 5,969,878 | A | * | 10/1999 | Koizumi .................. 359/682 |
| 6,122,111 | A | * | 9/2000 | Neil et al. .................. 359/689 |
| 6,304,389 | B1 | * | 10/2001 | Shibayama .................. 359/689 |
| 6,308,011 | B1 | * | 10/2001 | Wachi et al. .................. 396/72 |
| 6,353,506 | B1 | | 3/2002 | Ohashi |
| 6,452,729 | B2 | * | 9/2002 | Yamamoto .................. 359/676 |
| 6,515,804 | B2 | * | 2/2003 | Watanabe et al. .................. 359/689 |
| 6,525,885 | B2 | | 2/2003 | Ohashi |
| 6,532,114 | B1 | * | 3/2003 | Kohno et al. .................. 359/689 |
| 6,545,819 | B1 | * | 4/2003 | Nanba et al. .................. 359/689 |
| 6,597,513 | B2 | * | 7/2003 | Minefuji .................. 359/689 |
| 6,614,599 | B1 | * | 9/2003 | Watanabe .................. 359/689 |
| 2002/0060855 | A1 | | 5/2002 | Ohashi |
| 2002/0101665 | A1 | | 8/2002 | Ohashi et al. |
| 2003/0072085 | A1 | * | 4/2003 | Mizuguchi et al. .................. 359/680 |
| 2003/0072088 | A1 | * | 4/2003 | Obama .................. 359/689 |
| 2003/0210473 | A1 | * | 11/2003 | Ohashi .................. 359/694 |

FOREIGN PATENT DOCUMENTS

| JP | 10-039214 | 2/1998 |
| JP | 11-287953 | 10/1999 |
| JP | 2001-0337 01 | 2/2001 |

* cited by examiner

*Primary Examiner*—Scott J. Sugarman
*Assistant Examiner*—Darryl J. Collins
(74) *Attorney, Agent, or Firm*—Oblon, Spivak, McClelland, Maier & Neustadt, P.C.

(57) ABSTRACT

A zoom lens comprising a first group of lenses (1) having negative focal length, a second group of lenses (2) having positive focal length, and a third group of lenses (3 having the positive focal length in order from an object side, in which the second group of lenses (2) moves monotonically from an image side to the object side and the first group of lenses 1 moves so as to correct shift in a position of an image surface, which is attended with a change in magnification, when the magnification is changed from an end of short focus to the end of long focus. The zoom lens is characterized in that the first group of lenses 1 has at least two lenses (L1) and (L2) and an air lens formed between the two lenses, both sides of the air lens are the aspheric surface, and the first group of lenses satisfies the following conditional expressions of no>1.50 and ni>1.60, where no indicates a refractive index to d line of the lens arranged on the object side in the air lens and ni indicates the refractive index to the d line of the lens arranged on the image side in the air lens.

78 Claims, 45 Drawing Sheets

ZOOM LENS, AND CAMERA AND PORTABLE INFORMATION TERMINAL FOR UTILIZING ZOOM LENS

BACKGROUND OF THE INVENTION

1. Field of the Invention

The present invention relates to a zoom lens which can be used in a digital camera, a video camera, a silver film camera, and the like and a camera and a portable information terminal which use the zoom lens.

2. Description of the Prior Art

In recent years, a digital camera is rapidly spread, and there are wide-ranging needs of users for the digital camera. In particular the user always desires high image quality and miniaturization, and high performance and the miniaturization are also desired for the zoom lens used as a taking lens.

Though there are many ideas to use various kinds of zoom lenses for the digital camera, a type suitable for the miniaturization has a construction, in which a first group of lenses having negative focal length, a second group of lenses having positive focal length, and a third group of lenses having the positive focal length are provided in order from an object side, an iris moving integrally with the second group of lenses toward the object side of the second group of lenses is provided, and the second group of lenses moves monotonically from an image side to the object side and the first group of lenses moves so as to correct shift in the position of the image surface, which is attended with the change in the magnification, when the magnification is changed from an end of short focus to the end of long focus. Such construction is described in Japanese Patent Laid-Open No. 039214/1998, Japanese Patent Laid-Open No. 287953/1999, and Japanese Patent Laid-Open No. 2001-033701.

The construction described in Japanese Patent Laid-Open No. 039214/1998 is one of the earliest applications of the above-described type, the basic construction has been completely disclosed, however, it is not sufficient from the viewpoint of the miniaturization and there is scope of improvement.

The construction, in which the construction of Japanese Patent Laid-Open No. 039214/1998 is improved and simplification is advanced, is one described in Japanese Patent Laid-Open No. 287953/1999 or the like. However, since embodiments described in Japanese Patent Laid-Open No. 287953/1999 have only one surface of aspheric surface in the first group of lenses, it is not said that a contrivance for further miniaturization is sufficiently performed.

On the other hand, in the embodiments described in Japanese Patent Laid-Open No. 2001-033701, though the surface of both sides of an air lens formed in the first group is formed to be the aspheric surface, since plastic having a low refractive index is used as a lens material, sufficient correction of aberrations is not performed.

In the construction described in Japanese Patent Laid-Open No. 039214/1998, a taking angle of view of a wide-angle end is about 72° and it is not said that the angle of view is sufficiently wide.

SUMMARY OF THE INVENTION

It is a first object of the invention to provide a zoom lens which can be further miniaturized.

It is a second object of the invention to provide a high-performance zoom lens which can realize resolution adaptable to an image sensor having three million pixels to five million pixels while the zoom lens is a compact size and the wide angle of view.

It is a third object of the invention to provide a compact and high image quality camera and portable information terminal in which the zoom lens which can be further miniaturized is used as a taking optical system.

A feature of the invention is a zoom lens, which includes a first group of lenses having negative focal length, a second group of lenses having positive focal length, and a third group of lenses having the positive focal length in order from the object side, and in which the second group of lenses moves monotonically from an image side to the object side and the first group of lenses moves so as to correct shift in a position of an image surface, which is attended with a change in magnification, when the magnification is changed from an end of short focus to the end of long focus, the zoom lens is characterized in that the first group of lenses has at least two lenses and an air lens formed between the two lenses, both sides of the air lens are the aspheric surface, and the first group of lenses satisfies the following conditional expressions:

$$no > 1.50$$

and $$ni > 1.60,$$

where no indicates a refractive index to d line of the lens arranged on the object side in the air lens and ni indicates the refractive index to the d line of the lens arranged on the image side in the air lens.

Another feature of the invention is a zoom lens, which includes a first group of lenses having negative focal length, a second group of lenses having positive focal length, and a third group of lenses having the positive focal length in order from the object side, and in which the second group of lenses moves monotonically from an image side to the object side and the first group of lenses moves so as to correct shift in a position of an image surface, which is attended with a change in magnification, when the magnification is changed from an end of short focus to the end of long focus, the zoom lens is characterized in that the second group of lenses includes a positive lens, a negative meniscus lens whose convex surface faces the object side, a positive meniscus lens whose convex surface faces the object side, and a positive lens in order from the object side.

Still another feature of the invention is a zoom lens, which includes a first group of lenses having negative focal length, a second group of lenses having positive focal length, a third group of lenses having the positive focal length in order from the object side, and an iris moving integrally with the second group of lenses toward the object side of the second group of lenses, and in which the second group of lenses moves monotonically from an image side to the object side and the first group of lenses moves so as to correct shift in a position of an image surface, which is attended with a change in magnification, when the magnification is changed from an end of short focus to the end of long focus, the zoom lens is characterized in that the second group of lenses has a three-element cemented lens including a negative lens, a positive lens, and the negative lens in order from the object side.

BRIEF DESCRIPTION OF THE DRAWINGS

FIG. 33 shows an example of a camera or a portable information terminal according to the invention.

DETAILED DESCRIPTION OF THE EMBODIMENT

Figure 1:
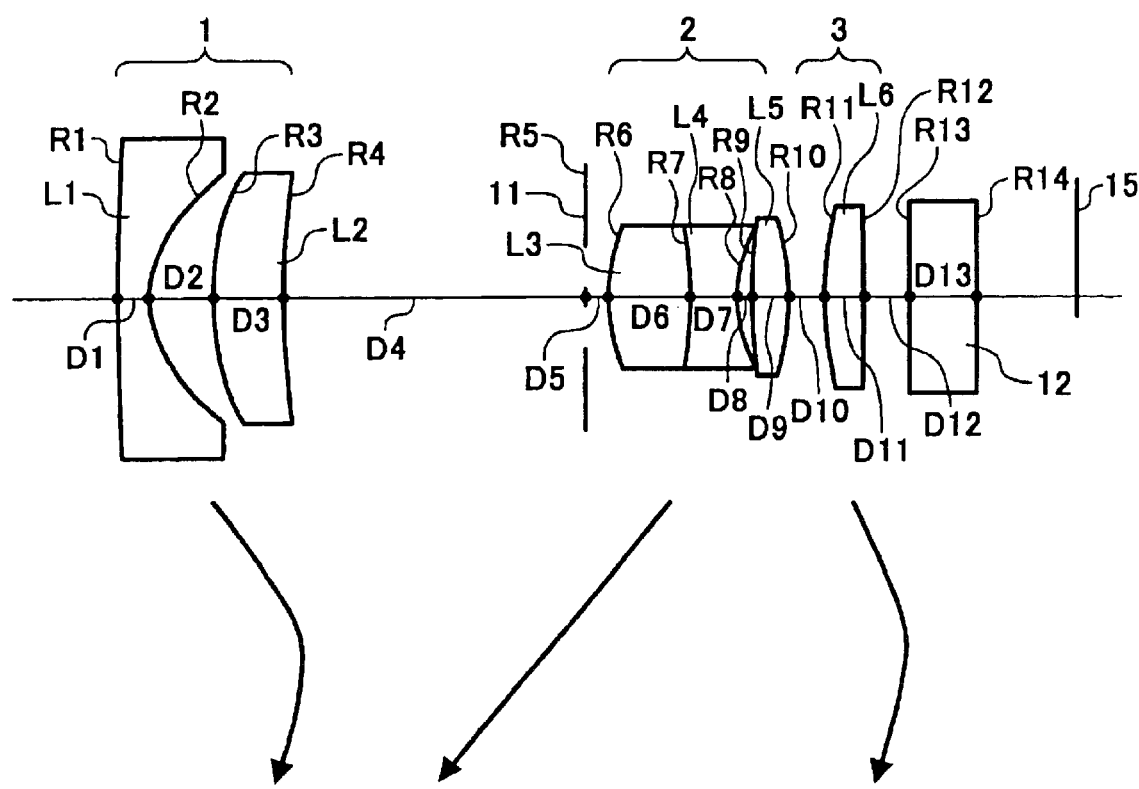
FIG. 1 is an optical arrangement drawing showing EMBODIMENT 1 of a zoom lens according to the invention.

Modes of the zoom lens and the camera and the portable information terminal, which use the zoom lens, according to the invention and embodiments indicated by concrete numerical values will be described below.

(First Mode)

The zoom lens according to the invention includes the first group of lenses having the negative focal length, the second group of lenses having the positive focal length, and the third group of lenses having the positive focal length in order from the object side. In the case of the change in the magnification from the end of the short focus to the end of the long focus, the second group of lenses is formed to move monotonically from the image side to the object side and the first group of lenses is formed to move so as to correct the shift in the position of the image surface, which is attended with the change in the magnification.

In the zoom lens including the above-described three groups of lenses having the negative, positive, and positive focal lengths, when the magnification is changed from the end of the short focus to the end of the long focus, the second group of lenses moves monotonically from the image side to the object side and the first group of lenses moves so as to correct shift in a position of the image surface, which is attended with the change in the magnification. The second group of lenses bears almost part of the function of changing the magnification and the third group of lenses is mainly provided in order to distance an exit pupil from the image surface.

In order to achieve the miniaturization in the zoom lens having the above-described structure, it is necessary to strengthen power of each group of lenses, particularly the second group of lenses which is the group of variable magnification. However, in the case that the power of the second group of lenses is strengthened, it is difficult to correct the aberration of the second group of lenses. Accordingly, the correction of the aberration must be performed better in a virtual image formed by the first group of lenses. In order to decrease a diameter of the first group of lenses, negative refracting power which is arranged on the object side and positive refracting power which is arranged on the image side may be strengthened, however, in the case that the refracting power is excessively strengthened, the correction of the aberration becomes difficult, and the degradation of image performance occurs.

Therefore, in the invention, the first group of lenses includes at least two lenses and an air lens formed between the two lenses, both surfaces of the air lens is formed to be an aspheric surface. Large degree of freedom is given to the two surfaces in which heights of off-axis light flux are not so different in such a manner that the adjacent two surfaces are formed to be the aspheric surface in the first group of lenses, so that off-axis performance can be largely improved. Also, by providing the two aspheric surfaces in the different lenses, relative eccentricity can be adjusted in assembling the lenses to a lens tube and the like, so that there is a merit that influence of the eccentricity which each single aspheric lens has can be canceled.

Further, the following conditional expressions are satisfied in the invention:

$$no > 1.50$$

$$ni > 1.60$$

where no indicates a refractive index to the d line of the lens arranged on the object side of the air lens, and ni indicates a refractive index to the d line of the lens arranged on the image side of the air lens.

In the case that no is not more than 1.50 and ni is not more than 1.60, correcting capability of the aberration can not sufficiently given to the first group of lenses and a balance of each aberration, particularly astigmatism, distortion, and chromatic difference of magnification can not be achieved. It is more desirable to satisfy the following conditional expressions:

$$no > 1.60$$

and $$ni > 1.70.$$

In order to correct better each aberration, it is desirable in the zoom lens according to the invention that the first group of lenses has the at least one negative lens whose surface of the larger curvature faces the image side and the at least one positive lens whose surface of the larger curvature faces the object side in order from the object side and the both surfaces of the air lens formed between the negative lens and the positive lens are the aspheric surface. Each aberration can be effectively corrected in such a manner that the two surfaces in which the curvature is large and a refraction angle of the light beam tends to be enlarged are formed to be aspheric. In the above-described structure, the refraction angle of the light beam is relatively small in the surfaces except the aspheric surface and the generated amount of aberration is small, so that necessity to consider the surfaces except the aspheric surface is lessened in the adjustment of the eccentricity and there is the merit that the adjustment can be easily performed.

More concretely, the first group of lenses includes the negative lens whose surface of the larger curvature faces the image side and the positive meniscus lens whose convex surface faces the object side in order from the object side, and the both surfaces of the air lens formed between the two lenses can be also formed to be the aspheric surface. Also, the first group of lenses includes the negative meniscus lens whose convex surface faces the object side, the negative meniscus lens whose convex surface faces the object side, and the positive lens whose surface of the larger curvature faces the object side in order from the object side, and the both surfaces of the air lens formed between the two lenses on the image side can be formed to be the aspheric surface. According to the former structure, it is advantageous for the miniaturization because of the simpler structure, and according to the latter structure, it is advantageous for widening an angle of view because the correcting capability of the aberration is increased.

In the case that the first group of lenses includes the negative meniscus lens whose convex surface faces the object side, the negative meniscus lens whose convex surface faces the object side, and the positive lens whose surface of the larger curvature faces the object side in order from the object side and the both surfaces of the air lens formed between the two lenses on the image side is formed to be the aspheric surface, it is desirable to satisfy the following conditional expression:

$$-20<(Ro+Ri)/(Ro-Ri)<-3,$$

where Ro indicates a curvature radius of the surface of the object side of the air lens and Ri indicates the curvature radius of the surface of the image side of the air lens. When (Ro+Ri)/(Ro−Ri) is not more than −20, the power of the air lens becomes too small and the distortion is increased at the end of the wide angle. On the other hand, when (Ro+Ri)/(Ro−Ri) is not lower than −3, the power of the air lens becomes too large, though it is advantageous for the correction of the distortion at the end of the wide angle, the astigmatism and the comatic aberration are largely generated, and the off-axis performance is degraded. It is further desirable to satisfy the following conditional expression:

$$-10<(Ro+Ri)/(Ro-Ri)<-5.$$

In order that the zoom lens according to the invention is formed to be further simple and the higher performance, it is desirable that an iris moving integrally with the second group of lenses is provided on the object side of the second group of lenses and at least the surface closest to the object side of the second group of lenses is formed to be the aspheric surface. The surface closest to the object side of the second group of lenses is located in the vicinity of the iris, marginal light beam has the sufficient height, and the change in the height of the light beam, which is caused by the zooming, is small, so that the spherical aberration which is the basics of the imaging performance can be favorably corrected by providing the aspheric surface in the vicinity of the iris.

As described above, in the zoom lens including the above-described three groups of lenses having the negative, positive, and positive focal lengths, when the magnification is changed from the end of the short focus to the end of the long focus, the second group of lenses is formed to move monotonically from the image side to the object side and the first group of lenses is formed to move so as to correct shift in a position of the image surface, which is attended with the change in the magnification. The second group of lenses bears the almost part of the function of changing the magnification and the third group of lenses is mainly provided in order to distance the exit pupil from the image surface. In order to achieve the miniaturization in the zoom lens having the above-described structure, it is necessary to strengthen power of each group of lenses, particularly the second group of lenses which is the group of variable magnification. Therefore, the good correction of the aberration must be performed in the second group of lenses.

In the invention, the second group of lenses includes, in order from the object side, the positive lens, the negative lens whose convex surface faces the object side, the positive meniscus lens whose convex surface faces the object side, and the positive lens. Though this structure is based on the structure of a so-called triplet type in which the positive lenses are arranged between the both sides of the negative lens, the degree of freedom of the correction for the off-axis aberration is increased by dividing the positive lens on the image side into two pieces. Accordingly, even if the imaging angle of view is widened, the comatic aberration, the astigmatism, and the like can be effectively corrected.

In order to obtain the higher performance of zoom lens, it is desirable to satisfy the following conditional expressions:

$$1.0<(Rn+Rp)/2Ymax<1.5$$

and $$-0.05<(Rn-Rp)/(Rn+Rp)<0,$$

where Rn indicates the curvature radius of the image side surface of the negative meniscus lens in the second group, Rp indicates the curvature radius of the object side surface of the positive meniscus lens, and Ymax indicates the maximum image height respectively.

When (Rn+Rp)/2Ymax is not more than 1.0, the power of the two surfaces becomes too strong and it is difficult to keep the balance of the aberration, when (Rn+Rp/2Ymax is not lower than 1.5, the power of the two surfaces becomes too small and it is difficult to obtain sufficiently the correcting capability of the aberration, and it is difficult to perform the good correction of the aberration in both cases. When (Rn−Rp)/(Rn+Rp) is in the range of the conditional expression, the spherical aberration can be corrected best. It is further desirable to satisfy the following conditional expression:

$$1.1<(Rn+Rp)/2Ymax<1.3.$$

In the zoom lens according to the invention, the negative meniscus lens and the positive meniscus lens of its image side surface of the second group may be cemented in order to reduce the degradation of the performance, which caused by assembly error of the lenses. In the image side surface of the negative meniscus lens and the object side surface of the positive meniscus lens, since the aberrations of directions in which the aberrations cancel each other out arc largely generated, the degradation of the image performance, which is caused by the relative eccentricity of these two lenses, is large. However, the degradation of the image performance can be prevented by bonding both the meniscus lenses.

In the case that both the meniscus lenses are cemented, it is desirable to satisfy the following conditional expression in order to obtain the higher performance zoom lens:

$$0.8<Rc/Ymax<1.2,$$

where Rc indicates the curvature radius of the bonding surface, and Ymax indicates the maximum image height. When Rc/Ymax is not more than 0.8, the power of the bonding surfaces becomes too strong and it is difficult to keep the balance of the aberration, when Rc/Ymax is not lower than 1.2, the power of the bonding surfaces becomes too small and it is difficult to obtain sufficiently the correcting capability of the aberration, and it is difficult to perform the good correction of the aberration in both cases. It is further desirable to satisfy the following conditional expression:

$$0.9<Rc/Ymax<1.1.$$

In order that the zoom lens according to the invention is formed to be simpler and the higher performance, it is desirable that an iris moving integrally with the second group of lenses is provided on the object side of the second group of lenses and at least the surface closest to the object side of the second group of lenses is formed to be the aspheric surface. The surface closest to the object side of the second group of lenses is located in the vicinity of the iris, marginal light beam has the sufficient height, and the change in the height of the light beam, which is caused by the zooming, is small, so that the spherical aberration which is the basics of the imaging performance can be favorably corrected by providing the aspheric surface in the vicinity of the iris. In the lens in the second group on the most object side, not only the object side surface but also the image side surface may be more desirably formed to be the aspheric surface.

Concrete embodiments of the zoom lens according to the invention will be shown below by the numerical values. The aberration of the zoom lens according to the embodiment is sufficiently corrected, and it is adaptable to a photo detector having two million pixels to four million pixels in the case of the application to the digital camera. It is clear from the embodiment that, while the sufficient miniaturization is achieved, the very good image performance can be secured in such a manner that the zoom lens is formed like the invention.

The meanings of each sign in the embodiment are as follows:

f: focal length of entire system
F: F number
ω: half angle of view
R: curvature radius
D: distance between surfaces
Nd: refractive index to d line
vd: Abbe number
K: conic constant
A4: quartic aspheric coefficient
A6: sextic aspheric coefficient
A8: octic aspheric coefficient
A10: dectic aspheric coefficient However, when an inverse number of a paraxial curvature radius (paraxial curvature) is set to C and a height from an optical as is set to H, the aspheric surface used in the embodiment is defined by the following EQUATION 1.

Equation 1

$$X = \frac{CH^2}{1 + \sqrt{(1-(1+K)C^2H^2)}} + A_4 \cdot H^4 + A_6 \cdot H^6 + A_8 \cdot H^8 + A_{10} \cdot H^{10}$$

Embodiment 1

FIG. 1 shows the optical arrangement of the zoom lens according to EMBODIMENT 1. In FIG. 1, a first group of lenses 1 having the negative focal length, a second group of lenses 2 having the positive focal length, a third group of lenses 3 having the positive focal length, and various kinds of filters 12 are arranged in order from the object side (left side in FIG. 1), the zoom lens includes the first group of lenses 1, the second group of lenses 2, and the third group of lenses 3. In the case of the change in the magnification from the end of the short focus to the end of the long focus, the second group of lenses 2 is formed to move monotonically and linearly from the side of an image 15 to the object side, and the first group of lenses 1 and the third group of lenses 3 move so as to correct the shift in the position of the image surface, which is attended with the change in the magnification. The first group of lenses 1 has two lenses L1 and L2 and an air lens formed between the two lenses. Both sides of the air lens, i.e., the image side surface of the lens L1 and the object side surface of the lens L2 are formed to be the aspheric surface. The lens L1 constituting the above-described first group is formed by the negative meniscus lens in which the surface of the larger curvature faces the image side, and the lens L2 is formed by the positive meniscus lens in which the surface of the larger curvature faces the object side.

The second group of lenses 2 includes a biconvex lens L3, a biconcave lens L4 cemented to the lens L3, and a biconvex lens L5 in order from the object side. An iris 11 moving integrally with the second group of lenses 2 is arranged on a front side, i.e., the object side of the second group of lenses 2 with the proper distance.

The third group of lenses 3 includes a biconvex lens 6. In FIG. 1, R1, R2, . . . show a curved surface in order from the object side, and D1, D2, . . . show the distance between the curved surfaces in order from the object side. The same sings are also used in other embodiments.

Figure 5:
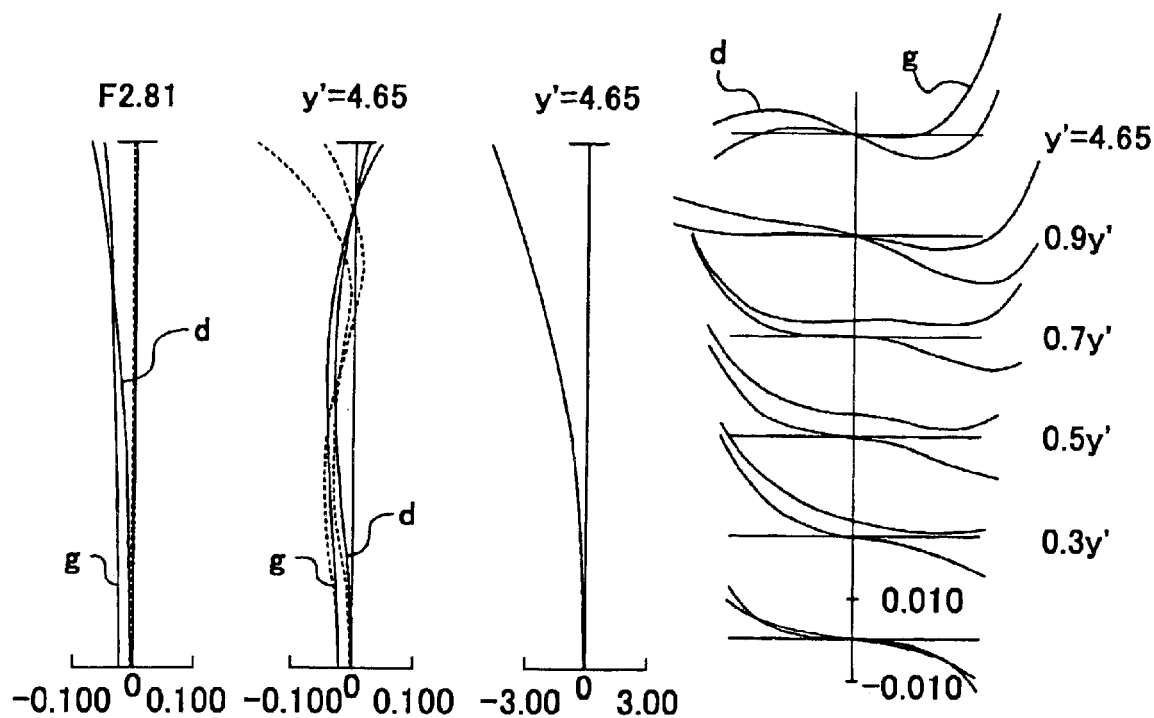
FIG. 5 is a view of an aberration curve at an end of a short focus of the zoom lens of EMBODIMENT 1.
Figure 6:
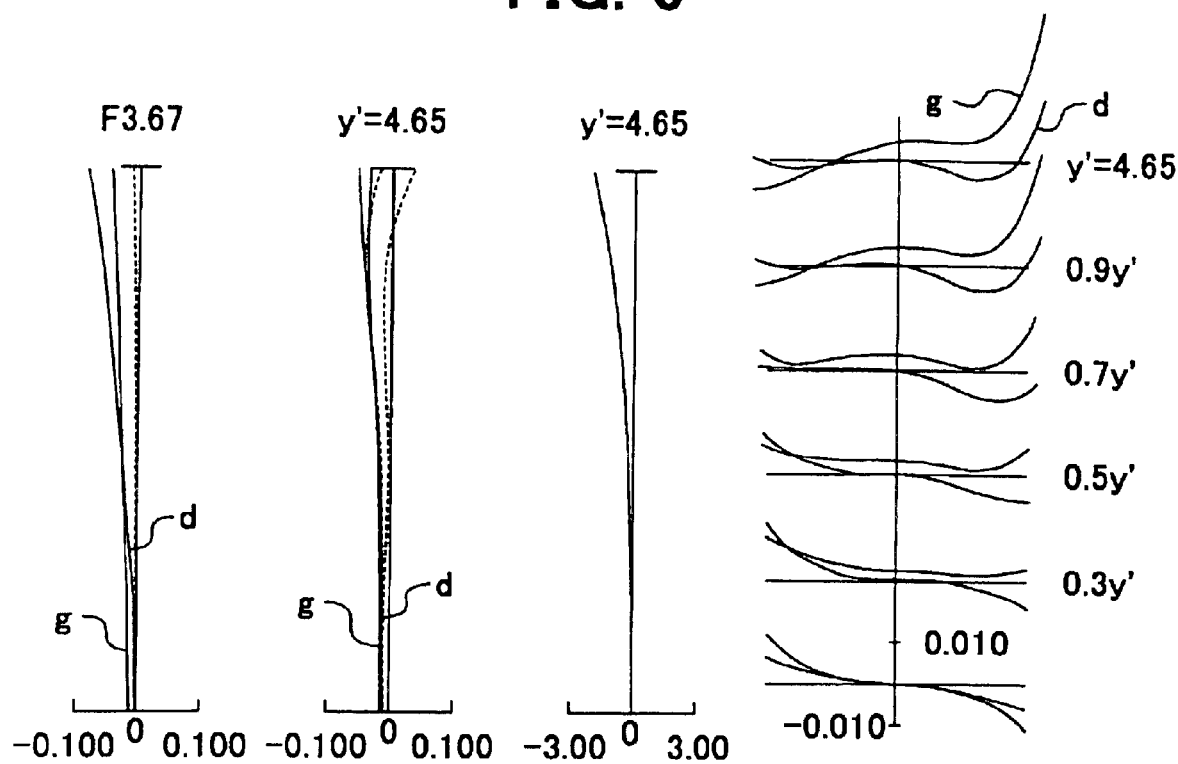
FIG. 6 is a view of the aberration curve at an intermediate focal length of the zoom lens of EMBODIMENT 1.
Figure 7:
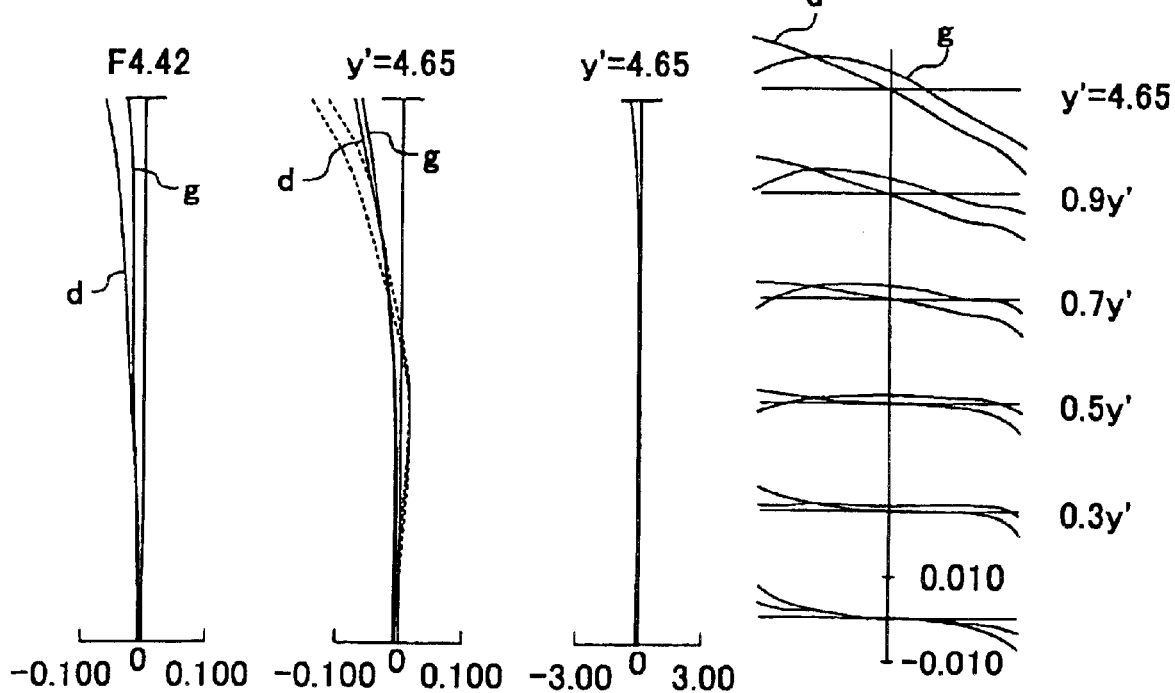
FIG. 7 is a view of the aberration curve at the end of a long focus of the zoom lens of EMBODIMENT 1.

The numerical values of EMBODIMENT 1 are shown below. FIG. 5 shows the aberration curve at the end of the short focus of the zoom lens according to EMBODIMENT 1, FIG. 6 shows the aberration curve at the intermediate focal distance, and FIG. 7 shows the aberration curve at the end of the long focus of the zoom lens.

| EMBODIMENT 1 | | | | | | |
|---|---|---|---|---|---|---|
| f = 5.80 – 14.16, F = 2.81 – 4.42, ω = 40.07 – 18.24 | | | | | | |
| SURFACE NUMBER | R | D | Nd | vd | REMARKS | |
| 01 | 89.052 | 1.54 | 1.77300 | 49.60 | FIRST LENS | |
| 02* | 5.488 | 2.96 | | | | |
| 03* | 13.481 | 8.33 | 1.84700 | 23.80 | SECOND LENS | FIRST GROUP |
| 04 | 46.348 | VARIABLE (A) | | | | |
| 05 | IRIS | 1.00 | | | | |
| 06* | 8.540 | 4.00 | 1.83369 | 43.11 | THIRD LENS | SECOND GROUP |
| 07 | –19.184 | 2.23 | 1.78376 | 25.65 | FOURTH LENS | |
| 08 | 7.311 | 0.72 | | | | |
| 09 | 24.627 | 1.76 | 1.62797 | 59.48 | FIFTH LENS | |

-continued

EMBODIMENT 1

| | | | | | | |
|---|---|---|---|---|---|---|
| 10 | −13.316 | VARIABLE (B) | | | | |
| 11* | 16.333 | 1.93 | 1.48700 | 70.40 | SIXTH LENS | THIRD GROUP |
| 12 | −142.046 | VARIABLE (C) | | | | |
| 13 | ∞ | 3.25 | 1.51680 | 64.20 | VARIOUS KINDS OF FILTERS | |
| 14 | ∞ | | | | | |

ASPHERIC SURFACE; SECOND SURFACE $K = 0.83389$, $A4 = -2.39153 \times 10^{-5}$, $A6 = 5.82936 \times 10^{-6}$, $A8 = -2.27984 \times 10^{-7}$, $A10 = 3.12350 \times 10^{9}$
ASPHERIC SURFACE; THIRD SURFACE $K = 0.14308$, $A4 = 6.13477 \times 10^{-6}$, $A6 = 7.36155 \times 10^{-7}$, $A8 = -4.44635 \times 10^{-8}$, $A10 = 8.38997 \times 10^{-10}$
ASPHERIC SURFACE; SIXTH SURFACE $K = 0.36782$, $A4 = -7.15076 \times 10^{-5}$, $A6 = -1.86198 \times 10^{-6}$, $A8 = 1.81040 \times 10^{-7}$, $A10 = -6.28811 \times 10^{-9}$
ASPHERIC SURFACE; ELEVENTH SURFACE $K = -0.41879$, $A4 = -9.75228 \times 10^{-5}$, $A6 = 4.51237 \times 10^{-6}$, $A8 = -1.51236 \times 10^{-7}$, $A10 = 2.37344 \times 10^{-8}$

| VARIABLE DISTANCE | | |
|---|---|---|
| END OF SHORT FOCUS f = 5.80 | INTERMEDIATE FOCAL DISTANCE f = 10.321 | END OF LONG FOCUS f = 14.159 |
| A 14.120 | 4.790 | 1.700 |
| B 1.563 | 9.120 | 15.520 |
| C 4.712 | 4.022 | 3.090 |

Figure 2:
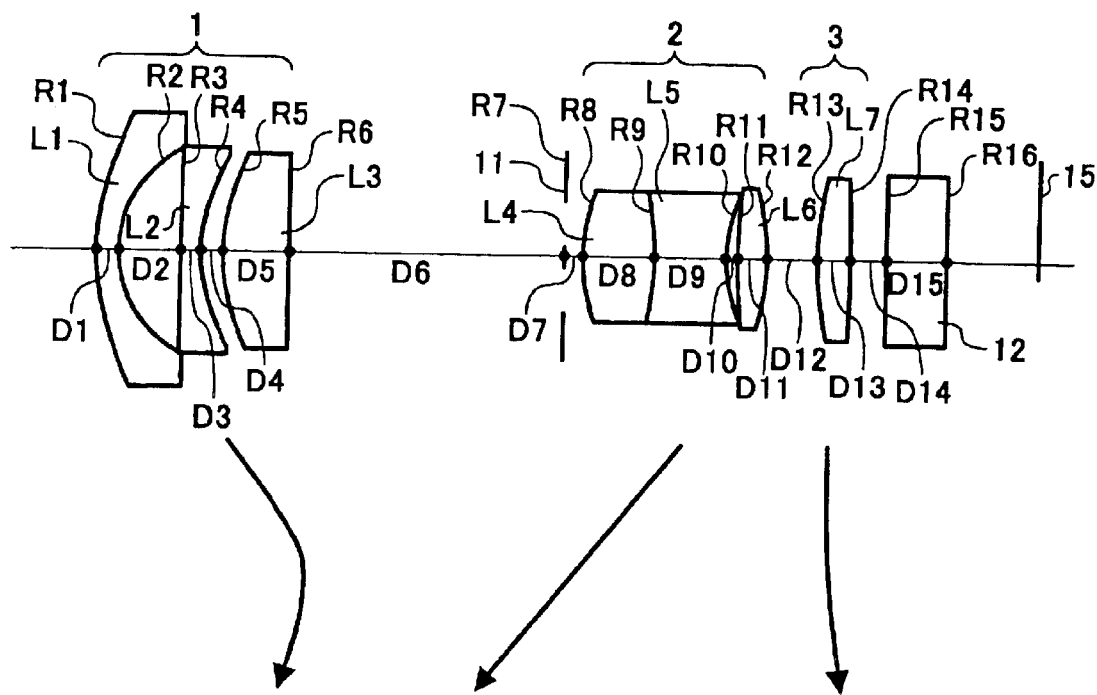
FIG. 2 is an optical arrangement drawing showing EMBODIMENT 2 of the zoom lens according to the invention.

EMBODIMENT 2 shown in FIG. 2 will be described below. EMBODIMENT 2 corresponds to the invention described in claim 4, and differs from EMBODIMENT 1 in that the first group of lenses 1 includes the negative meniscus lens L1 whose convex surface faces the object side, the negative meniscus lens L2 whose convex surface faces the object side, and positive lens L3 in which the surface of the larger curvature faces the object side. The second group of lenses 2 including the lens L4, the lens L5, and the lens L6 and the third group of lenses 3 including a lens L7 are the same optical arrangement as that of the second group of lenses and the third group of lenses in EMBODIMENT 1.

Figure 8:
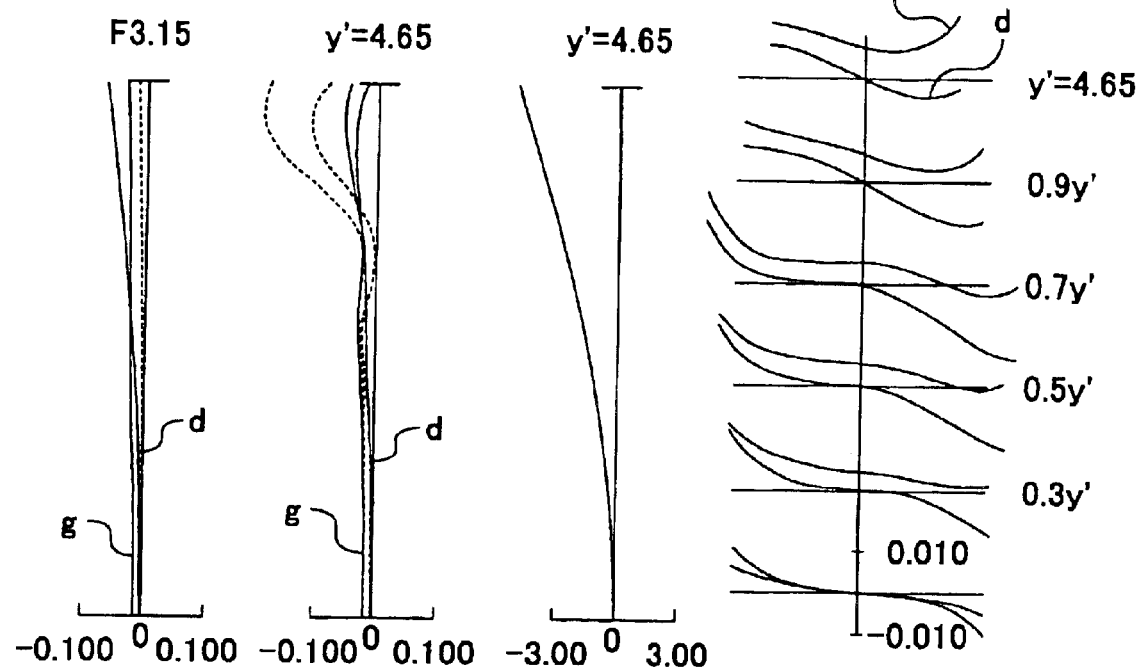
FIG. 8 is a view of an aberration curve at the end of the short focus of the zoom lens of EMBODIMENT 2.
Figure 9:
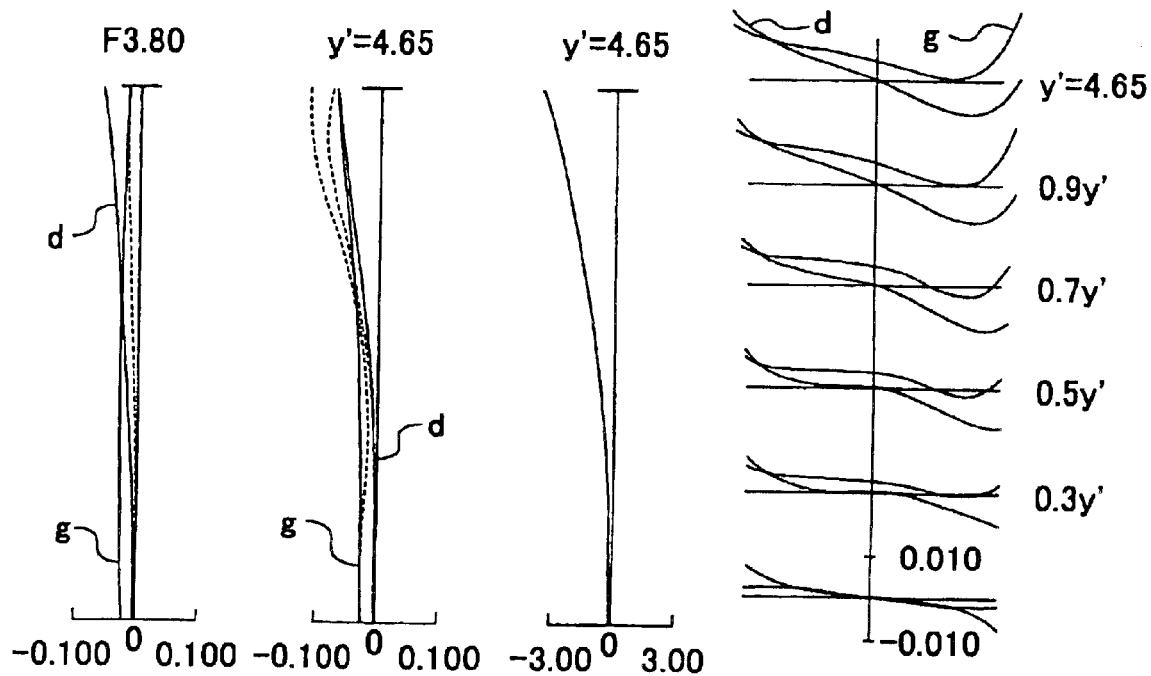
FIG. 9 is a view of the aberration curve at the intermediate focal length of the zoom lens of EMBODIMENT 2.
Figure 10:
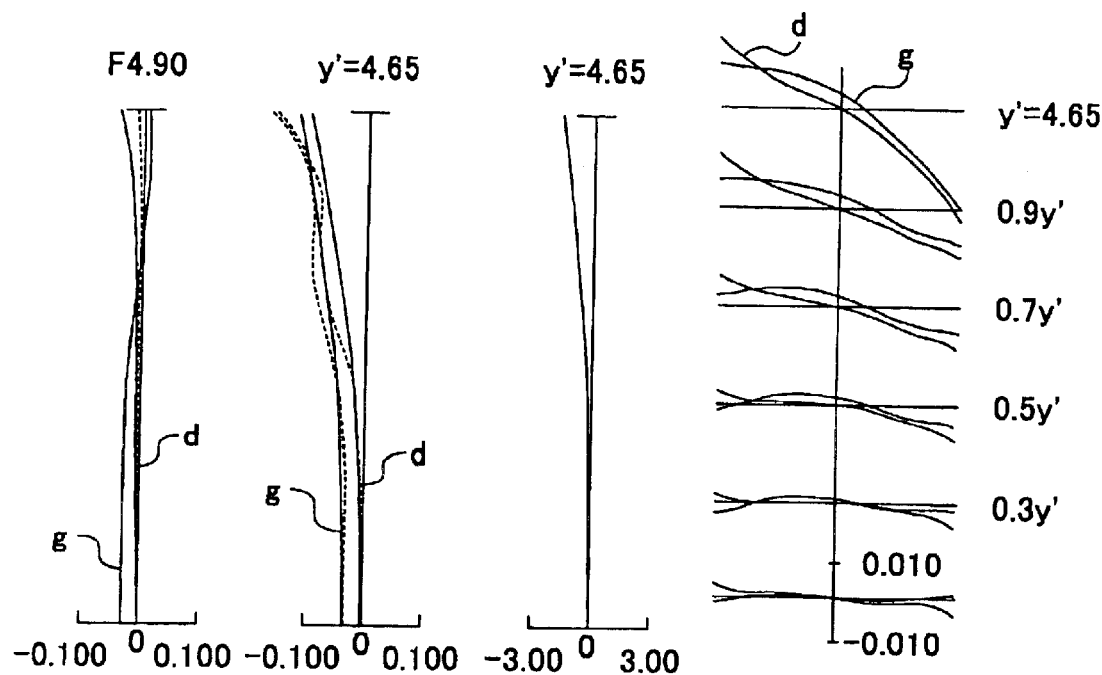
FIG. 10 is a view of the aberration curve at the end of the long focus of the zoom lens of EMBODIMENT 2.

The numerical values of EMBODIMENT 2 are shown below. FIG. 8 shows the aberration curve at the end of the short focus of the zoom lens according to EMBODIMENT 2, FIG. 9 shows the aberration curve at the intermediate focal distance, and FIG. 10 shows the aberration curve at the end of the long focus of the zoom lens.

EMBODIMENT 2

$f = 5.80 - 14.50$, $F = 3.15 - 4.90$, $\omega = 40.11 - 18.05$

| SURFACE NUMBER | R | D | Nd | vd | REMARKS | |
|---|---|---|---|---|---|---|
| 01 | 16.073 | 1.20 | 1.77300 | 49.60 | FIRST LENS | |
| 02 | 6.510 | 3.26 | | | | |
| 03 | 85.776 | 1.20 | 1.76215 | 50.11 | SECOND LENS | FIRST GROUP |
| 04* | 7.759 | 1.19 | | | | |
| 05* | 10.150 | 3.61 | 1.71468 | 28.53 | THIRD LENS | |
| 06 | −775.059 | VARIABLE (A) | | | | |
| 07 | IRIS | 1.00 | | | | |
| 08* | 9.800 | 4.00 | 1.88364 | 38.33 | FOURTH LENS | |

-continued

EMBODIMENT 2

| | | | | | | |
|---|---|---|---|---|---|---|
| 09 | −15.342 | 4.00 | 1.84700 | 23.80 | FIFTH LENS | SECOND GROUP |
| 10 | 8.775 | 0.55 | | | | |
| 11 | 29.125 | 1.61 | 1.75217 | 50.61 | SIXTH LENS | |
| 12 | −14.404 | VARIABLE (B) | | | | |
| 13* | 19.576 | 1.77 | 1.48700 | 70.40 | SEVENTH LENS | THIRD GROUP |
| 14 | −139.674 | VARIABLE (C) | | | | |
| 15 | ∞ | 3.25 | 1.51680 | 64.20 | VARIOUS KINDS OF FILTERS | |
| 16 | ∞ | | | | | |

ASPHERIC SURFACE; FOURTH SURFACE $K = -1.34743$, $A4 = -2.47950 \times 10^{-4}$, $A6 = -1.39275 \times 10^{-6}$, $A8 = -1.53180 \times 10^{-7}$, $A10 = 2.75855 \times 10^{-9}$

ASPHERIC SURFACE; FIFTH SURFACE $K = -0.61459$, $A4 = -1.46495 \times 10^{-4}$, $A6 = 1.18096 \times 10^{-6}$, $A8 = -1.63712 \times 10^{-7}$, $A10 = 3.75701 \times 10^{-9}$

ASPHERIC SURFACE; EIGHTH SURFACE $K = -0.31246$, $A4 = -6.6353 \times 10^{-5}$, $A6 = -2.44299 \times 10^{-6}$, $A8 = 2.63958 \times 10^{-7}$, $A10 = -1.04190 \times 10^{-8}$

ASPHERIC SURFACE; THIRTEEENTH SURFACE $K = 0.41267$, $A4 = -3.69517 \times 10^{-5}$, $A6 = 4.47121 \times 10^{-6}$, $A8 = -2.16080 \times 10^{-7}$, $A10 = 3.96634 \times 10^{-9}$

VARIABLE DISTANCE

| | END OF SHORT FOCUS f = 5.80 | INTERMEDIATE FOCAL DISTANCE f = 9.16 | END OF LONG FOCUS f = 14.50 |
|---|---|---|---|
| A | 15.164 | 6.403 | 1.500 |
| B | 2.790 | 7.837 | 17.561 |
| C | 4.905 | 4.859 | 3.062 |

NUMERICAL VALUES OF CONDITIONAL EXPRESSION $(R_o + R_i)/(R_o - R_i) = -7.490$

Figure 3:
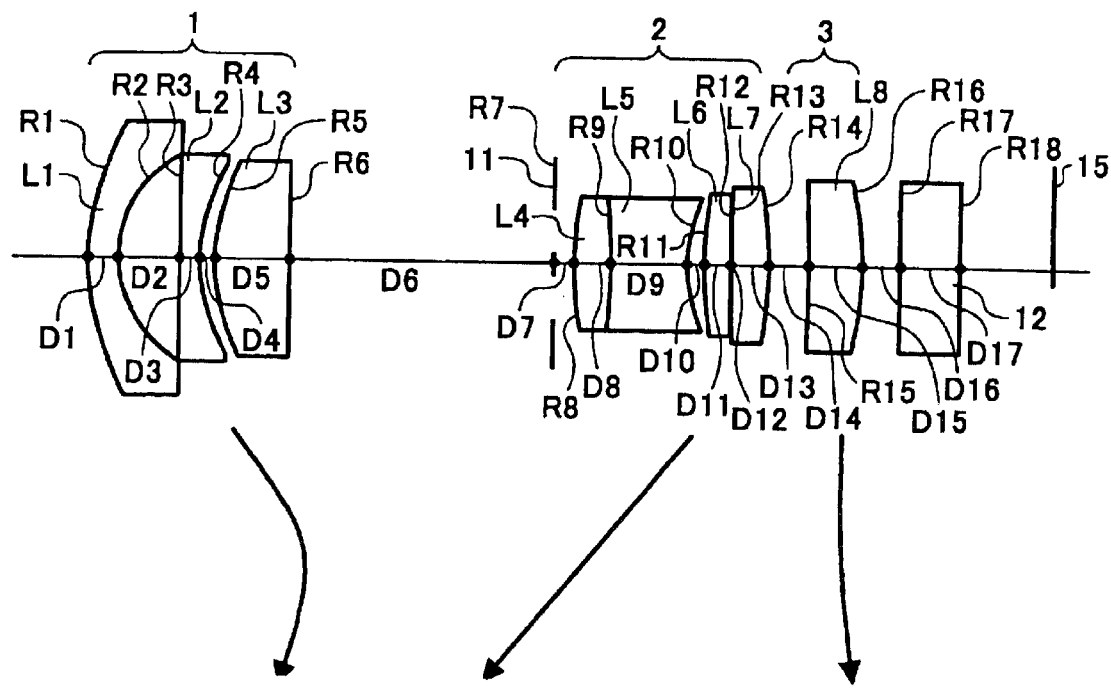
FIG. 3 is an optical arrangement drawing showing EMBODIMENT 3 of the zoom lens according to the invention.

EMBODIMENT 3 shown in FIG. 3 will be described below. EMBODIMENT 3 has the construction in which one convex lens is added to the second group of lenses 2 in EMBODIMENT 2, in other words, the construction in which one convex lens is divided into two pieces. Concretely, the first group of lenses 1 includes the negative meniscus lens L1, the negative lens L2, and the positive lens L3, the second group of lenses 2 includes the positive lens L4, the negative lens L5, the positive lens L6, and the positive lens L7, and the third group of lenses 3 includes a negative meniscus lens L8. An iris 11 moves integrally with the second group of lenses 2.

Figure 11:
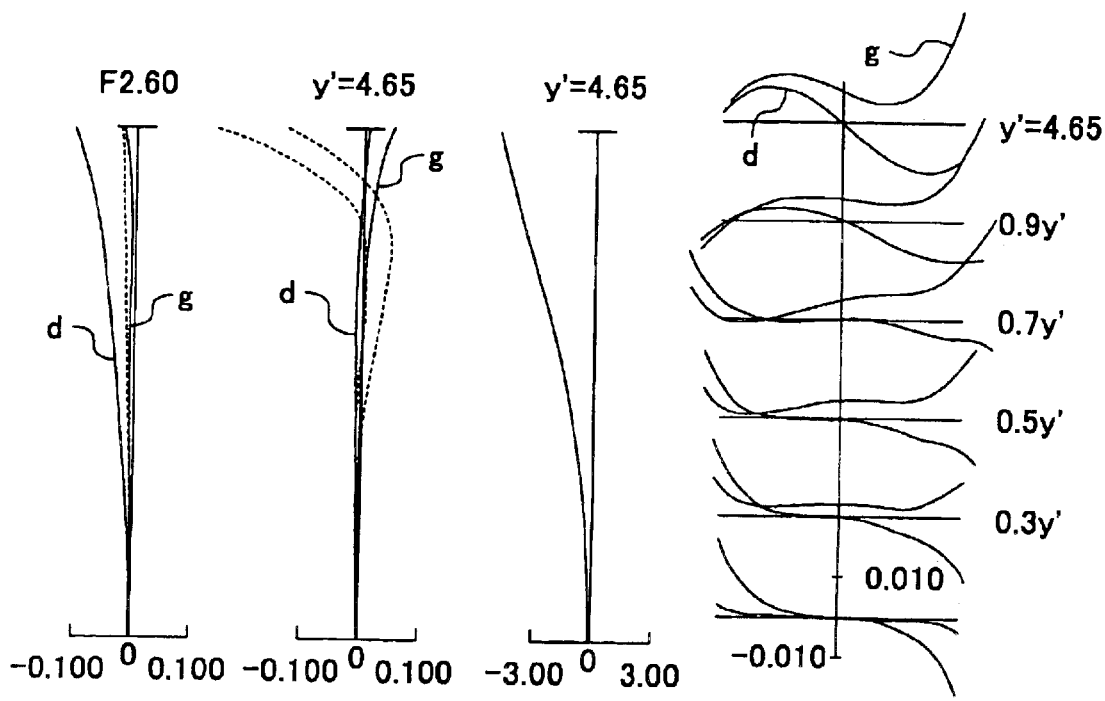
FIG. 11 is a view of an aberration curve at the end of the short focus of the zoom lens of EMBODIMENT 3.
Figure 12:
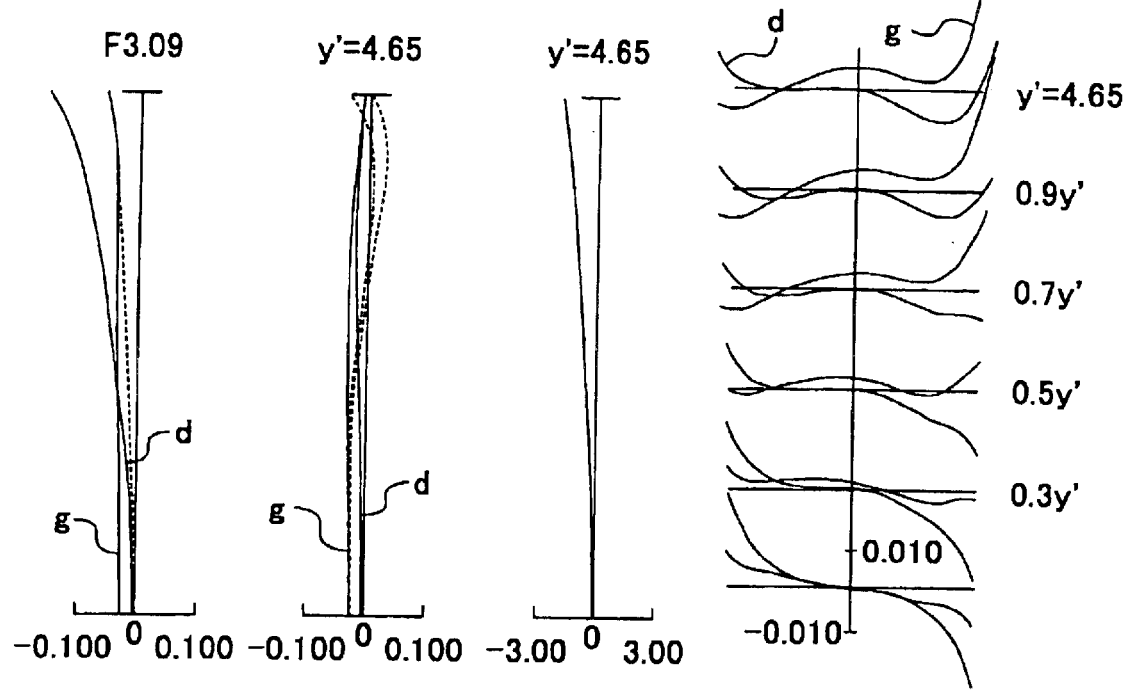
FIG. 12 is a view of the aberration curve at the intermediate focal length of the zoom lens of EMBODIMENT 3.
Figure 13:
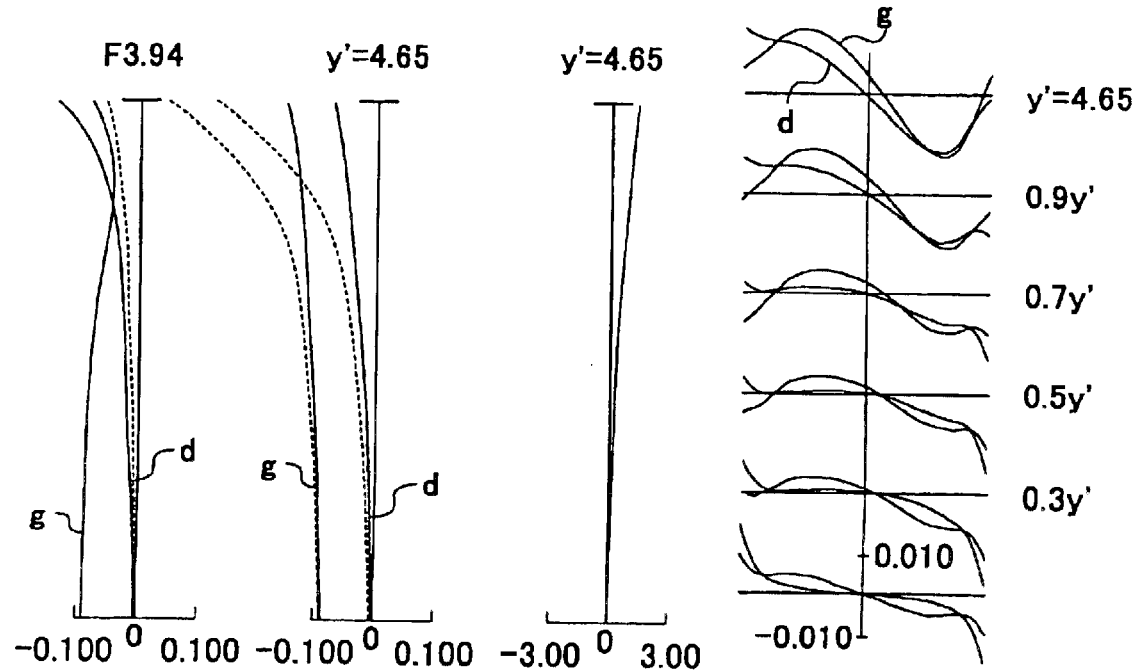
FIG. 13 is a view of the aberration curve at the end of the long focus of the zoom lens of EMBODIMENT 3.

The numerical values of EMBODIMENT 3 are shown below. FIG. 11 shows the aberration curve at the end of the short focus of the zoom lens according to EMBODIMENT 3, FIG. 12 shows the aberration curve at the intermediate focal distance, and FIG. 13 shows the aberration curve at the end of the long focus of the zoom lens.

EMBODIMENT 3 f = 5.97 − 14.48, F = 2.59 − 3.94, ω = 39.28 − 17.60

| SURFACE NUMBER | R | D | Nd | vd | REMARKS |
|---|---|---|---|---|---|
| 01 | 15.080 | 1.69 | 1.76453 | 50.00 | FIRST LENS |
| 02 | 6.497 | 3.33 | | | |

-continued

EMBODIMENT 3

| | | | | | | |
|---|---|---|---|---|---|---|
| 03 | −162.806 | 1.20 | 1.81392 | 41.83 | SECOND LENS | FIRST GROUP |
| 04* | 8.103 | 0.65 | | | | |
| 05* | 10.444 | 4.00 | 1.84700 | 23.80 | THIRD LENS | |
| 06 | ∞ | VARIABLE (A) | | | | |
| 07 | IRIS | 1.00 | | | | |
| 08* | 8.753 | 2.22 | 1.83622 | 38.75 | FOURTH LENS | |
| 09 | −15.321 | 3.98 | 1.80931 | 24.84 | FIFTH LENS | |
| 10 | 7.463 | 0.93 | | | | SECOND GROUP |
| 11 | 17.009 | 1.42 | 1.62156 | 6014 | SIXTH LENS | |
| 12 | −727.980 | 0.10 | | | | |
| 13 | 55.849 | 2.00 | 1.77167 | 49.66 | SEVENTH LENS | |
| 14 | −23.719 | VARIABLE (B) | | | | |
| 15* | −158.331 | 3.00 | 1.48700 | 70.40 | EIGHTH LENS | THIRD GROUP |
| 16 | −17.673 | VARIABLE (C) | | | | |
| 17 | ∞ | 3.25 | 1.151680 | 64.20 | VARIOUS KINDS OF FILTERS | |
| 18 | ∞ | | | | | |

ASPHERIC SURFACE; FOURTH SURFACE $K = -1.33292, A4 = -2.34334 \times 10^{-4}, A6 = -3.74018 \times 10^{-7}, A8 = -2.05904 \times 10^{-7}, A10 = 3.63798 \times 10^{-9}$

ASPHERIC SURFACE; FIFTH SURFACE $K = -0.50499, A4 = -1.34722 \times 10^{-4}, A6 = -1.18096 \times 10^{-7}, A8 = -1.35982 \times 10^{-7}, A10 = 2.86855 \times 10^{-9}$

ASPHERIC SURFACE; EIGHTH SURFACE $K = -0.46683, A4 = -2.94708 \times 10^{-5}, A6 = -1.09262 \times 10^{-6}, A8 = 9.90847 \times 10^{-8}, A10 = -1.99265 \times 10^{-9}$

ASPHERIC SURFACE; FIFTEENTH SURFACE $K = -427.29332, A4 = -1.90428 \times 10^{-4}, A6 = -3.37589 \times 10^{-6}, A8 = 2.14846 \times 10^{-7}, A10 = -3.87038 \times 10^{-9}$

VARIABLE DISTANCE

| | END OF SHORT FOCUS f = 5.97 | INTERMEDIATE FOCAL DISTANCE f = 9.17 | END OF LONG FOCUS f = 14.48 |
|---|---|---|---|
| A | 14.224 | 6.767 | 1.820 |
| B | 2.096 | 7.045 | 15.535 |
| C | 4.894 | 4.438 | 3.067 |

NUMERICAL VALUES OF CONDITIONAL EXPRESSION $(R_o + R_i)/(R_o - R_i) = -7.923$

Figure 4:
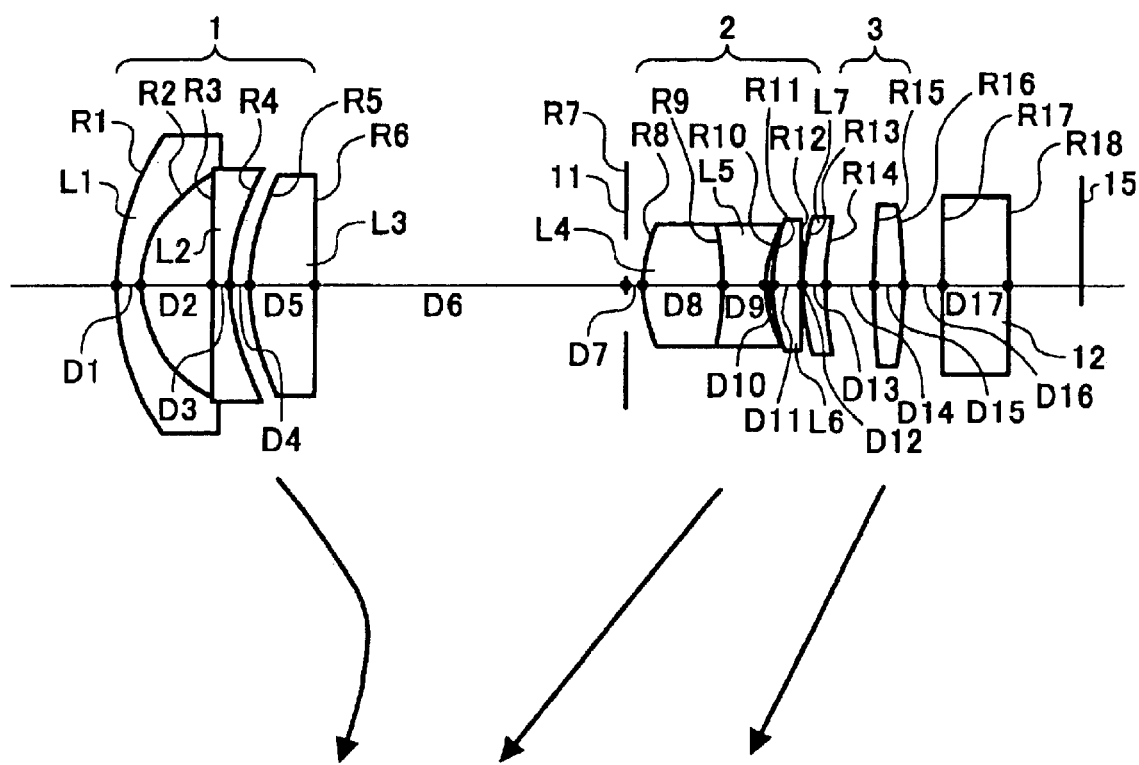
FIG. 4 is an optical arrangement drawing showing EMBODIMENT 4 of the zoom lens according to the invention.

EMBODIMENT 4 shown in FIG. 4 will be described below. EMBODIMENT 4 has the construction in which the constructions of the second group of lenses 2 and third group of lenses 3 in EMBODIMENT 3 are deformed.

Figure 14:
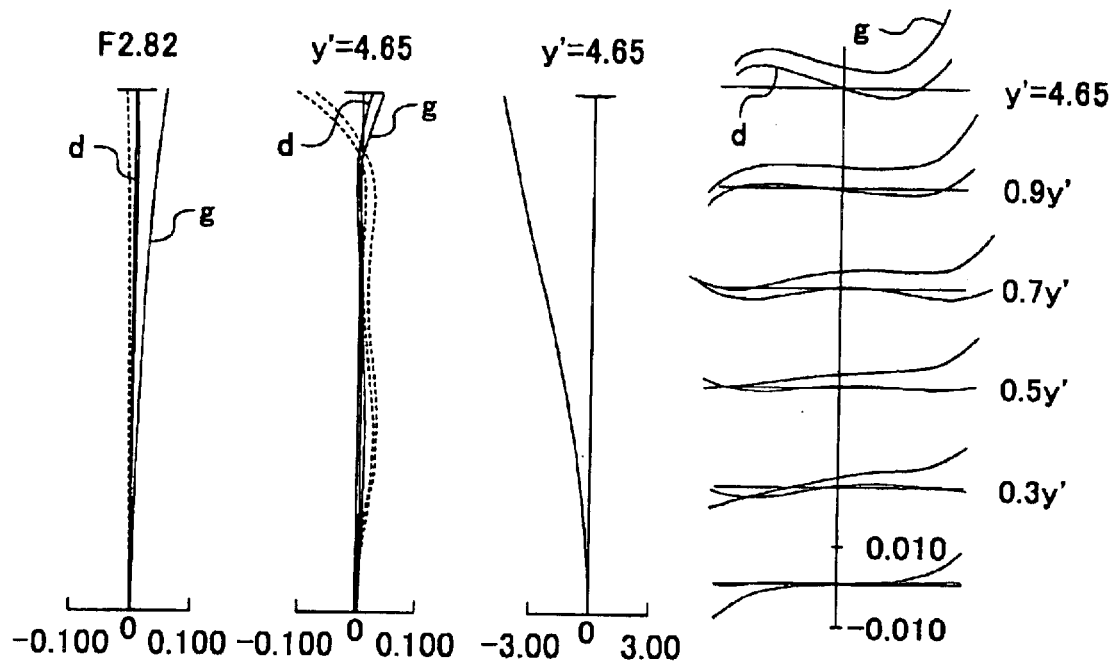
FIG. 14 is a view of an aberration curve at the end of the short focus of the zoom lens of EMBODIMENT 4.
Figure 15:
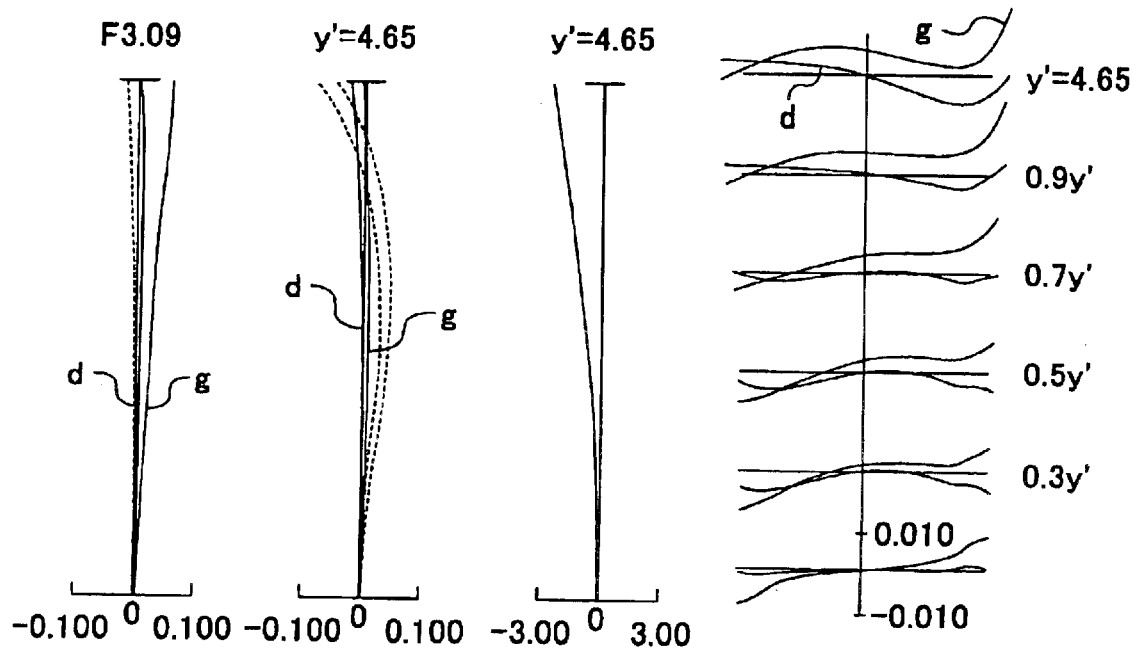
FIG. 15 is a view of the aberration curve at the intermediate focal length of the zoom lens of EMBODIMENT 4.
Figure 16:
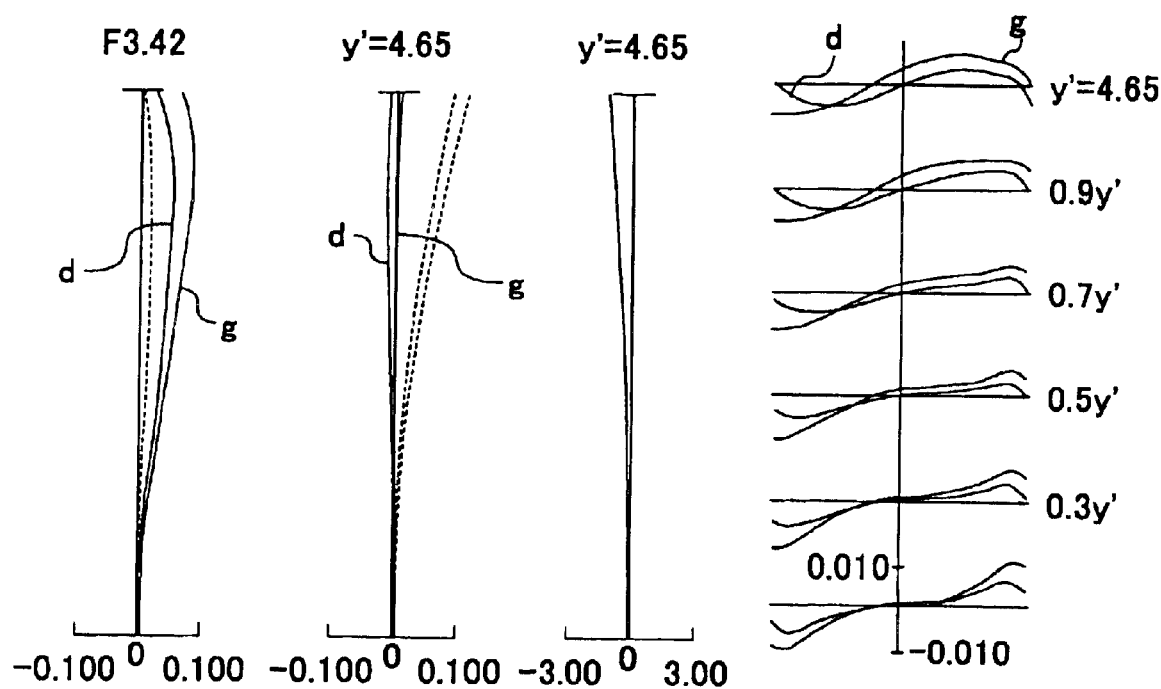
FIG. 16 is a view of the aberration curve at the end of the long focus of the zoom lens of EMBODIMENT 4.

The numerical values of EMBODIMENT 4 are shown below, FIG. 14 shows the aberration curve at the end of the short focus of the zoom lens according to EMBODIMENT 4, FIG. 15 shows the aberration curve at the intermediate focal distance, and FIG. 16 shows the aberration curve at the end of the long focus of the zoom lens.

EMBODIMENT 4

$f = 5.97 - 11.26$, $F = 2.82 - 3.42$, $\omega = 39.17 - 22.65$

| SURFACE NUMBER | R | D | Nd | vd | REMARKS | |
|---|---|---|---|---|---|---|
| 01 | 14.448 | 1.20 | 1.71323 | 52.78 | FIRST LENS | |
| 02 | 6.276 | 3.58 | | | | |
| 03 | −493.527 | 0.93 | 1.59490 | 61.67 | SECOND LENS | FIRST GROUP |
| 04* | 7.221 | 0.96 | | | | |
| 05* | 9.948 | 3.29 | 1.70545 | 37.43 | THIRD LENS | |
| 06 | ∞ | VARIABLE (A) | | | | |
| 07 | IRIS | 1.00 | | | | |
| 08* | 8.309 | 4.00 | 1.83695 | 37.97 | FOURTH LENS | SECOND GROUP |
| 09 | −14.290 | 2.09 | 1.80825 | 24.87 | FIFTH LENS | |
| 10 | 6.447 | 0.35 | | | | |
| 11 | 10.348 | 1.40 | 1.74125 | 51.18 | SIXTH LENS | |
| 12 | −727.980 | 0.10 | | | | |
| 13 | 10.930 | 1.10 | 1.61990 | 60.30 | SEVENTH LENS | |
| 14 | 13.900 | VARIABLE (B) | | | | |
| 15* | 29.320 | 1.49 | 1.48700 | 70.40 | EIGHTH LENS | THIRD GROUP |
| 16 | −23.067 | VARIABLE (C) | | | | |
| 17 | ∞ | 3.25 | 1.51680 | 64.20 | VARIOUS KINDS OF FILTERS | |
| 18 | ∞ | | | | | |

ASPHERIC SURFACE; FOURTH SURFACE $K = -1.01005$, $A4 = -1.84076 \times 10^{-4}$, $A6 = -4.81141 \times 10^{-6}$, $A8 = -6.73366 \times 10^{-8}$, $A10 = -1.12720 \times 10^{-9}$

ASPHERIC SURFACE; FIFTH SURFACE $K = -0.11037$, $A4 = -9.77583 \times 10^{-5}$, $A6 = 1.77226 \times 10^{-6}$, $A8 = -1.90717 \times 10^{-7}$, $A10 = 2.13759 \times 10^{-9}$

ASPHERIC SURFACE; EIGHTH SURFACE $K = -0.40614$, $A4 = -1.56422 \times 10^{-5}$, $A6 = -2.63977 \times 10^{-6}$, $A8 = 4.12297 \times 10^{-7}$, $A10 = -2.21536 \times 10^{-8}$

ASPHERIC SURFACE; FIFTEENTH SURFACE $K = 13.50328$, $A4 = -4.65994 \times 10^{-4}$, $A6 = 2.62615 \times 10^{-6}$, $A8 = -2.47424 \times 10^{-7}$, $A10 = 1.41575 \times 10^{-8}$

VARIABLE DISTANCE

| | END OF SHORT FOCUS $f = 5.97$ | INTERMEDIATE FOCAL DISTANCE $f = 8.20$ | END OF LONG FOCUS $f = 11.26$ |
|---|---|---|---|
| A | 15.317 | 7.461 | 1.500 |
| B | 2.440 | 3.100 | 3.486 |
| C | 3.573 | 4.888 | 7.053 |

NUMERICAL VALUES OF CONDITIONAL EXPRESSION $(R_o + R_i)/(R_o - R_i) = -6.296$

Numerical Values of Conditional Expression $(R_o+R_i)/(R_o-R_i) = -6.296$

EMBODIMENT 5 will be described next. As shown in FIG. 17 to FIG. 20, EMBODIMENT 5 to EMBODIMENT 8 are characterized in that the first group of lenses 1 includes, in order from the object side, the negative meniscus lens L1 whose convex surface faces the object side, the negative meniscus lens L2 whose convex surface faces the object side, and positive lens L3 in which the convex surface of the larger curvature faces the object side, and the second group of lenses 2 includes, in order from the object side, the positive lens L4, the negative meniscus lens L5 whose convex surface faces the object side, and the positive meniscus lens L6 whose convex surface faces the object side, and the positive lens L7. Each of the third group of lenses 3 includes one positive lens L8. Each of EMBODIMENT 5 to EMBODIMENT 8 is provided with the iris 11, which moves integrally with the second group of lenses 2, on the object side. In each of EMBODIMENT 5 to EMBODIMENT 8, the surface of the second group of lenses 2, which is located on the most object side, is formed to be the aspheric surface.

Figure 17:
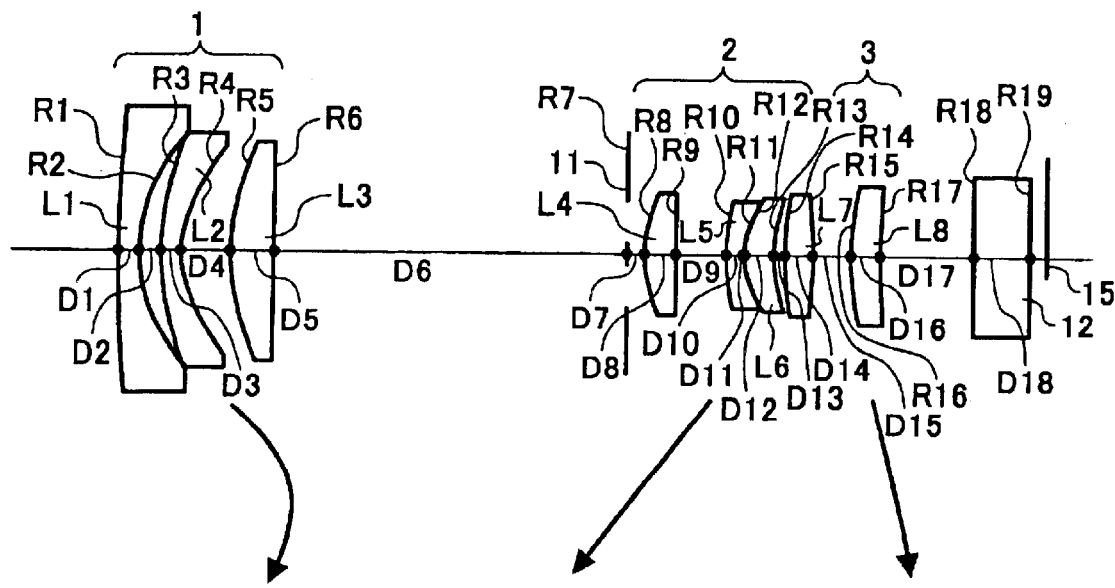
FIG. 17 is an optical arrangement drawing showing EMBODIMENT 5 of a zoom lens according to the invention.
Figure 21:
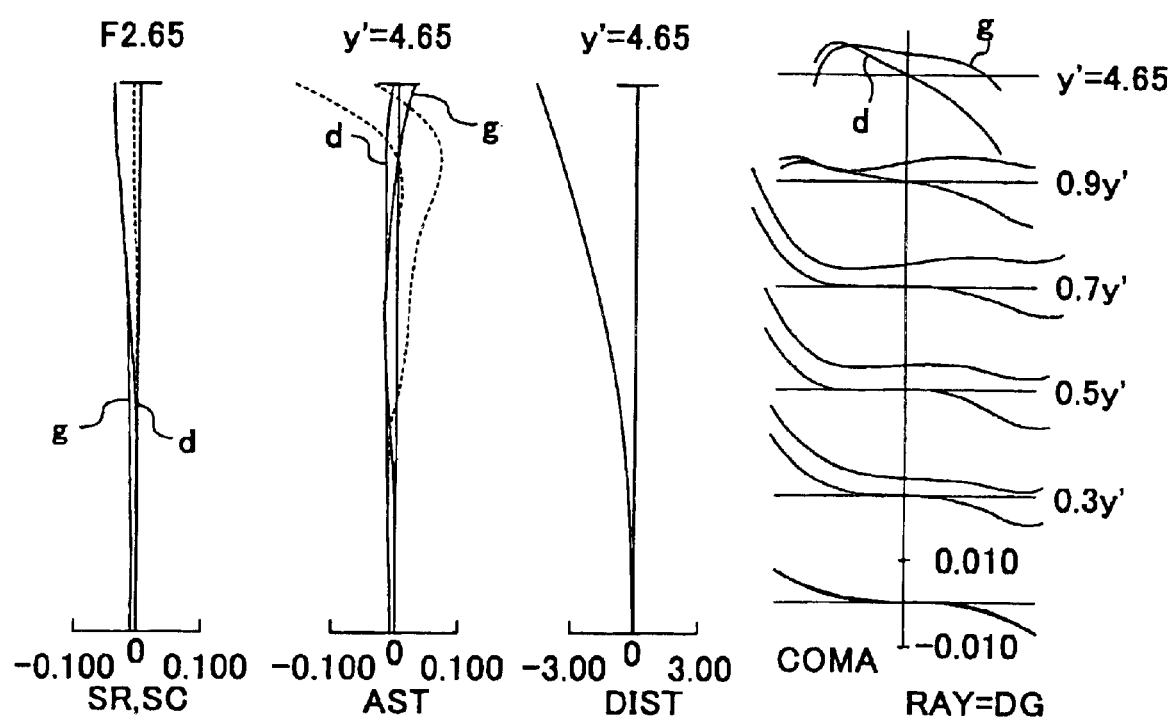
FIG. 21 is a view of an aberration curve at the end of the short focus of the zoom lens of EMBODIMENT 5.
Figure 22:
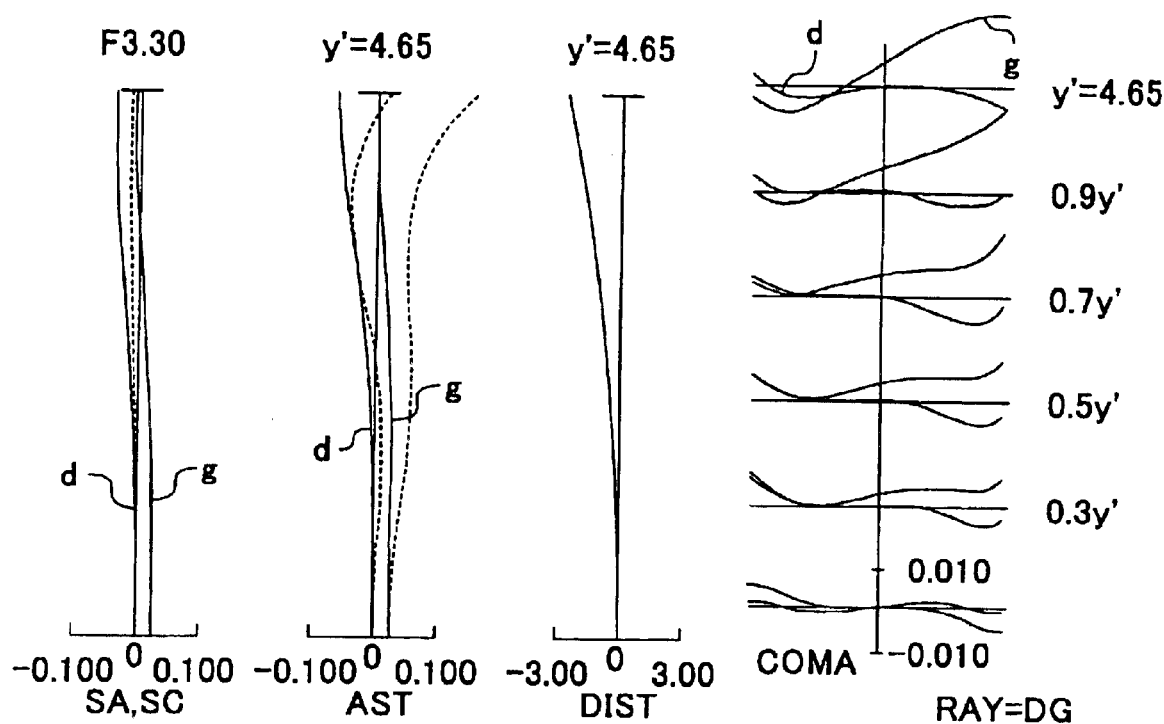
FIG. 22 is a view of the aberration curve at the intermediate focal length of the zoom lens of EMBODIMENT 5.
Figure 23:
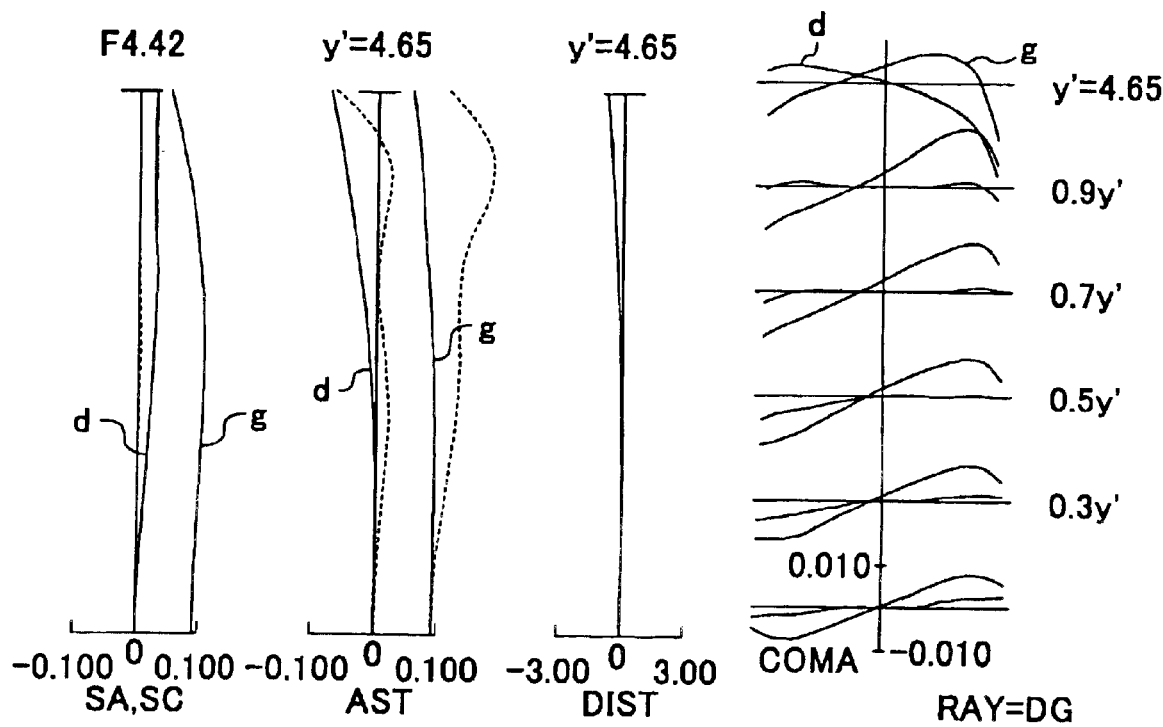
FIG. 23 is a view of the aberration curve at the end of the long focus of the zoom lens of EMBODIMENT 5.

FIG. 17 shows the optical arrangement of the zoom lens according to EMBODIMENT 5. The numerical values of EMBODIMENT 5 are shown below. FIG. 21 shows the aberration curve at the end of the short focus of the zoom lens according to EMBODIMENT 5, FIG. 22 shows the aberration curve at the intermediate focal distance, and FIG. 23 shows the aberration curve at the end of the long focus of the zoom lens.

EMBODIMENT 5 f = 5.97 – 16.88, F = 2.65 – 4.42, ω = 39.23 – 15.53

| SURFACE NUMBER | R | D | Nd | vd | REMARKS | |
|---|---|---|---|---|---|---|
| 01 | 70.388 | 1.20 | 1.77250 | 49.62 | FIRST LENS | |
| 02 | 10.023 | 1.26 | | | | |
| 03 | 17.180 | 1.20 | 1.7433 | 049.33 | SECOND LENS | FIRST GROUP |
| 04* | 7.054 | 2.98 | | | | |
| 05 | 15.475 | 2.49 | 1.71740 | 29.50 | THIRD LENS | |
| 06 | −592.689 | VARIABLE (A) | | | | |
| 07 | IRIS | 1.00 | | | | |
| 08* | 8.278 | 1.84 | 1.69350 | 53.20 | FOURTH LENS | SECOND GROUP |
| 09 | 48.706 | 2.86 | | | | |
| 10 | 12.452 | 1.00 | 1.84700 | 23.80 | FIFTH LENS | |
| 11 | 5.338 | 0.16 | | | | |
| 12 | 5.761 | 1.67 | 1.48750 | 70.44 | SIXTH LENS | |
| 13 | 10.083 | 0.62 | | | | |
| 14 | 25.534 | 1.64 | 1.58910 | 61.25 | SEVENTH LENS | |
| 15* | −33.377 | VARIABLE (B) | | | | |
| 16* | 15.427 | 1.76 | 1.58910 | 61.25 | EIGHTH LENS | THIRD GROUP |
| 17 | 42.788 | VARIABLE (C) | | | | |
| 18 | ∞ | 3.32 | 1.51680 | 64.20 | VARIOUS KINDS OF FILTERS | |
| 19 | ∞ | | | | | |

ASPHERIC SURFACE; FOURTH SURFACE

K = 0.0, A4 = −0.390444 × $10^{-3}$, A6 = −0.814745 × $10^{-6}$, A8 = 0.405425 × $10^{-6}$, A10 = −0.237422 × $10^{-7}$, A12 = 0.483887 × $10^{-9}$, A14 = −0.300058 × $10^{-12}$ A16 = −0.147703 × $10^{-12}$, A18 = 0.135176 × $10^{-14}$

ASPHERIC SURFACE; EIGHTH SURFACE

K = 0.0, A4 = −0.119781 × $10^{-3}$, A6 = −0.957080 × $10^{-6}$, A8 = −0.121055 × $10^{-7}$, A10 = −0.474520 × $10^{-9}$

ASPHERIC SURFACE; FIFTEENTH SURFACE

K = 0.0, A4 = 0.626695 × $10^{-4}$, A6 = −0.153604 × $10^{-6}$, A8 = 0.274416 × $10^{-6}$, A10 = −0.231852 × $10^{-7}$

ASPHERIC SURFACE; SIXTEENTH SURFACE

K = 0.0, A4 = −0.448058 × $10^{-4}$, A6 = 0.463819 × $10^{-5}$, A8 = −0.228407 × $10^{-6}$, A10 = 0.437430 × $10^{-5}$

VARIABLE DISTANCE

| | END OF SHORT FOCUS f = 5.97 | INTERMEDIATE FOCAL DISTANCE f = 10.044 | END OF LONG FOCUS f = 16.875 |
|---|---|---|---|
| A | 20.635 | 8.566 | 1.584 |
| B | 2.137 | 8.266 | 18.481 |
| C | 5.240 | 4.611 | 3.042 |

-continued

EMBODIMENT 5

Figure 18:
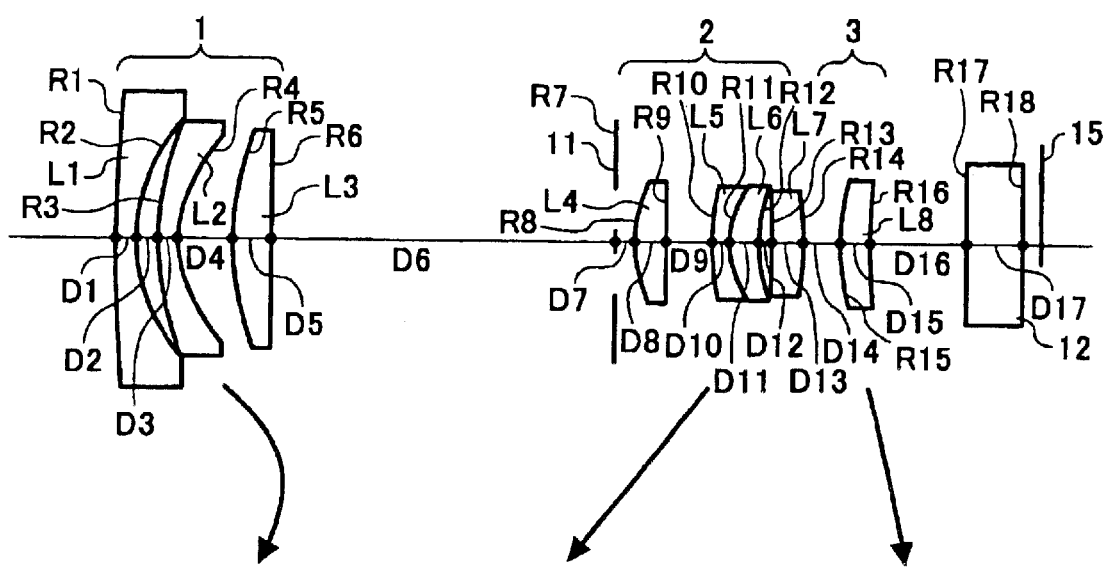
FIG. 18 is an optical arrangement drawing showing EMBODIMENT 6 of the zoom lens according to the invention.
Figure 24:
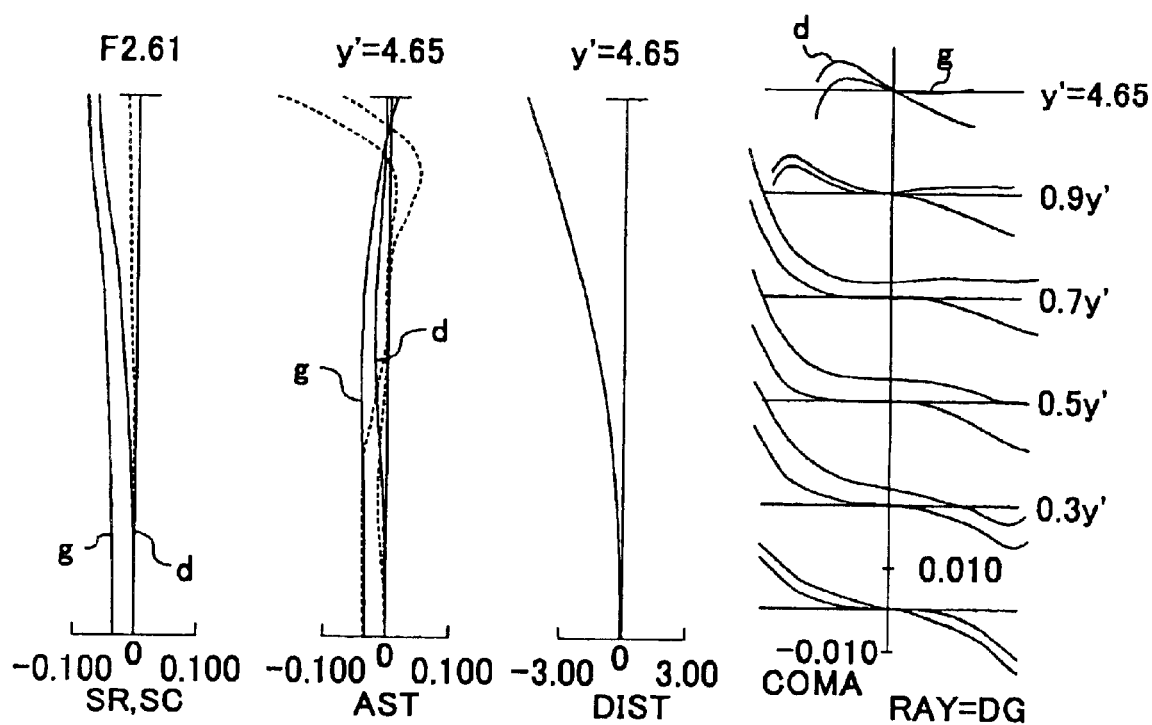
FIG. 24 is a view of an aberration curve at the end of the short focus of the zoom lens of EMBODIMENT 6.
Figure 25:
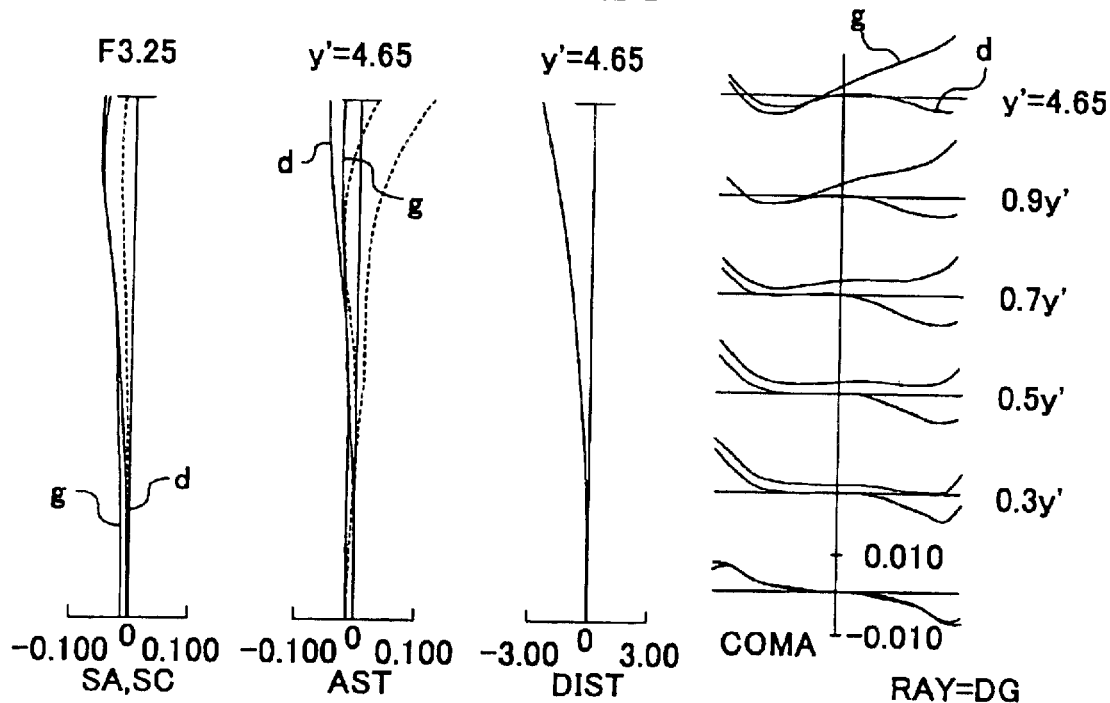
FIG. 25 is a view of the aberration curve at the intermediate focal length of the zoom lens of EMBODIMENT 6.
Figure 26:
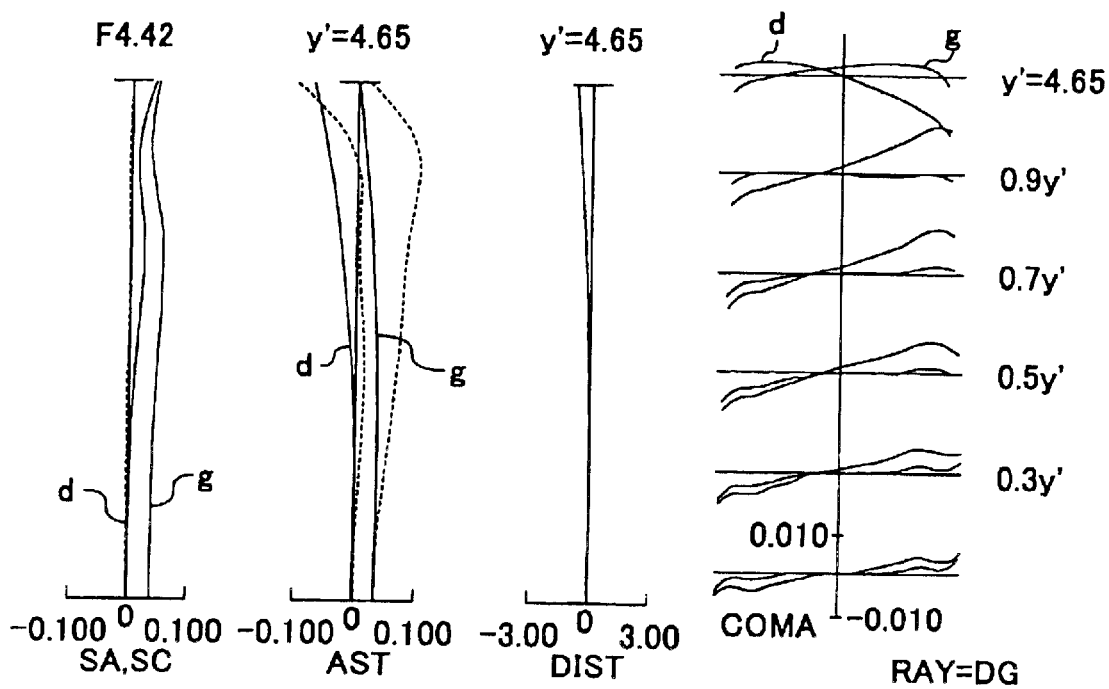
FIG. 26 is a view of the aberration curve at the end of the long focus of the zoom lens of EMBODIMENT 6.

NUMERICAL VALUES OF CONDITIONAL EXPRESSION $(R_n + R_p)/2Y_{max} = 1.193$
$(R_n - R_p)/(R_n + R_p) = -0.038$ FIG. 18 shows the optical arrangement of the zoom lens according to EMBODIMENT 6. The numerical values of EMBODIMENT 6 are shown below. FIG. 24 shows the aberration curve at the end of the short focus of the zoom lens according to EMBODIMENT 6, FIG. 25 shows the aberration curve at the intermediate focal distance, and FIG. 26 shows the aberration curve at the end of the long focus of the zoom lens.

EMBODIMENT 6

$f = 5.97 - 16.88, F = 2.61 - 4.42, \omega = 39.23 - 15.54$

| SURFACE NUMBER | R | D | Nd | vd | REMARKS | |
|---|---|---|---|---|---|---|
| 01 | 74.836 | 1.20 | 1.75870 | 50.25 | FIRST LENS | |
| 02 | 10.020 | 1.22 | | | | |
| 03 | 16.383 | 1.20 | 1.74330 | 49.30 | SECOND LENS | FIRST GROUP |
| 04* | 6.929 | 3.34 | | | | |
| 05 | 16.161 | 2.49 | 1.71300 | 28.70 | THIRD LENS | |
| 06 | −3217.674 | VARIABLE (A) | | | | |
| 07 | IRIS | 1.00 | | | | |
| 08* | 8.898 | 1.88 | 1.70820 | 49.70 | FOURTH LENS | |
| 09 | 65.034 | 2.75 | | | | |
| 10 | 12.017 | 1.00 | 1.84610 | 24.50 | FIFTH LENS | SECOND GROUP |
| 11 | 5.087 | 1.76 | 1.49230 | 69.80 | SIXTH LENS | |
| 12 | 9.649 | 0.56 | | | | |
| 13 | 58.829 | 1.95 | 1.58910 | 61.30 | SEVENTH LENS | |
| 14* | −21.754 | VARIABLE (B) | | | | |
| 15* | 16.096 | 1.77 | 1.58910 | 61.30 | EIGHTH LENS | THIRD GROUP |
| 16 | 48.721 | VARIABLE (C) | | | | |
| 17 | ∞ | 3.33 | 1.51680 | 64.20 | VARIOUS KINDS OF FILTERS | |
| 18 | ∞ | | | | | |

ASPHERIC SURFACE; FOURTH SURFACE $K = 0.0, A4 = 0.411852 \times 10^{-3}, A6 = -0.753431 \times 10^{-6}, A8 = 0.358811 \times 10^{-6},$
$A10 = -0.236179 \times 10^{-7}, A12 = 0.497070 \times 10^{-9}, A14 = -0.339446 \times 10^{-12}$
$A16 = -0.155371 \times 10^{-12}, A18 = 0.133056 \times 10^{-14}$

ASPHERIC SURFACE; EIGHTH SURFACE $K = 0.0, A4 = -0.110542 \times 10^{-3}, A6 = -0.134623 \times 10^{-5}, A8 = 0.633679 \times 10^{-7},$
$A10 = -0.284499 \times 10^{-8}$

ASPHERIC SURFACE; FOURTEENTH SURFACE $K = 0.0, A4 = 0.547595 \times 10^{-4}, A6 = 0.153645 \times 10^{-5}, A8 = -0.425020 \times 10^{-7},$
$A10 = -0.403161 \times 10^{-9}$

ASPHERIC SURFACE; FIFTEENTH SURFACE $K = 0.0, A4 = -0.318733 \times 10^{-4}, A6 = 0.350103 \times 10^{-5}, A8 = -0.156928 \times 10^{-6},$
$A10 = 0.311523 \times 10^{-8}$ -continued

EMBODIMENT 6

VARIABLE DISTANCE

| | END OF SHORT FOCUS f = 5.97 | INTERMEDIATE FOCAL DISTANCE f = 10.05 | END OF LONG FOCUS f = 16.88 |
|---|---|---|---|
| A | 19.937 | 8.1256 | 1.653 |
| B | 2.091 | 8.138 | 19.386 |
| C | 5.563 | 5.198 | 3.061 |

NUMERICAL VALUES OF CONDITIONAL EXPRESSION $R_o/Y_{max} = 1.094$

Figure 19:
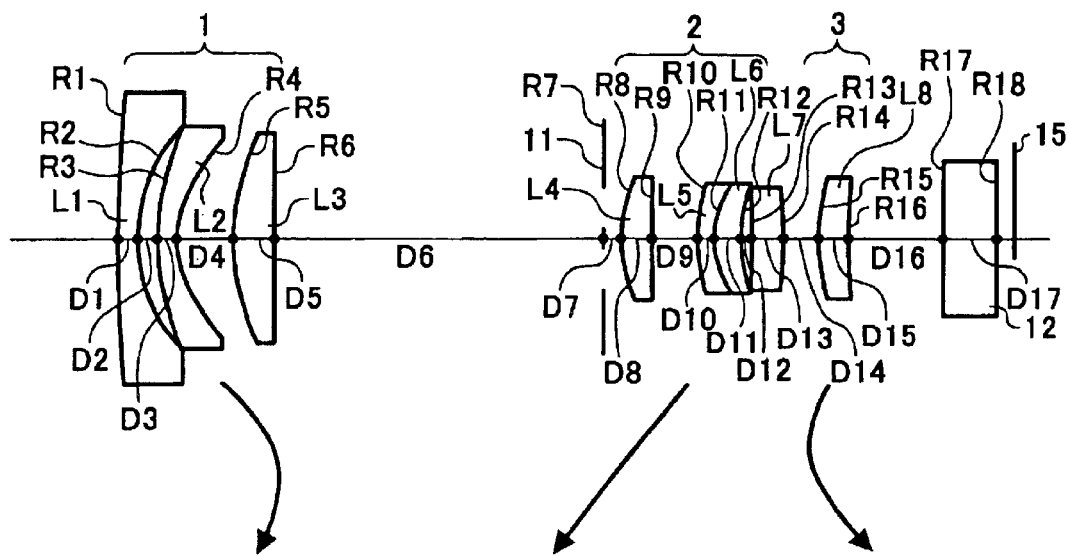
FIG. 19 is an optical arrangement drawing showing EMBODIMENT 7 of the zoom lens according to the invention.
Figure 27:
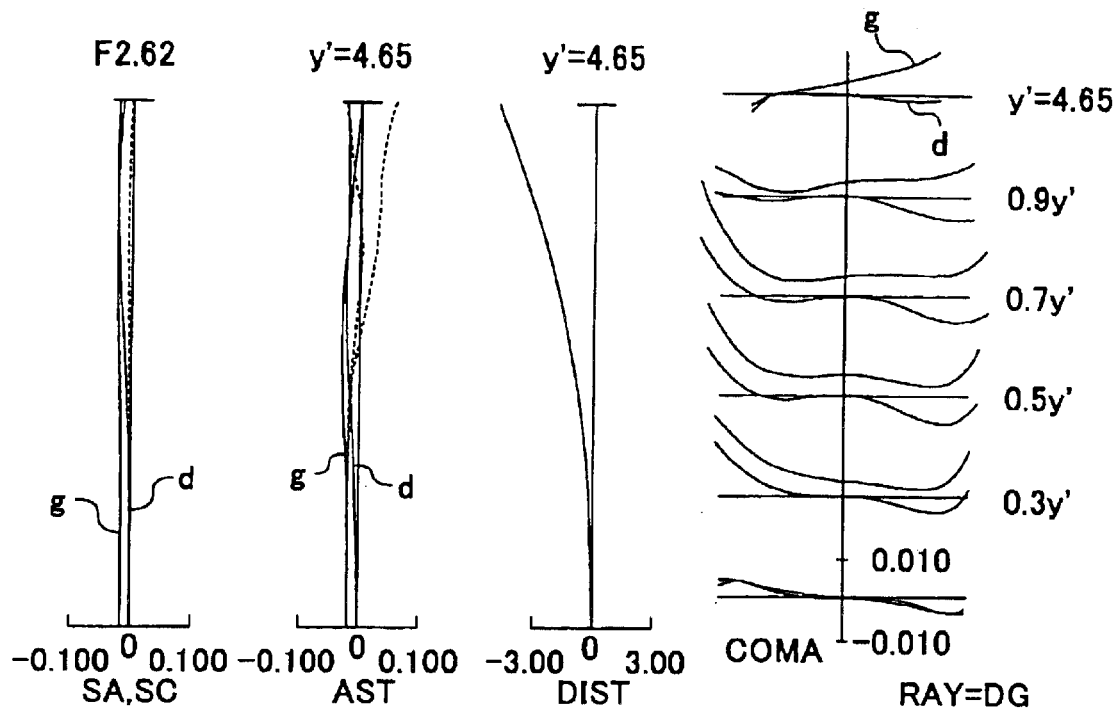
FIG. 27 is a view of an aberration curve at the end of the short focus of the zoom lens of EMBODIMENT 7.
Figure 28:
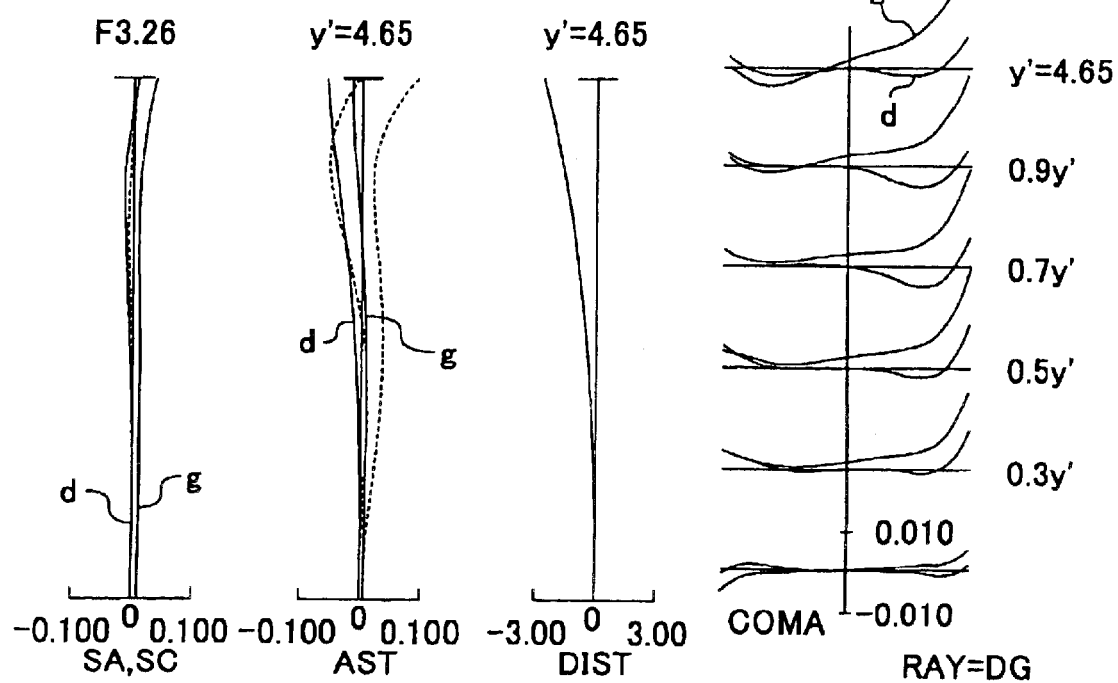
FIG. 28 is a view of the aberration curve at the intermediate focal length of the zoom lens of EMBODIMENT 7.
Figure 29:
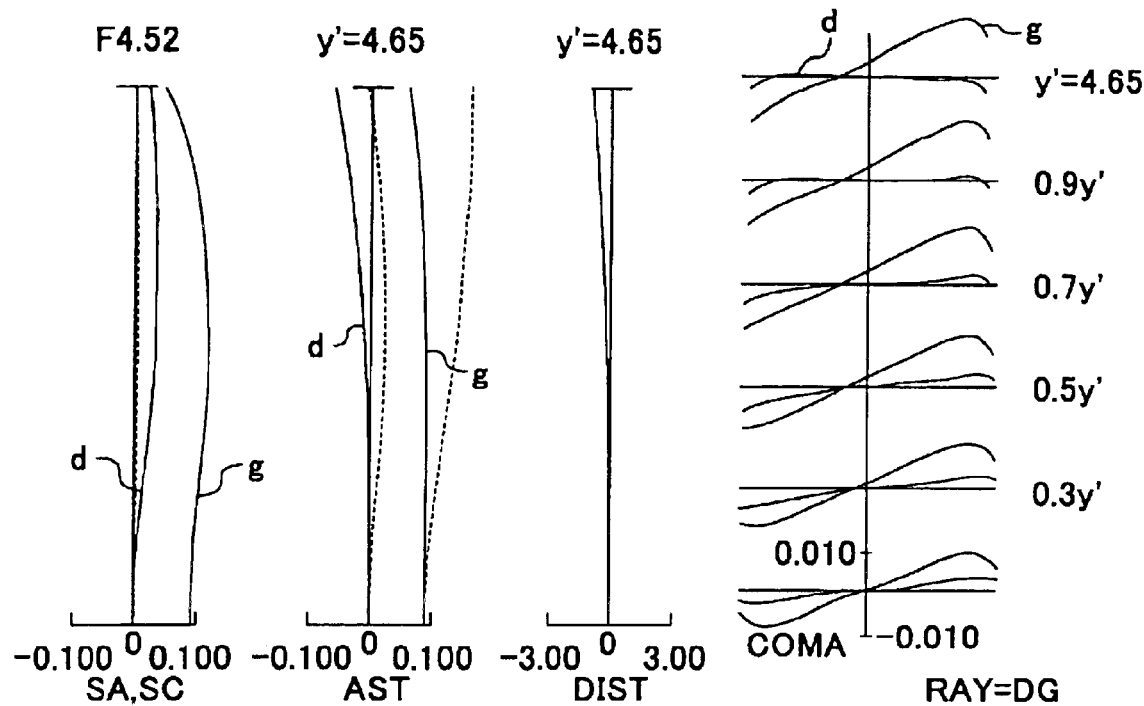
FIG. 29 is a view of the aberration curve at the end of the long focus of the zoom lens of EMBODIMENT 7.

FIG. 19 shows the optical arrangement of the zoom lens according to EMBODIMENT 7. The numerical values of EMBODIMENT 7 are shown below. FIG. 27 shows the aberration curve at the end of the short focus of the zoom lens according to EMBODIMENT 7, FIG. 28 shows the aberration curve at the intermediate focal distance, and FIG. 29 shows the aberration curve at the end of the long focus of the zoom lens.

EMBODIMENT 7 f = 5.97 – 16.87, F = 2.62 – 4.51, ω = 39.24 – 15.54

| SURFACE NUMBER | R | D | Nd | νd | REMARKS | |
|---|---|---|---|---|---|---|
| 01 | 42.561 | 1.20 | 1.77250 | 49.50 | FIRST LENS | |
| 02 | 9.200 | 2.09 | | | | |
| 03 | 20.981 | 1.32 | 1.74330 | 49.30 | SECOND LENS | FIRST GROUP |
| 04* | 7.274 | 2.96 | | | | |
| 05 | 15.044 | 2.60 | 1.71740 | 29.50 | THIRD LENS | |
| 06 | ∞ | VARIABLE (A) | | | | |
| 07 | IRIS | 1.00 | | | | |
| 08* | 8.930 | 1.75 | 1.74330 | 49.33 | FOURTH LENS | SECOND GROUP |
| 09 | 33.417 | 1.90 | | | | |
| 10 | 12.840 | 2.53 | 1.84670 | 23.80 | FIFTH LENS | |
| 11 | 5.000 | 2.99 | 1.48760 | 70.40 | SIXTH LENS | |
| 12 | 13.447 | 0.33 | | | | |
| 13 | 61.659 | 1.42 | 1.58910 | 61.30 | SEVENTH LENS | |
| 14* | −24.532 | VARIABLE (B) | | | | |
| 15* | 20.245 | 1.75 | 1.58910 | 61.30 | EIGHTH LENS | THIRD GROUP |
| 16 | 210.323 | VARIABLE (C) | | | | |
| 17 | ∞ | 3.33 | 1.51680 | 64.20 | VARIOUS KINDS OF FILTERS | |
| 18 | ∞ | | | | | |

ASPHERIC SURFACE; FOURTH SURFACE

K = 0.0, A4 = −0.375046 × $10^{-3}$, A6 = −0.737622 × $10^{-6}$, A8 = 0.422576 × $10^{-6}$, A10 = −0.260845 × $10^{-7}$, A12 = 0.593641 × $10^{-9}$, A14 = −0.122582 × $10^{-11}$ A16 = −0.185556 × $10^{-12}$, A18 = 0.214071 × $10^{-14}$

ASPHERIC SURFACE; EIGHTH SURFACE

K = 0.0, A4 = −0.910992 × $10^{-4}$, A6 = −0.261147 × $10^{-6}$, A8 = −0.373517 × $10^{-7}$, A10 = 0.783826 × $10^{-8}$

ASPHERIC SURFACE; FOURTEENTH SURFACE

K = 0.0, A4 = 0.203369 × $10^{-3}$, A6 = −0.582413 × $10^{-6}$, A8 = 0.540790 × $10^{-6}$, A10 = −0.224755 × $10^{-7}$

-continued

EMBODIMENT 7

ASPHERIC SURFACE; FIFTEENTH SURFACE $K = 0.0$, $A4 = 0.206221 \times 10^{-4}$, $A6 = -0.465805 \times 10^{-5}$, $A8 = 0.996942 \times 10^{-7}$, $A10 = 0.177863 \times 10^{-8}$

ASPHERIC SURFACE; SIXTEENTH SURFACE $K = 0.0$, $A4 = 0.449165 \times 10^{-4}$, $A6 = -0.899826 \times 10^{-5}$, $A8 = 0.228409 \times 10^{-6}$, $A10 = 0.737490 \times 10^{-9}$

VARIABLE DISTANCE

|   | END OF SHORT FOCUS f = 5.97 | INTERMEDIATE FOCAL DISTANCE f = 10.04 | END OF LONG FOCUS f = 16.87 |
|---|---|---|---|
| A | 18.875 | 7.310 | 1.600 |
| B | 1.887 | 7.140 | 18.785 |
| C | 5.175 | 5.375 | 2.840 |

NUMERICAL VALUES OF CONDITIONAL EXPRESSION $R_o/Y_{max} = 1.075$

Figure 20:
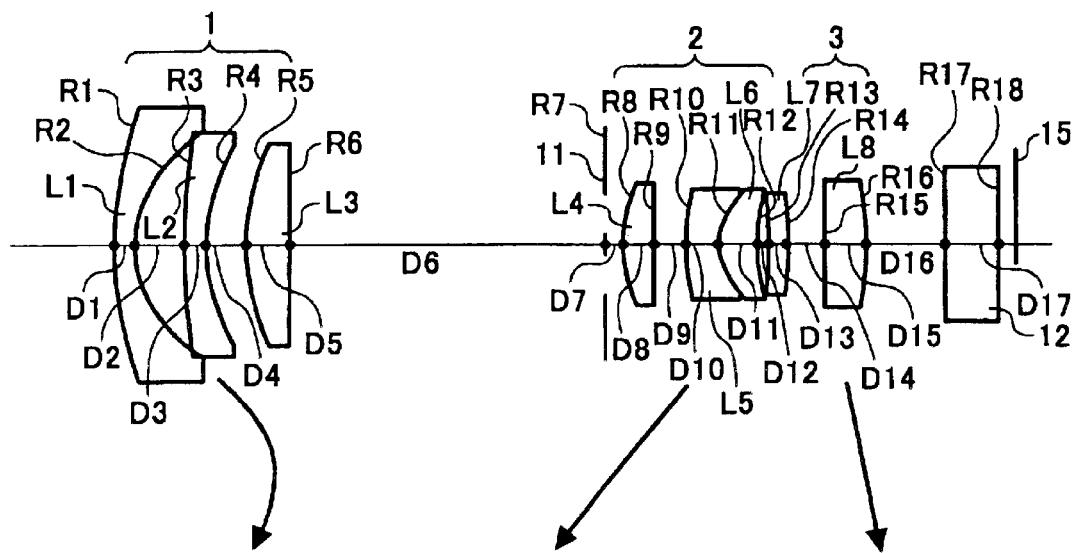
FIG. 20 is an optical arrangement drawing showing EMBODIMENT 8 of a zoom lens according to the invention.
Figure 30:
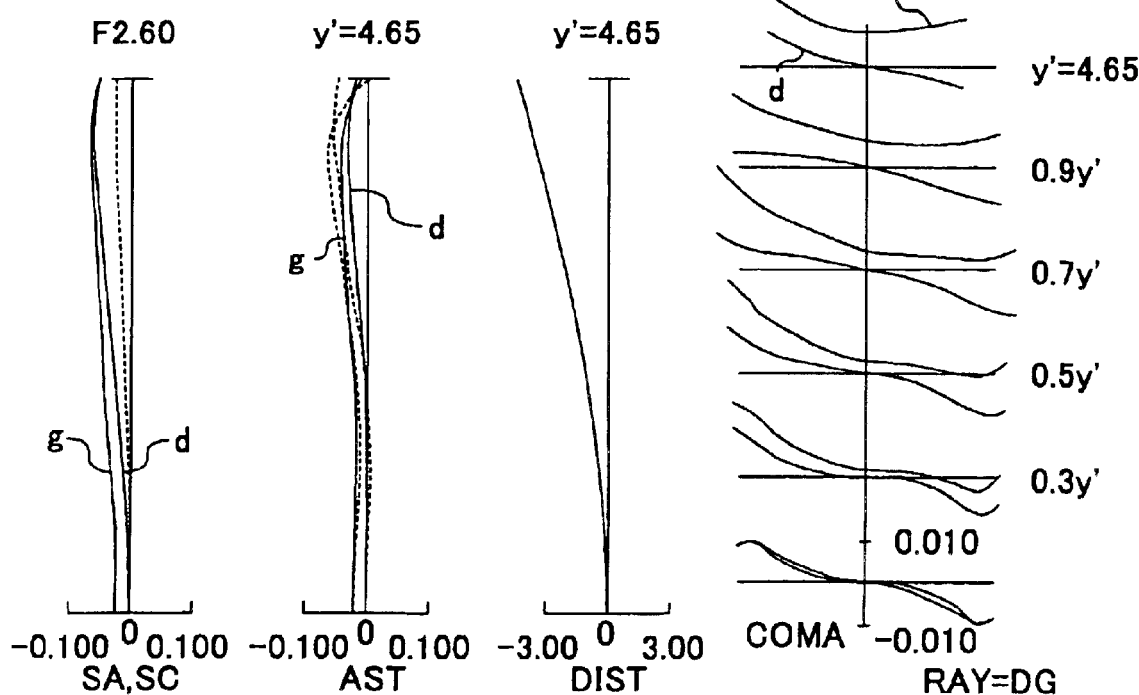
FIG. 30 is a view of an aberration curve at the end of the short focus of the zoom lens of EMBODIMENT 8.
Figure 31:
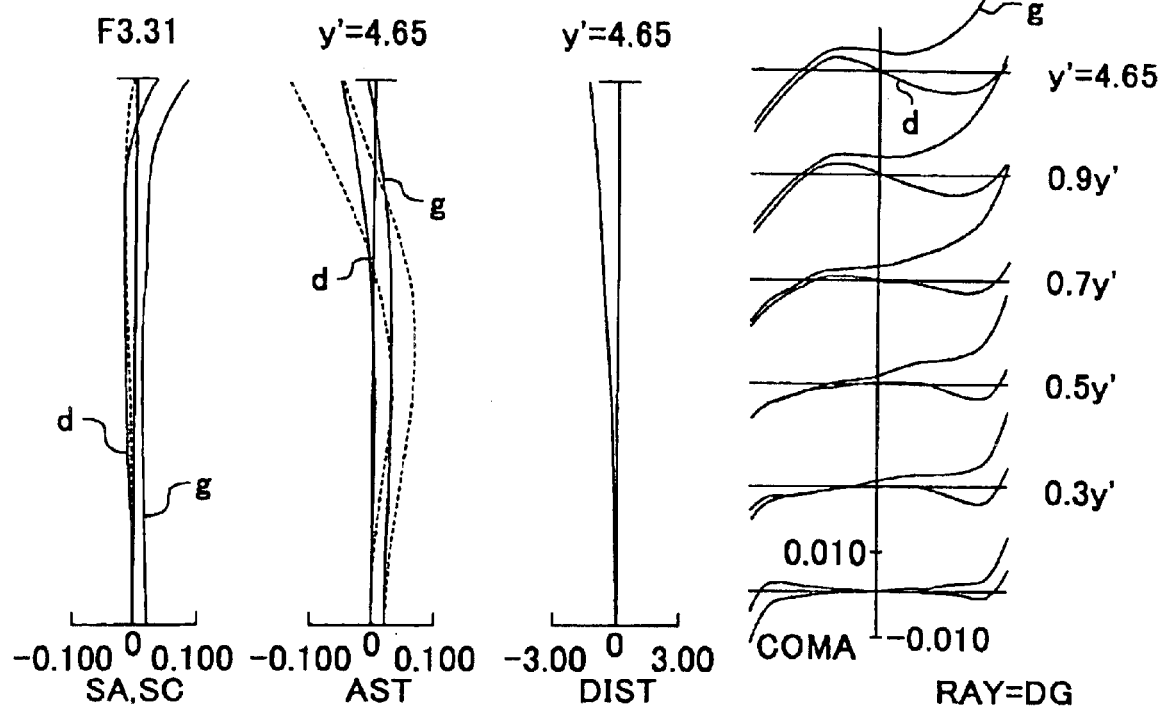
FIG. 31 is a view of the aberration curve at the intermediate focal length of the zoom lens of EMBODIMENT 8.
Figure 32:
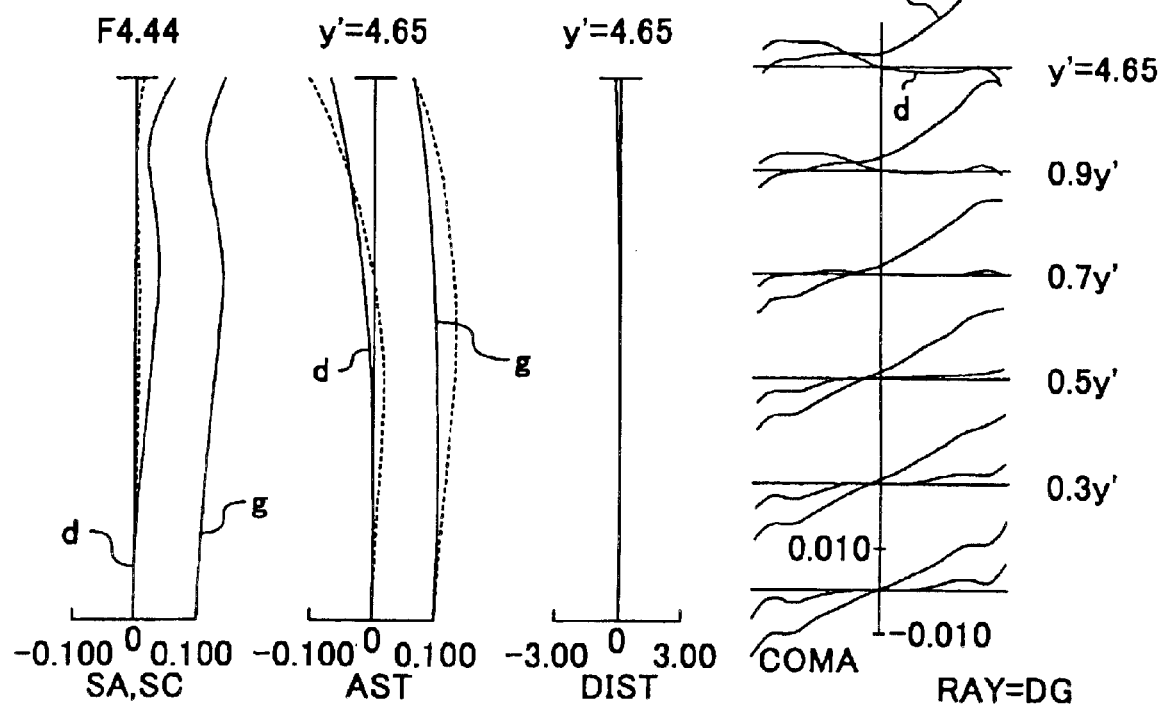
FIG. 32 is a view of the aberration curve at the end of the long focus of the zoom lens of EMBODIMENT 8.

FIG. 20 shows the optical arrangement of the zoom lens according to EMBODIMENT 8. The numerical values of EMBODIMENT 8 are shown below. FIG. 30 shows the aberration curve at the end of the short focus of the zoom lens according to EMBODIMENT 8, FIG. 31 shows the aberration curve at the intermediate focal distance, and FIG. 32 shows the aberration curve at the end of the long focus of the zoom lens.

EMBODIMENT 8

$f = 5.97 - 16.87$, $F = 2.62 - 4.51$, $\omega = 39.24 - 15.54$

| SURFACE NUMBER | R | D | Nd | vd | REMARKS | |
|---|---|---|---|---|---|---|
| 01 | 26.059 | 1.20 | 1.77250 | 49650 | FIRST LENS | |
| 02 | 8.006 | 2.93 | | | | |
| 03 | 45.050 | 1.28 | 1.74330 | 49.30 | SECOND LENS | FIRST GROUP |
| 04* | 9.802 | 2.42 | | | | |
| 05 | 16.659 | 2.58 | 1.71740 | 29.50 | THIRD LENS | |
| 06 | ∞ | VARIABLE (A) | | | | |
| 07 | IRIS | 1.00 | | | | |
| 08* | 8.844 | 1.83 | 1.74330 | 49.33 | FOURTH LENS | |
| 09 | 52.796 | 2.00 | | | | |
| 10 | 16.014 | 2.35 | 1.84670 | 23.80 | FIFTH LENS | SECOND GROUP |
| 11 | 4.252 | 2.35 | 1.72340 | 38.00 | SIXTH LENS | |
| 12 | 13.159 | 0.69 | | | | |
| 13 | −30.388 | 1.26 | 1.58910 | 61.30 | SEVENTH LENS | |
| 14* | −18.357 | VARIABLE (B) | | | | |
| 15* | 102.835 | 1.90 | 1.58910 | 61.30 | EIGHTH LENS | THIRD GROUP |
| 16 | −25.542 | VARIABLE (C) | | | | |
| 17 | ∞ | 3.33 | 1.51680 | 64.20 | VARIOUS KINDS OF FILTERS | |
| 18 | ∞ | | | | | |

ASPHERIC SURFACE; FOURTH SURFACE $K = 0.0$, $A4 = -0.181611 \times 10^{-3}$, $A6 = -0.742101 \times 10^{-6}$, $A8 = 0.494068 \times 10^{-6}$, $A10 = -0.225674 \times 10^{-7}$, $A12 = 0.450171 \times 10^{-9}$, $A14 = 0.119635 \times 10^{-12}$ -continued

EMBODIMENT 8

$A16 = -0.144145 \times 10^{-12}$, $A18 = 0.155608 \times 10^{-14}$
ASPHERIC SURFACE; EIGHTH SURFACE $K = 0.0$, $A4 = 0.297157 \times 10^{-4}$, $A6 = -0.797125 \times 10^{-5}$, $A8 = 0.413844 \times 10^{-6}$,
$A10 = -0.166034 \times 10^{-7}$
ASPHERIC SURFACE; NINTH SURFACE $K = 0.0$, $A4 = 0.131506 \times 10^{-3}$, $A6 = -0.922350 \times 10^{-5}$, $A8 = 0.410814 \times 10^{-6}$,
$A10 = -0.166077 \times 10^{-7}$
ASPHERIC SURFACE; FOURTEENTH SURFACE $K = 0.0$, $A4 = 0.451929 \times 10^{-3}$, $A6 = 0.594516 \times 10^{-5}$, $A8 = 0.100562 \times 10^{-5}$,
$A10 = 0.373888 \times 10^{-7}$
ASPHERIC SURFACE; FIFTEENTH SURFACE $K = 0.0$, $A4 = 0.498667 \times 10^{-4}$, $A6 = 0.2924416 \times 10^{-5}$, $A8 = -0.114195 \times 10^{-6}$,
$A10 = 0.185420 \times 10^{-8}$

VARIABLE DISTANCE

| | END OF SHORT FOCUS f = 5.97 | INTERMEDIATE FOCAL DISTANCE f = 10.05 | END OF LONG FOCUS f = 16.89 |
|---|---|---|---|
| A | 19.051 | 8.305 | 1.500 |
| B | 1.901 | 8.177 | 16.866 |
| C | 4.564 | 3.579 | 3.082 |

NUMERICAL VALUES OF CONDITIONAL EXPRESSION $R_o/Y_{max} = 0.914$

---

The case in which above-described zoom lens according to each EMBODIMENT is used for the camera and the portable information terminal will be described.

Figure 33A:
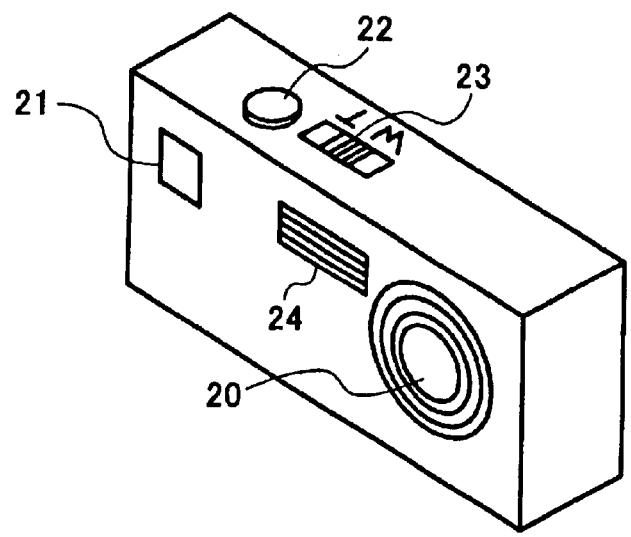
FIG. 33(a) is a perspective view taken from an obliquely fore direction.
Figure 33B:
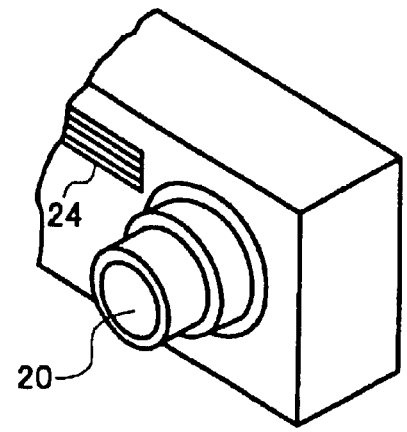
FIG. 33(b) is a perspective view showing a different operational mode taken from an obliquely fore direction.
Figure 33C:
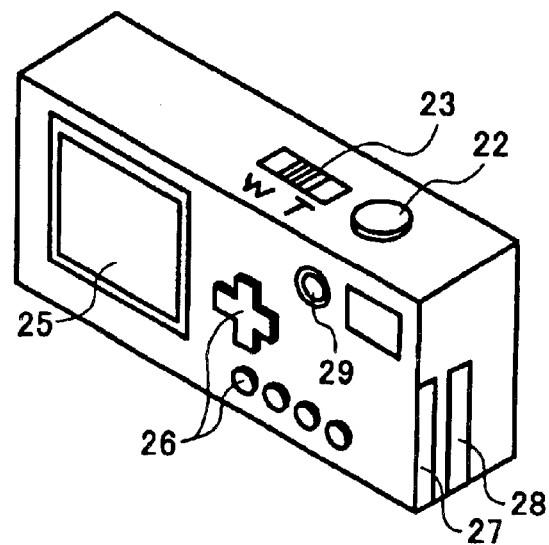
FIG. 33(c) is a perspective view taken from an obliquely rear direction.

FIG. 33 shows an example in which the above-described zoom lens is used for the digital camera. In FIG. 33, the camera has a taking lens 20 and the photo detector including an area sensor such as CCD, and the camera is formed so as to read the image of a photographic object, which is formed by the taking lens 20, with a light-receiving portion of the photo detector. The zoom lenses described in EMBODIMENT 1 to EMBODIMENT 8 are used as the taking lens 20. The digital camera shown in FIG. 33 has an optical view finder 21, a shutter button 22, a zoom operating lever 23, and an emitting portion 24 of a flash including a stroboscopic emitting device. Also, the camera has a monitor 25 including a liquid crystal panel and the like, various kinds of operating buttons 26, a power on/off switch 29, and the like on the backside of the camera. Further, the camera has a memory card slot 27 and a communication slot 28 in side face portion.

As shown in FIG. 33(a), the taking lens 20 is in a state of being retracted in the body, while the camera is taken on the road. As shown in FIG. 33(b), a lens tube is extended, when a user operates the power on/off switch 29 to turn on the power. At this point, each group of lenses of the zoom lens is arranged in, e.g., the end of the short focus inside the lens tube, the arrangement of each group of lenses is changed by operating the zoom operating lever 23, and the change in the magnification to the end of the long focus can be performed. The magnification of the view finder 21 is also changed in synchronization with the change in the angle of view of the taking lens 20.

When the shutter button 22 is half-pressed, an autofocus circuit including a range finder circuit is activated to perform the focusing. In the zoom lenses according to EMBODIMENT 1 to EMBODIMENT 8, the focusing can be performed by moving the first group of lenses 1 or the third group of lenses 3 toward the optical axis direction or moving the photo detector toward the optical axis direction. When the shutter button 22 is further pressed, the photograph is taken. Processes after that are described later.

Figure 34:
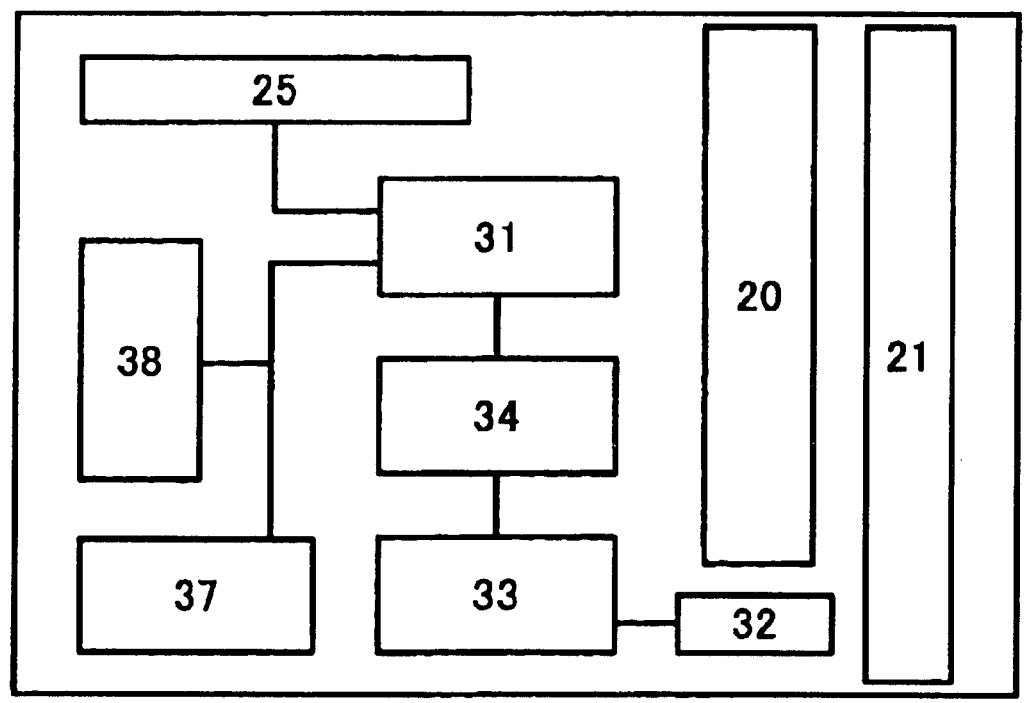
FIG. 34 is a block diagram showing an example of a signal processing system of the camera or the portable information terminal.

A format of the camera may be the traditional silver film camera, however, FIG. 33 shows the example of the digital camera. The digital camera can be also used as the portable information terminal by adding a communication function. In the example shown in FIG. 33, a memory card can be inserted into the slot 27 and a communication card can be inserted into the slot 28, so that the digital camera can be used as the portable information terminal. FIG. 34 shows an example of a signal processing system for being able to be used as the portable information terminal.

In FIG. 34, the image of the photographic object is formed on the light receiving portion of a photo detector 32 including the CCD area sensor by the taking lens 20, and the photo detector 32 outputs an image signal corresponding to the formed image. Signal processing and image processing for the image signal are performed by a signal processing device 33, an image processing device 34, and the like, which are controlled by a central processing device including CPU, a microprocessor, or the like, and the image signal is recorded in a semiconductor memory 37. The semiconductor memory 37 may be built in the camera, or the semiconductor memory may be the memory card inserted in the slot 27. The image signal recorded in the semiconductor memory 37 is inputted into the liquid crystal monitor 25 with control of the central processing device 31, and the image can be displayed with the liquid crystal monitor 25. Further, the communication with the outside can be performed through a communication card 38 inserted in the slot 28, and the image signal can be also transmitted to the outside. The operating buttons 26 are used, when the image recorded in the semiconductor memory 37 is displayed on the liquid crystal monitor 25 or the transmission to the outside is performed by using the communication card 38 or the like. The image which is being taken can be also displayed on the liquid crystal monitor 25. Each of the slots 27 and 28, in which the semiconductor memory 37 and the communication card 38 are inserted, may be dedicated or general-purpose.

The compact camera or portable information terminal having the high quality image, which uses the photo detector in the range form two million pixels to four million pixels, can be realized in such a manner that any zoom lens in EMBODIMENT 1 to EMBODIMENT 8 is used as the taking lens in the camera or portable information terminal.

(Second Mode)

Figure 35:
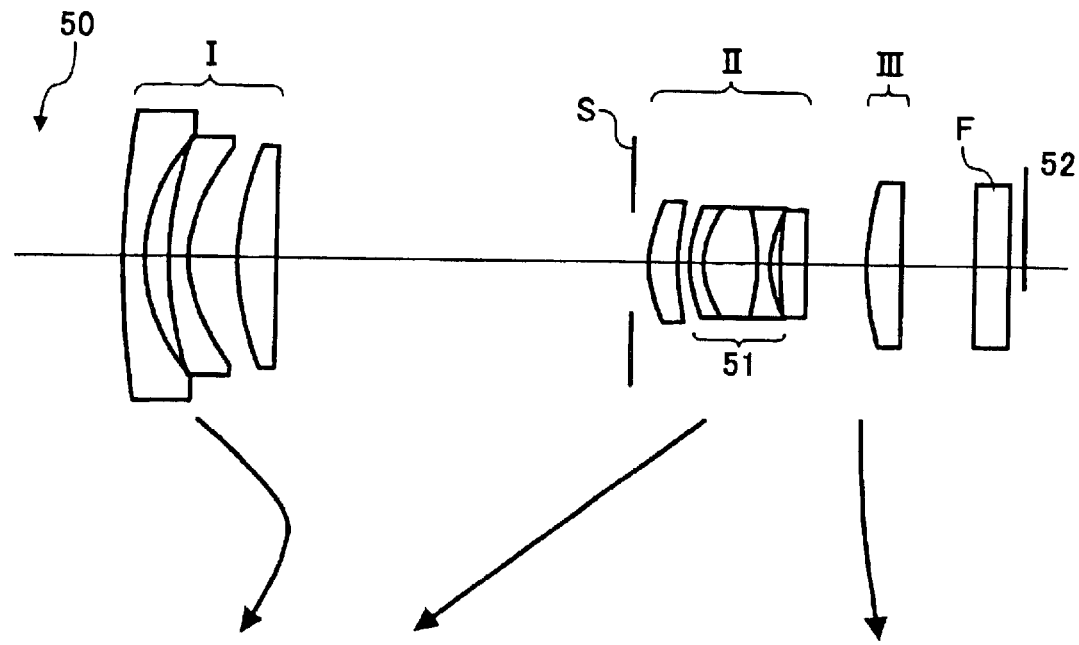
FIG. 35 is a sectional view showing a lens construction of the zoom lens of EMBODIMENT 9.
Figure 36:
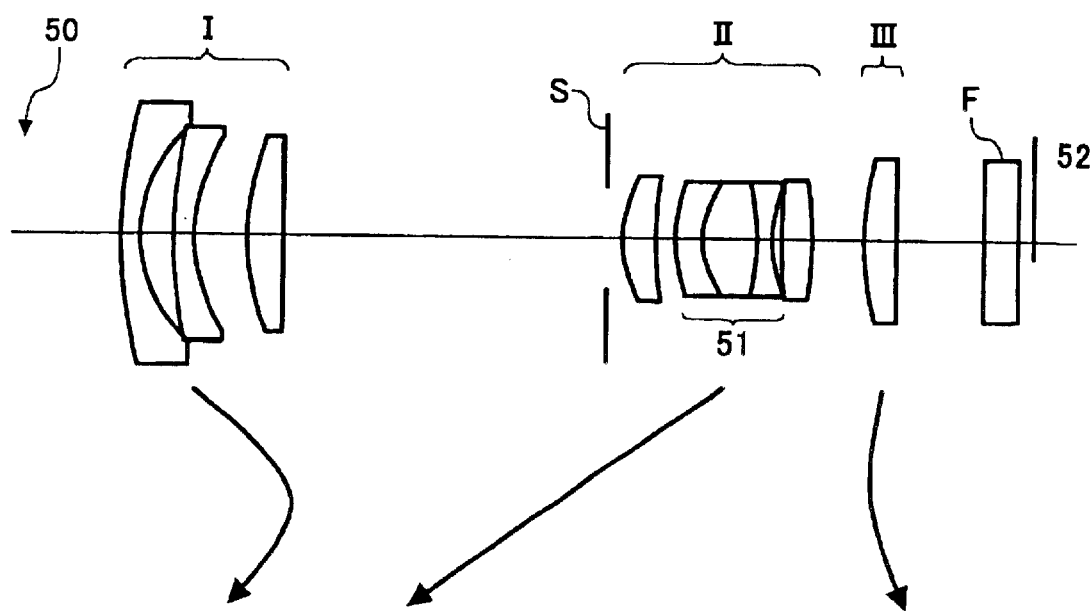
FIG. 36 is a sectional view showing a lens construction of the zoom lens of EMBODIMENT 10.
Figure 37:
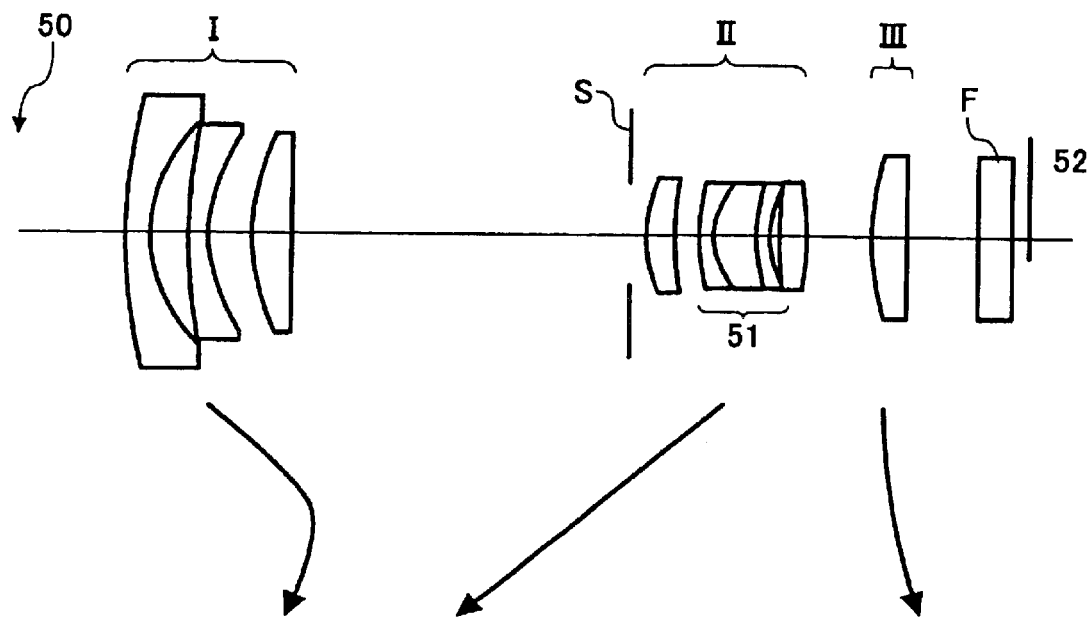
FIG. 37 is a sectional view showing a lens construction of the zoom lens of EMBODIMENT 11.
Figure 38:
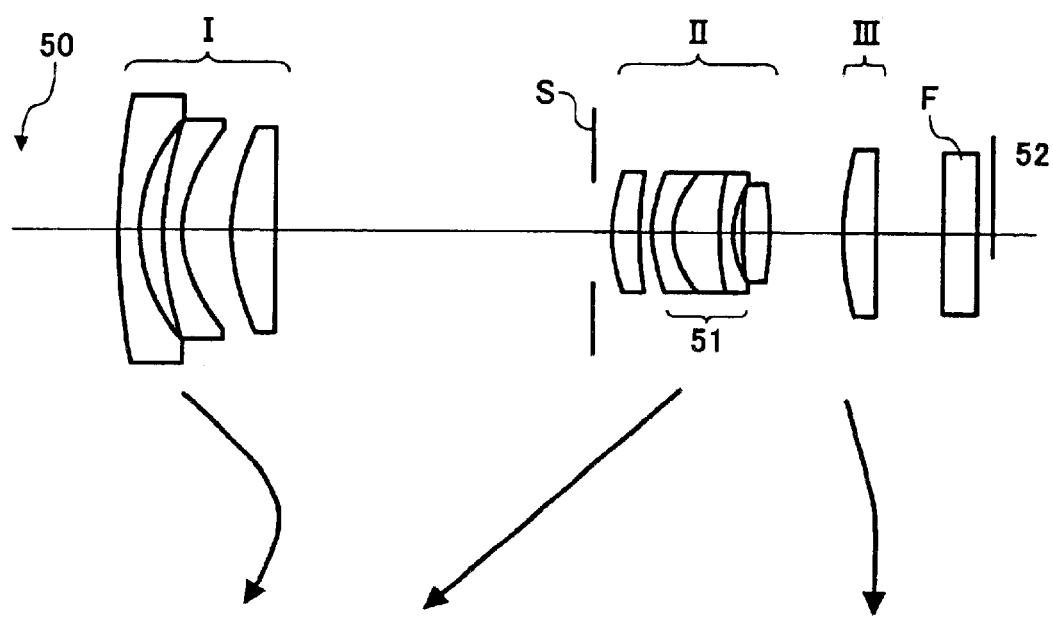
FIG. 38 is a sectional view showing a lens construction of the zoom lens of EMBODIMENT 12.
Figure 39:
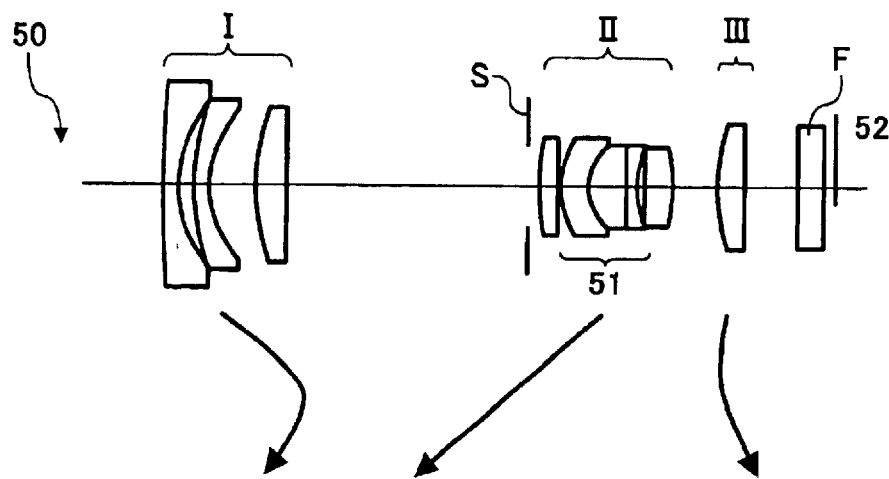
FIG. 39 is a sectional view showing a lens construction of the zoom lens of EMBODIMENT 13.
Figure 40:
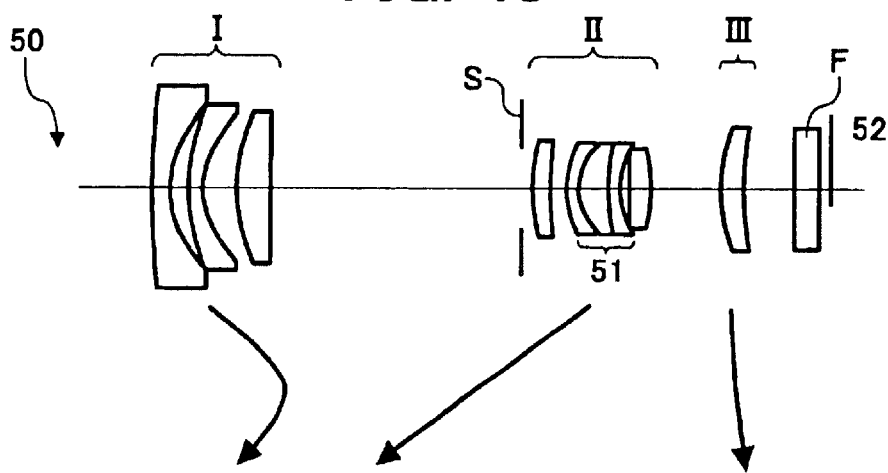
FIG. 40 is a sectional view showing a lens construction of the zoom lens of EMBODIMENT 14.
Figure 41:
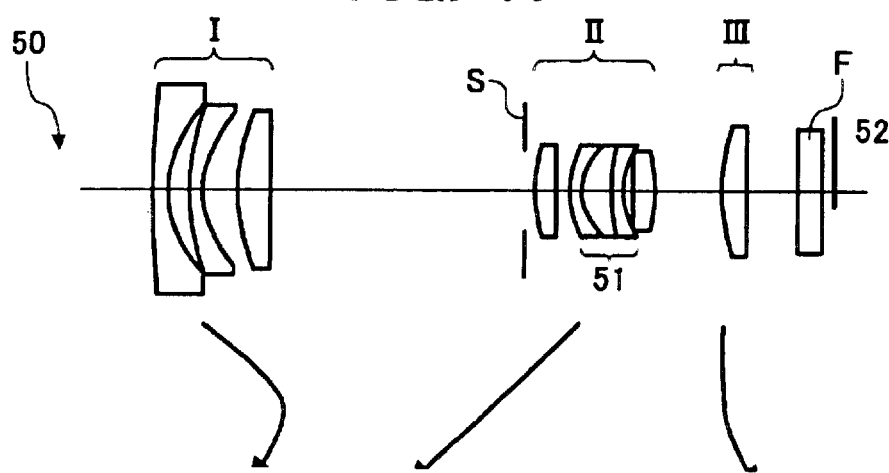
FIG. 41 is a sectional view showing a lens construction of the zoom lens of EMBODIMENT 15.

As illustrated in FIG. 35, with reference to a zoom lens of the invention, "the zoom lens in which a first group I having the negative focal length, a second group II having the positive focal length, and a third group III having the positive focal length are arranged in order from the object side 50 (the left side of FIG. 35), an iris S moving integrally with the second group II is provided on the object side of the second group II, and the second group II moves monotonically from the image side 52 to the object side and the first group I moves so as to correct the shift in the position of the image surface, which is attended with the change in the magnification, when the magnification is changed from the end of the short focus to the end of the long focus, the zoom lens is characterized in that the second group II has a three-element cemented lens 51 including the negative lens, the positive lens, and the positive lens in order from the object side" (claim 15).

In the zoom lens, the negative lens arranged on the most object side of the three-element cemented lens 51 in the second group II can be "a meniscus shape whose concave surface faces the image side 52" (claim 16).

In the negative lens arranged on the most image side of the three-element cemented lens 51 in the second group II, "the strong concave surface can face the image side" (claim 17).

It is preferable that a refractive index: Nc2 and Abbe number: vc2 of the positive lens arranged at the midpoint of the three-element cemented lens in the second group II satisfy the following conditions (claims 18 and 19):

$$1.45 < Nc2 < 1.52 \tag{1}$$

and $$68 < vc2 < 85. \tag{2}$$

In this case, it is preferable that a refractive index: Nc1 and Abbe number: vc1 of the negative lens arranged on the most object side of the three-element cemented lens in the second group II and a refractive index: Nc3 and Abbe number: vc3 of the negative lens arranged on the most image side of the three-element cemented lens in the second group II satisfy the following conditions (claims 20 and 21):

$$1.60 < Nc1 < 1.95, \tag{3}$$

$$20 < vc1 < 40, \tag{4}$$

$$1.60 < Nc3 < 1.95, \tag{5}$$

and $$20 < vc3 < 40. \tag{6}$$

In this case, the refractive index: Nc1 and the Abbe number: vc1 of the negative lens arranged on the most object side of the three-element cemented lens in the second group II satisfy the following conditions (claims 22 and 23):

$$1.75 < Nc1 < 1.95 \tag{3-1}$$

and $$20 < vc1 < 35, \tag{4-1}$$

or satisfy the following conditions (claims 24 and 25):

$$1.75 < Nc1 < 1.95 \tag{3-1}$$

and $$35 \leq vc1 < 40, \tag{4-2}$$

or satisfy the following conditions (claims 26 and 27):

$$1.60 < Nc1 \leq 1.75 \tag{3-2}$$

and $$20 < vc1 < 35. \tag{4-1}$$

In the zoom lens described in any one of claims 15 to 27, it is preferable that a curvature radius of the cemented surface on the object side: Rc2 and a curvature radius of the surface on the most image side: Rc4 of the three-element cemented lens in the second group satisfy the following condition (claims 28 to 33):

$$0.5 < (Rc2/Rc4) < 0.85. \tag{7}$$

In the zoom lens described in any one of claims 15 to 33, the second group can have "at least one positive lens on either the object side or the image side of the three-element cemented lens" (claims 34 to 39). In this case, it is preferable that at least one of the positive lenses arranged on the object side and the image side of the three-element cemented lens has the aspheric surface (claims 40 to 44).

In the zoom lens described in any one of claims 34 to 44, the first group can have "two negative lenses and one positive lens in order from the object side" (claims 46 to 52).

A camera apparatus of the invention is characterized by having the zoom lens described in claims 15 to 52 as "a taking optical system of a camera function portion" (claims 53 to 68). The camera apparatus can be implemented as "a portable information terminal apparatus". Needless to say, the camera apparatus can be implemented as a digital camera apparatus or a silver film camera apparatus, which has the zoom lens described in any one of claims 15 to 52 as the taking optical system.

Like the zoom lens of the invention, in the zoom lens including the three-group lens whose power distribution is negative, positive and positive, generally the second group of lenses moves monotonically from the image side to the object side and the first group of lenses moves so as to "correct the shift in the position of the image surface, which is attended with the change in the magnification," when the magnification is changed from the end of the short focus to the end of the long focus.

Accordingly, the second group of lenses bears "almost part of the function of changing the magnification" and the third group of lenses is provided "mainly in order to distance an exit pupil from the image surface".

In order to realize the zoom lens in which various kinds of aberrations are small and the resolution is high, the change in the aberration caused by the change in the magnification must be suppressed in the small amount, in particular, it is necessary in the second group of lenses which is the group bearing mainly the change in the magnification that "the aberration is favorably corrected in its entire range of the change in the magnification."

In order to realize the wide angle of view of the end of the short focus, it is necessary to reduce the chromatic difference of magnification, which increases with widening angle of view. The construction of the second group of lenses becomes important in order to correct favorably the chromatic difference of magnification in the entire range of the change in the magnification.

In the second group of lenses in the zoom lens, which has the construction including the three groups, one which "includes three elements of the positive, negative, and positive lenses", one which "includes three elements of the positive, positive, and negative lenses", one which "includes four elements of the positive, positive, negative, and positive lenses", and one which "includes four elements of the positive, negative, negative, and positive lenses" are known as the second group of lenses of the prior art, however, the second group of lenses in the zoom lens of the invention can realize the better correcting capability of the aberration than those of the prior art.

That is to say, in the zoom lens of the invention, the second group of lenses is formed to have "the three-element cemented lens including the negative, positive, and negative lenses in order from the object side." Since the two faces of the cemented surface in the three-element cemented lens "differ in the distance from the iris," the two faces also differ in a way in which the light beam passes through on the axis and in the off-axis. Accordingly, the axial chromatic aberration and the chromatic difference of magnification can be independently corrected in a certain extent by the two faces of the cemented surface, in particular it is effective to the correction of the chromatic difference of magnification, which increases with widening angle of view.

With reference to a means, it is thought that two sets of the cemented lens are used, however, when "the optical axis between the cemented lenses" is shifted by the eccentricity in the assembly or the like, the chromatic difference of magnification is asymmetrically generated in the off-axis and the unnaturally chromatic aberration is easy to occurs.

On the contrary, when the three-element cemented lens is used like the invention, the eccentricity in the assembly is never generated in the two faces of the cemented surface and the chromatic difference of magnification can be reduced sufficiently.

Like the zoom lens described in claim 16, when "the negative lens arranged on the most object side" of the three-element cemented lens in the second group of lenses is formed in "the meniscus shape whose concave surface faces the image side", the surface on the object side of the negative lens is formed to be the convex surface, the incident light beam is not largely refracted, the unnecessary aberration is prevented from occurring, the spherical aberration and the comatic aberration can be mainly corrected by forming the surface on the image side to be the strong concave surface, and the aberration can be more favorably corrected.

Like the zoom lens described in claim 17, "the negative lens arranged on the most image side" of the two-element cemented lens in the second group of lenses is formed to be "one in which the strong concave surface faces the image side", so that the strong concave surface of the surface on the image side can perform "secondary correction of the spherical aberration and the comatic aberration" and also contribute to the correction of the astigmatism, consequently, the aberration can be corrected more favorably.

The conditions (1) and (2) in claims 18 and 19 are the condition for "the favorable correction of the chromatic aberrations", when the refractive index: Nc2 is more than 1.52 and the Abbe number: vc2 is less than 68, it is difficult to take the balance between the axial chromatic aberration and other aberrations, in particular the axial chromatic aberration is easy to occurs in the end of the long focus. Further, correcting effect of monochromatic aberration is not sufficiently obtained in the cemented surface on the object side.

On the other hand, when the refractive index: Nc2 is less than 1.45 and the Abbe number: vc2 is more than 85, though it is advantageous for the correction of the aberration, a glass material becomes expensive and an increase in cost is brought about.

The satisfaction of the conditions (1) and (2) can more favorably correct primarily the axial chromatic aberration, realizes the higher performance, and obtain the image quality having high contrast.

The conditions (3) to (6) in claims 20 and 21 are the condition for the more favorable correction of the chromatic difference of magnification. The good balance between the axial chromatic aberration and the chromatic difference of magnification can be achieved, in particular the chromatic difference of magnification can be reduced in the end of the short focus, and the corrected state of the monochromatic aberration can be also maintained simultaneously in a manner that satisfies the conditions (3) to (6), combining with the conditions (1) and (2). Accordingly, "the higher performance of the zoom lens" can be achieved by more favorably correcting mainly the chromatic difference of magnification.

The combination of $$1.75 < Nc1 < 1.95 \tag{3-1}$$

and $$20 < vc1 < 35, \tag{4-1}$$

or the combination of $$1.75 < Nc1 < 1.95 \tag{3-1}$$

and $$35 \leq vc1 < 40, \tag{4-2}$$

or the combination of $$1.60 < Nc1 \leq 1.75 \tag{3-2}$$

and $$20 < vc1 < 35 \tag{4-1}$$

may satisfy the above-described conditions (3) and (4).

The condition (7) described in claims 28 to 33 is one for "the further improvement of the monochromatic aberration", when a parameter: Rc2/Rc4 is more than 0.85, the spherical aberration is easy to largely occurs in a positive direction in the end of the long focus, which causes the degradation of the image contrast. On the other hand, when the parameter: Rc2/Rc4 is less than 0.5, the correcting capability of the astigmatism and the distortion of the image surface tends to be short, which causes flatness of the image surface to be degraded in the entire range of the change in the magnification.

The satisfaction of the condition (7) can more favorably correct "mainly the monochromatic aberrations" of the zoom lens.

There are two surfaces of "the concave surface having the strong and negative refracting power" in the three-element cemented lens. By arranging the positive refracting power opposite to the negative refracting power, the correcting capability of the aberration caused by the above-described two surfaces of the concave surface can be sufficiently drawn.

Like the zoom lens described in claims 34 to 39, when the second group of lenses is formed so as to have each of at least one positive lens on the object side and the image side of the three-element cemented lens, the "positive, negative, positive, negative, and positive" construction is obtained as a whole of the second group of lenses, and it is very well balance for the arrangement of the refracting power. By adopting the construction, the excessive aberration can be prevented from generating in one surface of the lens, and the degradation of imaging performance, which caused by manufacturing error such as the eccentricity, can be also suppressed.

Accordingly, by adopting the construction of claims 34 to 39, the sufficient miniaturization and wide angle of view can be achieved and the high performance can be realized.

In order to miniaturize the second group of lenses (in particular compaction of an overall length), it is effective to use the aspheric surface for the second group of lenses (claims 40 to 44). At this point, the aspheric surface may be provided on either side or both sides of the positive lenses, which are arranged on the object side and the image side in the three-element cemented lens. The positive lens on the object side is near to the iris and mainly effective in the correction of the spherical aberration and the comatic aberration. The positive lens on the image side is far from the iris, and effective in the correction of the aspheric aberration in addition to the spherical aberration and the comatic aberration because the off-axis light flux passes through the positive lens on the image side with the light flux separated to a certain extent.

Accordingly, by adopting the construction of claims 40 to 44, the monochromatic aberration can be more favorably corrected and the zoom lens having the extremely high performance can be realized.

The first group of lenses of the zoom lenses of the invention can be formed with three elements, in order from the object side, of the negative meniscus lens whose convex surface faces the object side, the negative lens in which the surface of the large curvature faces the image side, and the positive lens in which the surface of the large curvature faces the object side (claims 45 to 52). Because the structure has the highly correcting capability of the off-axis aberration, it is advantageous to the widening of the angle of view. In order to correct more favorably the aberration, it is desirable that the surface on the image side of the above-described negative lens (the surface having the large curvature on the image side) is the aspheric surface.

In the zoom lens of the invention, "the third group of lenses can be formed with one positive lens." Not only the simple construction of the third group of lenses is advantageous to the miniaturization of the lens system, but also simplification of the mechanism is brought about when the focusing is performed by the third group of lenses.

Concrete embodiments of the zoom lens of the invention will be cited below.

As shown in the figures of the aberrations, the aberration is sufficiently corrected in each embodiment, and it is sufficiently adaptable to a photo detector having three million pixels to five million pixels. That is to say, it is clear that the extremely favorable performance can be secured in such a manner that the zoom lens is formed like the invention, while the sufficient miniaturization and the widening of the angle of view are achieved.

The meanings of each sign in the embodiment are as follows.

f: focal length of entire system
F: F number
ω: half angle of view
R: curvature radius
D: distance between surfaces (including iris surface)
Nd: refractive index
vd: Abbe number
K: conic constant
A4: quartic aspheric coefficient
A6: sextic aspheric coefficient
A8: octic aspheric coefficient
A10: dectic aspheric coefficient
A12: deciquadratic aspheric coefficient
A14: deciquartic aspheric coefficient
A16: decisextic aspheric coefficient
A18: decioctic aspheric coefficient Setting the inverse number of the paraxial curvature radius (paraxial curvature) to C and the height from the optical axis to H, the aspheric surface is defined by the following known equation, and the shape is specified by giving values of the conic constant K and the higher aspheric coefficients A4 to A18.

$$X = CH^2/[1+\sqrt{(1-(1+K)C^2H^2)}] + A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} + A_{18} \cdot H^{18}$$

EMBODIMENT 9 f = 5.97 – 16.87, F = 2.62 – 4.35, ω = 39.20 – 15.56

| SURFACE NUMBER | R | D | Nd | vd | REMARKS |
|---|---|---|---|---|---|
| 01 | 62.725 | 1.20 | 1.77250 | 49.62 | FIRST LENS |
| 02 | 10.255 | 1.26 | | | |
| 03 | 17.180 | 1.50 | 1.74330 | 49.33 | SECOND LENS |
| 04* | 7.758 | 2.91 | | | |
| 05 | 15.536 | 2.56 | 1.71736 | 29.50 | THIRD LENS |
| 06 | 15.536 | VARIABLE (A) | | | |
| 07 | IRIS | 1.00 | | | |
| 08* | 8.589 | 1.70 | 1.83400 | 37.34 | FOURTH LENS |
| 09 | 20.340 | 0.58 | | | |
| 10 | 8.355 | 0.80 | 1.76182 | 26.61 | FIFTH LENS |

-continued

| | | EMBODIMENT 9 | | | |
|---|---|---|---|---|---|
| 11 | 5.0561 | 3.17 | 1.48749 | 70.44 | SIXTH LENS |
| 12 | −15.985 | 0.80 | 1.64769 | 33.84 | SEVENTH LENS |
| 13 | 7.369 | 0.57 | | | |
| 14 | 21.429 | 1.58 | 1.74330 | 49.22 | EIGHTH LENS |
| 15* | −41.619 | VARIABLE (B) | | | |
| 16* | 17.601 | 1.93 | 1.58913 | 61.25 | NINTH LENS |
| 17 | 181.269 | VARIABLE (C) | | | |
| 18 | ∞ | 1.98 | 1.51680 | 64.20 | VARIOUS KINDS OF FILTERS |
| 19 | ∞ | | | | |

ASPHERIC SURFACE; FOURTH SURFACE $K = 0.0, A_4 = -2.88027 \times 10^{-4}, A_6 = 6.01009 \times 10^{-6}, A_8 = -2.79485 \times 10^{-7},$
$A_{10} = 1.38570 \times 10^8, A_{12} = 2.75096 \times 10^{-10}, A_{14} = 1.20000 \times 10^{12},$
$A_{16} = -4.50197 \times 10^{-14}, A_{18} = 4.89891 \times 10^{-16}$

ASPHERIC SURFACE; EIGHTH SURFACE $K = 0.0, A_4 = -5.29387 \times 10^{-5}, A_6 = 8.11971 \times 10^{-7}, A_8 = -8.73056 \times 10^{-8},$
$A_{10} = 2.65984 \times 10^{-9}$

ASPHERIC SURFACE; FIFTEENTH SURFACE $K = 0.0, A_4 = 2.60656 \times 10^{-4}, A_6 = 4.73782 \times 10^{-6}, A_8 = 3.71246 \times 10^{-7},$
$A_{10} = -6.41360 \times 10^{-10}$

ASPHERIC SURFACE; SIXTEENTH SURFACE $K = 0.0, A_4 = -1.09895 \times 10^{-5}, A_6 = 2.57475 \times 10^{-6}, A_8 = -9.80625 \times 10^{-8},$
$A_{10} = 1.86997 \times 10^{-9}$

| | VARIABLE DISTANCE | | |
|---|---|---|---|
| | END OF SHORT FOCUS $f = 5.97$ | INTERMEDIATE FOCAL DISTANCE $f = 10.04$ | END OF LONG FOCUS $f = 10.18$ |
| A | 21.260 | 8.610 | 1.500 |
| B | 3.680 | 8.640 | 17.630 |
| C | 4.427 | 4.268 | 3.098 |

NUMERICAL VALUES OF CONDITIONAL EXPRESSION $(R_{c2}/R_{C4}) = 0.687$

| | EMBODIMENT 10 | | | | |
|---|---|---|---|---|---|
| $f = 5.97 - 16.89, F = 2.62 - 4.56, \omega = 39.18 - 15.54$ | | | | | |
| SURFACE NUMBER | R | D | Nd | vd | REMARKS |
| 01 | 28.580 | 1.20 | 1.77250 | 49.62 | FIRST LENS |
| 02 | 8.268 | 2.09 | | | |
| 03 | 29.590 | 1.20 | 1.80610 | 40.74 | SECOND LENS |
| 04* | 9.261 | 3.24 | | | |
| 05 | 17.404 | 2.11 | 1.76182 | 26.61 | THIRD LENS |
| 06 | 501.306 | VARIABLE (A) | | | |
| 07 | IRIS | 1.00 | | | |
| 08* | 9.217 | 1.90 | 1.83400 | 37.34 | FOURTH LENS |
| 09 | 28.441 | 1.09 | | | |
| 10 | 11.494 | 1.45 | 1.80518 | 25.46 | FIFTH LENS |
| 11 | 5.703 | 3.28 | 1.49700 | 81.61 | SIXTH LENS |
| 12 | −10.031 | 0.80 | 1.62004 | 36.30 | SEVENTH LENS |
| 13 | 9.379 | 0.44 | | | |
| 14 | 24.724 | 1.85 | 1.70154 | 41.15 | EIGHTH LENS |
| 15* | −26.923 | VARIABLE (B) | | | |
| 16* | 20.386 | 1.83 | 1.58913 | 61.25 | NINTH LENS |
| 17 | 220.476 | VARIABLE (C) | | | |

-continued

EMBODIMENT 10

| 18 | ∞ | 1.98 | 1.51680 | 64.20 | VARIOUS KINDS OF FILTERS |
|---|---|---|---|---|---|
| 19 | ∞ | | | | |

ASPHERIC SURFACE; FOURTH SURFACE $K = 0.0, A_4 = -2.9550 \times 10^{-4}, A_6 = -3.47013 \times 10^{-6}, A_8 = -2.75845 \times 10^{-7},$
$A_{10} = -1.89585 \times 10^8, A_{12} = 5.22397 \times 10^{-10}, A_{14} = -2.28012 \times 10^{-12},$
$A_{16} = -1.63935 \times 10^{-13}, A_{18} = 2.2889 \times 10^{-15}$

ASPHERIC SURFACE; EIGHTH SURFACE $K = 0.0, A_4 = -6.58062 \times 10^{-5}, A_6 = 1.14936 \times 10^{-8}, A_8 = -1.26545 \times 10^{-7},$
$A_{10} = 3.79974 \times 10^{-9}$

ASPHERIC SURFACE; FIFTEENTH SURFACE $K = 0.0, A_4 = 2.08131 \times 10^{-4}, A_6 = 4.65854 \times 10^{-6}, A_8 = 2.28057 \times 10^{-7},$
$A_{10} = -2.79019 \times 10^{-9}$

ASPHERIC SURFACE; SIXTEENTH SURFACE $K = 0.0, A_4 = -4.28029 \times 10^{-6}, A_6 = 2.20357 \times 10^{-6}, A_8 = -7.52231 \times 10^{-8},$
$A_{10} = 1.35906 \times 10^{-9}$

VARIABLE DISTANCE

| | END OF SHORT FOCUS f = 5.97 | INTERMEDIATE FOCAL DISTANCE f = 10.05 | END OF LONG FOCUS f = 16.89 |
|---|---|---|---|
| A | 19.290 | 7.420 | 1.510 |
| B | 3.130 | 7.820 | 19.070 |
| C | 5.144 | 5.618 | 3.110 |

NUMERICAL VALUES OF CONDITIONAL EXPRESSION $(R_{c2}/R_{c4}) = 0.608$

EMBODIMENT 11

$f = 5.93 - 16.86, F = 2.80 - 4.67, \omega = 39.18 - 15.54$

| SURFACE NUMBER | R | D | Nd | vd | REMARKS |
|---|---|---|---|---|---|
| 01 | 27.153 | 1.50 | 1.77250 | 49.62 | FIRST LENS |
| 02 | 8.488 | 2.33 | | | |
| 03 | 29.611 | 1.20 | 1.74330 | 49.33 | SECOND LENS |
| 04* | 8.616 | 2.74 | | | |
| 05 | 15.215 | 2.37 | 1.71736 | 29.50 | THIRD LENS |
| 06 | 274.175 | VARIABLE (A) | | | |
| 07 | IRIS | 1.00 | | | |
| 08* | 9.107 | 1.77 | 1.80420 | 46.50 | FOURTH LENS |
| 09 | 57.756 | 1.40 | | | |
| 10 | 10.880 | 0.88 | 1.82027 | 29.70 | FIFTH LENS |
| 11 | 5.494 | 2.41 | 1.48749 | 70.44 | SIXTH LENS |
| 12 | 16.048 | 0.80 | 1.84666 | 23.78 | SEVENTH LENS |
| 13 | 7.345 | 0.59 | | | |
| 14 | 29.391 | 1.60 | 1.77250 | 49.62 | EIGHTH LENS |
| 15* | −27.788 | VARIABLE (B) | | | |
| 16* | 17.406 | 1.88 | 1.58913 | 61.25 | NINTH LENS |
| 17 | 111.481 | VARIABLE (C) | | | |
| 18 | ∞ | 1.98 | 1.51680 | 64.20 | VARIOUS KINDS OF FILTERS |
| 19 | ∞ | | | | |

ASPHERIC SURFACE; FOURTH SURFACE $K = 0.0, A_4 = -2.32229 \times 10^{-4}, A_6 = -6.31837 \times 10^{-6}, A_8 = 4.27101 \times 10^{-7},$
$A_{10} = -2.21703 \times 10^8, A_{12} = 4.75981 \times 10^{-10}, A_{14} = -6.35199 \times 10^{13},$
$A_{16} = -1.36560 \times 10^{-13}, A_{16} = 1.51878 \times 10^{-15}$ -continued

EMBODIMENT 11

ASPHERIC SURFACE; EIGHTH SURFACE $K = 0.0, A_4 = -1.16901 \times 10^{-4}, A_6 = -3.08214 \times 10^{-8}, A_8 = -6.84811 \times 10^{-8},$
$A_{10} = 1.84472 \times 10^{-9}$

ASPHERIC SURFACE; SIXTEENTH SURFACE $K = 0.0, A_4 = -4.24072 \times 10^{-5}, A_6 = 5.78346 \times 10^{-6}, A_8 = -2.30527 \times 10^{-7},$
$A_{10} = 3.88547 \times 10^{-9}$

| VARIABLE DISTANCE | | |
| --- | --- | --- |
| END OF SHORT FOCUS $f = 5.93$ | INTERMEDIATE FOCAL DISTANCE $f = 10.04$ | END OF LONG FOCUS $f = 16.86$ |
| A  20.290 | 8.280 | 1.520 |
| B  4.070 | 9.240 | 18.250 |
| C  4.205 | 4.046 | 3.131 |

NUMERICAL VALUES OF CONDITIONAL EXPRESSION $(R_{c2}/R_{C4}) = 0.748$

EMBODIMENT 12

$f = 5.98 - 16.89, F = 2.82 - 4.82, \omega = 39.16 - 15.52$

| SURFACE NUMBER | R | D | Nd | vd | REMARKS |
| --- | --- | --- | --- | --- | --- |
| 01 | 57.661 | 1.20 | 1.80420 | 46.50 | FIRST LENS |
| 02 | 9.772 | 1.42 | | | |
| 03 | 18.132 | 1.20 | 1.80610 | 40.74 | SECOND LENS |
| *04 | 7.275 | 2.98 | | | |
| 05 | 15.576 | 2.55 | 1.76182 | 26.61 | THIRD LENS |
| 06 | ∞ | VARIABLE (A) | | | |
| 07 | IRIS | 1.00 | | | |
| 08* | 9.421 | 1.76 | 1.80610 | 40.73 | FOURTH LENS |
| 09 | 30.094 | 0.66 | | | |
| 10 | 7.615 | 1.26 | 1.84666 | 23.78 | FIFTH LENS |
| 11 | 4.733 | 2.60 | 1.48749 | 70.44 | SIXTH LENS |
| 12 | 14.515 | 0.80 | 1.76182 | 26.61 | SEVENTH LENS |
| 13 | 6.136 | 0.47 | | | |
| 14 | 15.688 | 1.62 | 1.51680 | 64.20 | EIGHTH LENS |
| 15* | -26.089 | VARIABLE (B) | | | |
| 16* | 17.208 | 1.95 | 1.58913 | 61.25 | NINTH LENS |
| 17 | 639.864 | VARIABLE (C) | | | |
| 18 | ∞ | 1.98 | 1.51680 | 64.20 | VARIOUS KINDS OF FILTERS |
| 19 | ∞ | | | | |

ASPHERIC SURFACE; FOURTH SURFACE $K = 0.0, A_4 = -3.51459 \times 10^{-4}, A_6 = -8.13580 \times 10^{-6}, A_8 = 4.08027 \times 10^{-7},$
$A_{10} = -2.24087 \times 10^{-8}, A_{12} = 4.71948 \times 10^{-10}, A_{14} = -8.86171 \times 10^{-13},$
$A_{16} = -1.42043 \times 10^{-13}, A_{16} = 1.59011 \times 10^{-15}$

ASPHERIC SURFACE; EIGHTH SURFACE $K = 0.0, A_4 = -7.63659 \times 10^{-5}, A_6 = 6.37036 \times 10^{-7}, A_8 = -1.16821 \times 10^{-7},$
$A_{10} = 3.74070 \times 10^{-9}$

ASPHERIC SURFACE; FIFTEENTH SURFACE $K = 0.0, A_4 = 1.00867 \times 10^{-4}, A_6 = 2.91679 \times 10^{-7}, A_8 = 3.63439 \times 10^{-7},$
$A_{10} = 9.13541 \times 10^{-9}$

ASPHERIC SURFACE; SIXTEENTH SURFACE $K = 0.0, A_4 = -3.89759 \times 10^{-5}, A_6 = 5.94128 \times 10^{-6}, A_8 = -2.59750 \times 10^{-7},$
$A_{10} = 4.43344 \times 10^{-9}$

EMBODIMENT 12

VARIABLE DISTANCE

| | END OF SHORT FOCUS $f = 5.98$ | INTERMEDIATE FOCAL DISTANCE $f = 10.05$ | END OF LONG FOCUS $f = 16.89$ |
|---|---|---|---|
| A | 18.670 | 8.190 | 1.500 |
| B | 4.390 | 10.260 | 18.590 |
| C | 3.741 | 3.094 | 3.120 |

NUMERICAL VALUES OF CONDITIONAL EXPRESSION $(R_{c2}/R_{c4}) = 0.771$

EMBODIMENT 13

$f = 5.97 - 16.89, F = 2.62 - 4.50, \omega = 39.22 - 15.50$

| SURFACE NUMBER | R | D | Nd | vd | REMARKS |
|---|---|---|---|---|---|
| 01 | 71.467 | 1.20 | 1.77250 | 49.62 | FIRST LENS |
| 02 | 10.166 | 1.29 | | | |
| 03 | 17.614 | 1.20 | 1.80610 | 40.74 | SECOND LENS |
| 04* | 7.308 | 3.72 | | | |
| 05 | 17.607 | 2.40 | 1.76182 | 26.61 | THIRD LENS |
| 06 | ∞ | VARIABLE (A) | | | |
| 07 | IRIS | 1.00 | | | |
| 08* | 22.999 | 1.64 | 1.69350 | 53.34 | FOURTH LENS |
| 09 | −70.369 | 0.10 | | | |
| 10 | 6.647 | 2.27 | 1.80518 | 25.46 | FIFTH LENS |
| 11 | 4.284 | 3.01 | 1.48749 | 70.44 | SIXTH LENS |
| 12 | 217.982 | 0.80 | 1.80610 | 33.27 | SEVENTH LENS |
| 13 | 6.876 | 0.48 | | | |
| 14 | 22.531 | 2.24 | 1.48749 | 70.44 | EIGHTH LENS |
| 15* | −12.617 | VARIABLE (B) | | | |
| 16* | 15.630 | 2.09 | 1.48749 | 70.44 | NINTH LENS |
| 17 | −9260.106 | VARIABLE (C) | | | |
| 18 | ∞ | 1.98 | 1.51680 | 64.20 | VARIOUS KINDS OF FILTERS |
| 19 | ∞ | | | | |

ASPHERIC SURFACE; FOURTH SURFACE $K = 0.0, A_4 = -3.50415 \times 10^{-4}, A_6 = -7.96879 \times 10^{-6}, A_8 = 4.26960 \times 10^{-7},$
$A_{10} = -2.31083 \times 10^{-8}, A_{12} = 4.71718 \times 10^{-10}, A_{14} = -5.88042 \times 10^{13-},$
$A_{16} = -1.34984 \times 10^{-13}, A_{18} = 1.38887 \times 10^{-15}$

ASPHERIC SURFACE; EIGHTH SURFACE $K = 0.0, A_4 = -5.40074 \times 10^{-5}, A_6 = 2.68871 \times 10^{-7}, A_8 = -4.69765 \times 10^{-8},$
$A_{10} = 1.63234 \times 10^{-9}$

ASPHERIC SURFACE; FIFTEENTH SURFACE $K = 0.0, A_4 = 4.35436 \times 10^{-6}, A_6 = -2.32623 \times 10^{-6}, A_8 = 1.07805 \times 10^{-7},$
$A_{10} = -1.44986 \times 10^{-8}$

ASPHERIC SURFACE; SIXTEENTH SURFACE $K = 0.0, A_4 = -4.43447 \times 10^{-5}, A_6 = 6.39748 \times 10^{-6}, A_8 = -2.82100 \times 10^{-7},$
$A_{10} = 4.82472 \times 10^{-9}$

EMBODIMENT 13

VARIABLE DISTANCE

|   | END OF SHORT FOCUS $f = 5.97$ | INTERMEDIATE FOCAL DISTANCE $f = 10.05$ | END OF LONG FOCUS $f = 16.89$ |
|---|---|---|---|
| A | 19.290 | 7.510 | 1.500 |
| B | 3.690 | 8.580 | 19.167 |
| C | 4.287 | 4.703 | 3.046 |

NUMERICAL VALUES OF CONDITIONAL EXPRESSION $(R_{c2}/R_{C4}) = 0.623$

EMBODIMENT 14

$f = 5.97 - 16.87$, $F = 2.60 - 4.30$, $\omega = 39.22 - 15.54$

| SURFACE NUMBER | R | D | Nd | vd | REMARKS |
|---|---|---|---|---|---|
| 01 | 63.096 | 1.20 | 1.74330 | 49.22 | FIRST LENS |
| 02 | 9.022 | 1.62 | | | |
| 03 | 16.486 | 1.20 | 1.80610 | 40.74 | SECOND LENS |
| 04* | 6.973 | 2.71 | | | |
| 05 | 14.807 | 2.46 | 1.75520 | 27.53 | THIRD LENS |
| 06 | ∞ | VARIABLE (A) | | | |
| 07 | IRIS | 1.00 | | | |
| 08* | 10.963 | 1.59 | 1.81550 | 44.54 | FOURTH LENS |
| 09 | 39.731 | 0.19 | | | |
| 10 | 7.500 | 1.00 | 1.83400 | 37.34 | FIFTH LENS |
| 11 | 5.000 | 2.32 | 1.48749 | 70.44 | SIXTH LENS |
| 12 | 16.948 | 0.86 | 1.84666 | 23.78 | SEVENTH LENS |
| 13 | 6.625 | 0.54 | | | |
| 14 | 21.195 | 1.98 | 1.48749 | 70.44 | EIGHTH LENS |
| 15* | −13.271 | VARIABLE (B) | | | |
| 16* | 12.921 | 1.83 | 1.51680 | 64.20 | NINTH LENS |
| 17 | 37.822 | VARIABLE (C) | | | |
| 18 | ∞ | 1.98 | 1.51680 | 64.20 | VARIOUS KINDS OF FILTERS |
| 19 | ∞ | | | | |

ASPHERIC SURFACE; FOURTH SURFACE $K = 0.0$, $A_4 = -4.18878 \times 10^{-4}$, $A_6 = -5.57084 \times 10^{-6}$, $A_8 = 2.33800 \times 10^{-8}$, $A_{10} = -4.13692 \times 10^{9}$, $A_{12} = 8.10103 \times 10^{-11}$, $A_{14} = -3.20280 \times 10^{-12}$, $A_{16} = 8.61126 \times 10^{-14}$, $A_{18} = -1.22318 \times 10^{-15}$

ASPHERIC SURFACE; EIGHTH SURFACE $K = 0.0$, $A_4 = -7.69893 \times 10^{-5}$, $A_6 = 1.97480 \times 10^{-7}$, $A_8 = -6.39629 \times 10^{-8}$, $A_{10} = 1.50880 \times 10^{-9}$

ASPHERIC SURFACE; FIFTEENTH SURFACE $K = 0.0$, $A_4 = -7.59877 \times 10^{-5}$, $A_6 = -1.20101 \times 10^{-5}$, $A_8 = 6.80472 \times 10^{-7}$, $A_{10} = -5.79809 \times 10^{-8}$

ASPHERIC SURFACE; SIXTEENTH SURFACE $K = 0.0$, $A_4 = -5.31574 \times 10^{-5}$, $A_6 = 5.73963 \times 10^{-6}$, $A_8 = -3.63619 \times 10^{-7}$, $A_{10} = 1.26225 \times 10^{-8}$, $A_{12} = -1.64982 \times 10^{-10}$

EMBODIMENT 14

VARIABLE DISTANCE

| | END OF SHORT FOCUS<br>f = 5.97 | INTERMEDIATE FOCAL DISTANCE<br>f = 10.04 | END OF LONG FOCUS<br>f = 16.87 |
|---|---|---|---|
| A | 19.780 | 8.290 | 1.500 |
| B | 5.460 | 10.890 | 19.928 |
| C | 3.893 | 3.715 | 3.321 |

NUMERICAL VALUES OF CONDITIONAL EXPRESSION $(R_{c2}/R_{C4}) = 0.755$

EMBODIMENT 15

$f = 5.97 - 16.88, F = 2.81 - 4.66, \omega = 39.21 - 15.54$

| SURFACE NUMBER | R | D | Nd | vd | REMARKS |
|---|---|---|---|---|---|
| 01 | 55.186 | 1.20 | 1.77250 | 49.62 | FIRST LENS |
| 02 | 9.138 | 1.59 | | | |
| 03 | 16.569 | 1.20 | 1.80610 | 40.74 | SECOND LENS |
| 04* | 7.001 | 2.61 | | | |
| 05 | 14.054 | 2.57 | 1.72825 | 28.32 | THIRD LENS |
| 06 | −6480.584 | VARIABLE (A) | | | |
| 07 | IRIS | 1.00 | | | |
| 08* | 12.548 | 1.59 | 1.80610 | 40.73 | FOURTH LENS |
| 09 | 93.134 | 1.12 | | | |
| 10 | 7.535 | 1.00 | 1.67270 | 32.17 | FIFTH LENS |
| 11 | 5.016 | 2.38 | 1.48749 | 70.44 | SIXTH LENS |
| 12 | 21.358 | 0.80 | 1.80518 | 25.46 | SEVENTH LENS |
| 13 | 6.355 | 0.63 | | | |
| 14 | 39.415 | 1.91 | 1.48749 | 70.44 | EIGHTH LENS |
| 15* | −12.173 | VARIABLE (B) | | | |
| 16* | 14.553 | 1.90 | 1.51680 | 64.20 | NINTH LENS |
| 17 | 80.138 | VARIABLE (C) | | | |
| 18 | ∞ | 1.98 | 1.51680 | 64.20 | VARIOUS KINDS OF FILTERS |
| 19 | ∞ | | | | |

ASPHERIC SURFACE; FOURTH SURFACE $K = 0.0, A_4 = -3.95793 \times 10^{-4}, A_6 = -5.46578 \times 10^{-6}, A_8 = 2.46770 \times 10^{-8},$
$A_{10} = -4.03062 \times 10^{-9}, A_{12} = 8.48853 \times 10^{-11}, A_{14} = -3.59858 \times 10^{-12},$
$A_{16} = 9.71936 \times 10^{-14}, A_{18} = -1.29965 \times 10^{-15}$

ASPHERIC SURFACE; EIGHTH SURFACE $K = 0.0, A_4 = -7.11513 \times 10^{-5}, A_6 = 2.25641 \times 10^{-7}, A_8 = -2.93083 \times 10^{-8},$
$A_{10} = 5.82303 \times 10^{-10}$

ASPHERIC SURFACE; FIFTEENTH SURFACE $K = 0.0, A_4 = -6.85138 \times 10^{-5}, A_6 = -6.23316 \times 10^{-6}, A_8 = 4.84453 \times 10^{-8},$
$A_{10} = -2.39206 \times 10^{-8}$

ASPHERIC SURFACE; SIXTEENTH SURFACE $K = 0.0, A_4 = -4.26984 \times 10^{-5}, A_6 = 6.66642 \times 10^{-6}, A_8 = -4.21681 \times 10^{-7},$
$A_{10} = 1.42976 \times 10^{-8}, A_{12} = -1.82438 \times 10^{-10}$ -continued

EMBODIMENT 15

VARIABLE DISTANCE

| | END OF<br>SHORT FOCUS<br>f = 5.97 | INTERMEDIATE<br>FOCAL DISTANCE<br>f = 10.04 | END OF<br>LONG FOCUS<br>f = 16.88 |
|---|---|---|---|
| A | 19.620 | 8.000 | 1.500 |
| B | 5.130 | 10.260 | 19.820 |
| C | 3.985 | 4.068 | 3.162 |

NUMERICAL VALUES OF CONDITIONAL EXPRESSION $(R_{c2}/R_{c4}) = 0.789$

Figure 42:
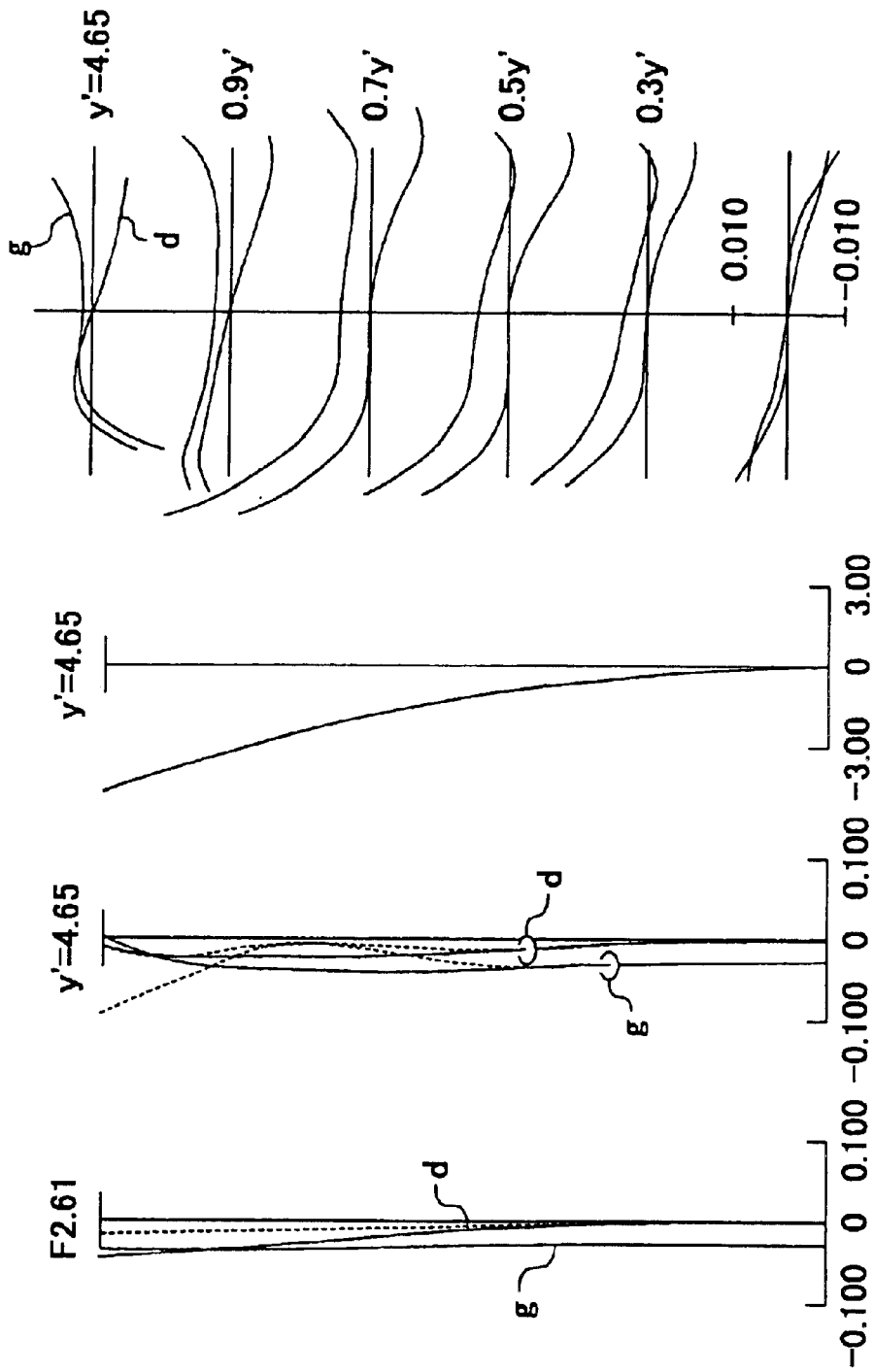
FIG. 42 is a view of an aberration curve at the end of the short focus of the zoom lens of EMBODIMENT 9.
Figure 43:
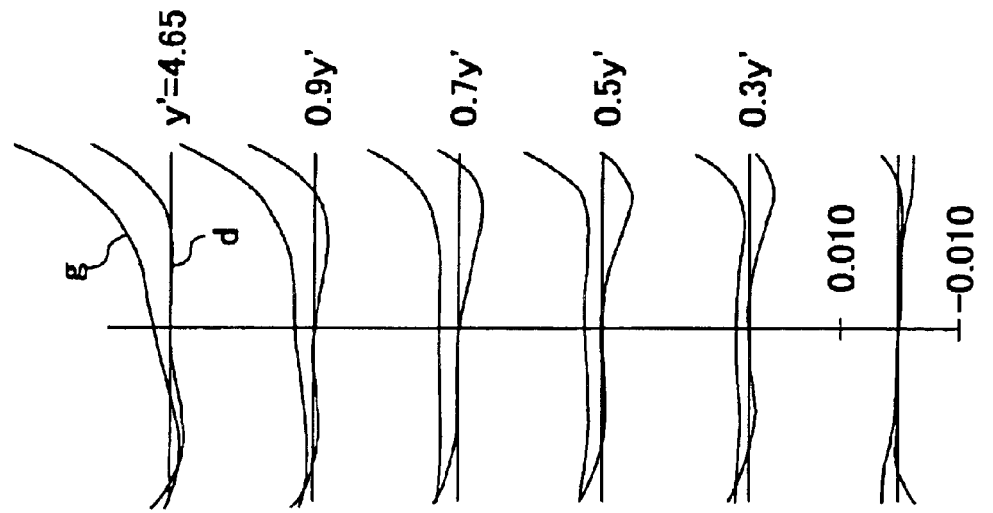
FIG. 43 is a view of the aberration curve at the intermediate focal length of the zoom lens of EMBODIMENT 9.
Figure 43:
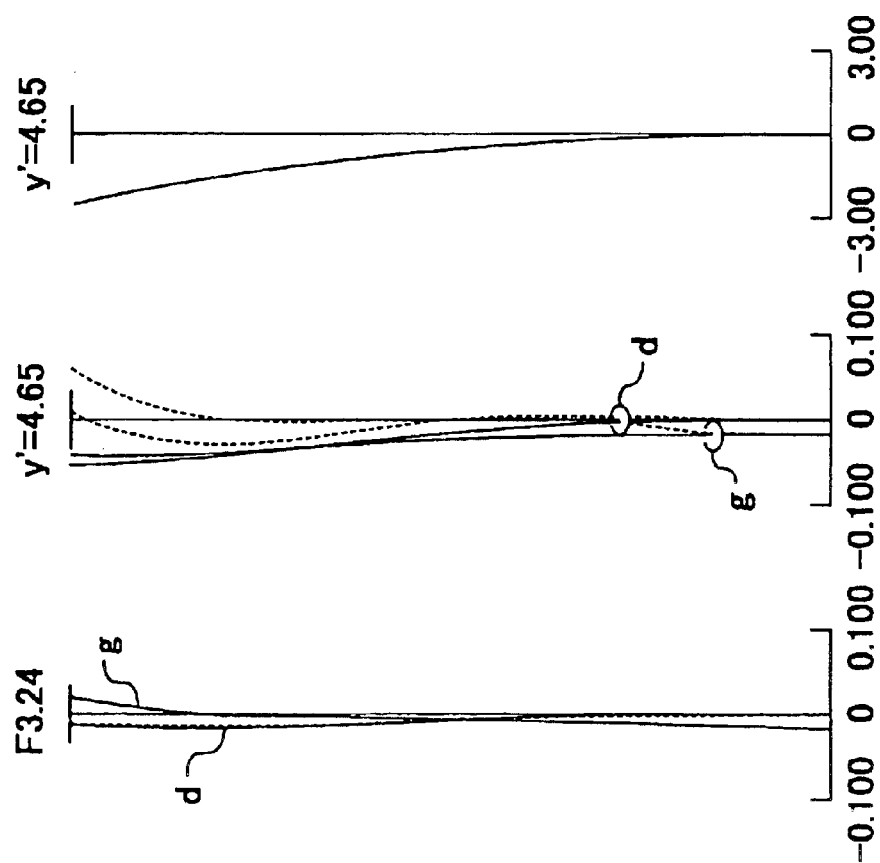
Figure 44:
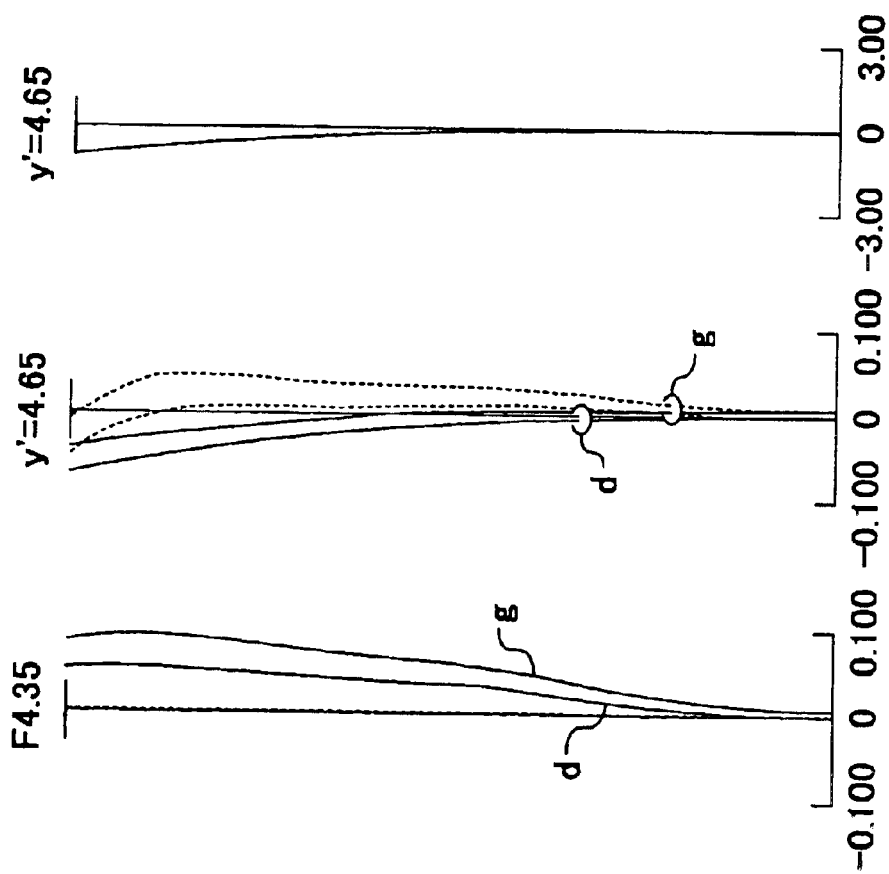
FIG. 44 is a view of the aberration curve at the end of the long focus of the zoom lens of EMBODIMENT 9.

FIGS. 42 to 44 show the aberration curve of the zoom lens of EMBODIMENT 9. FIG. 42 is the aberration curve at the end of the short focus of the zoom lens of EMBODIMENT 9, FIG. 43 is the aberration curve at the intermediate focal length, and FIG. 44 is the aberration curve at the end of the long focus respectively.

Figure 45:
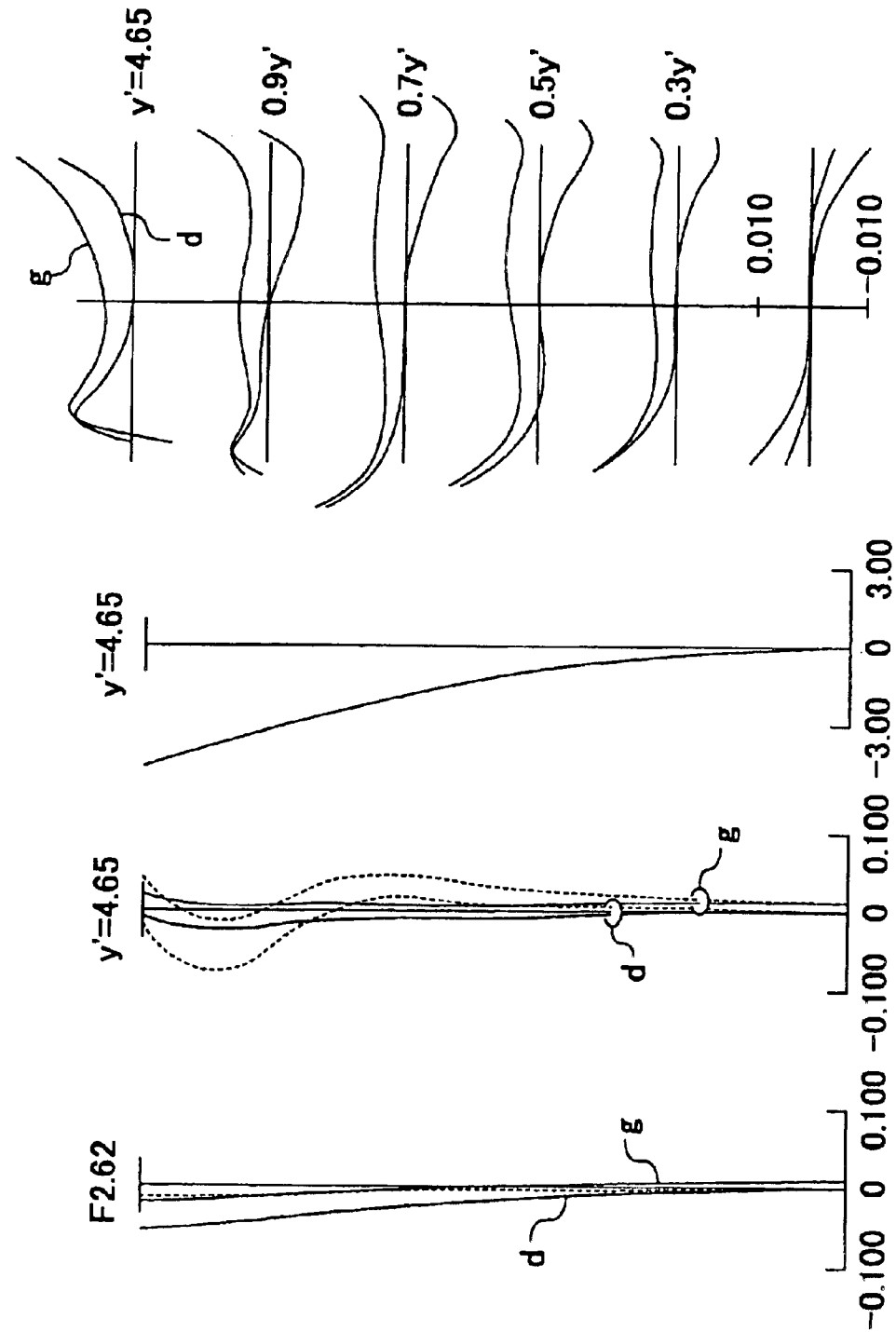
FIG. 45 is a view of an aberration curve at the end of the short focus of the zoom lens of EMBODIMENT 10.
Figure 46:
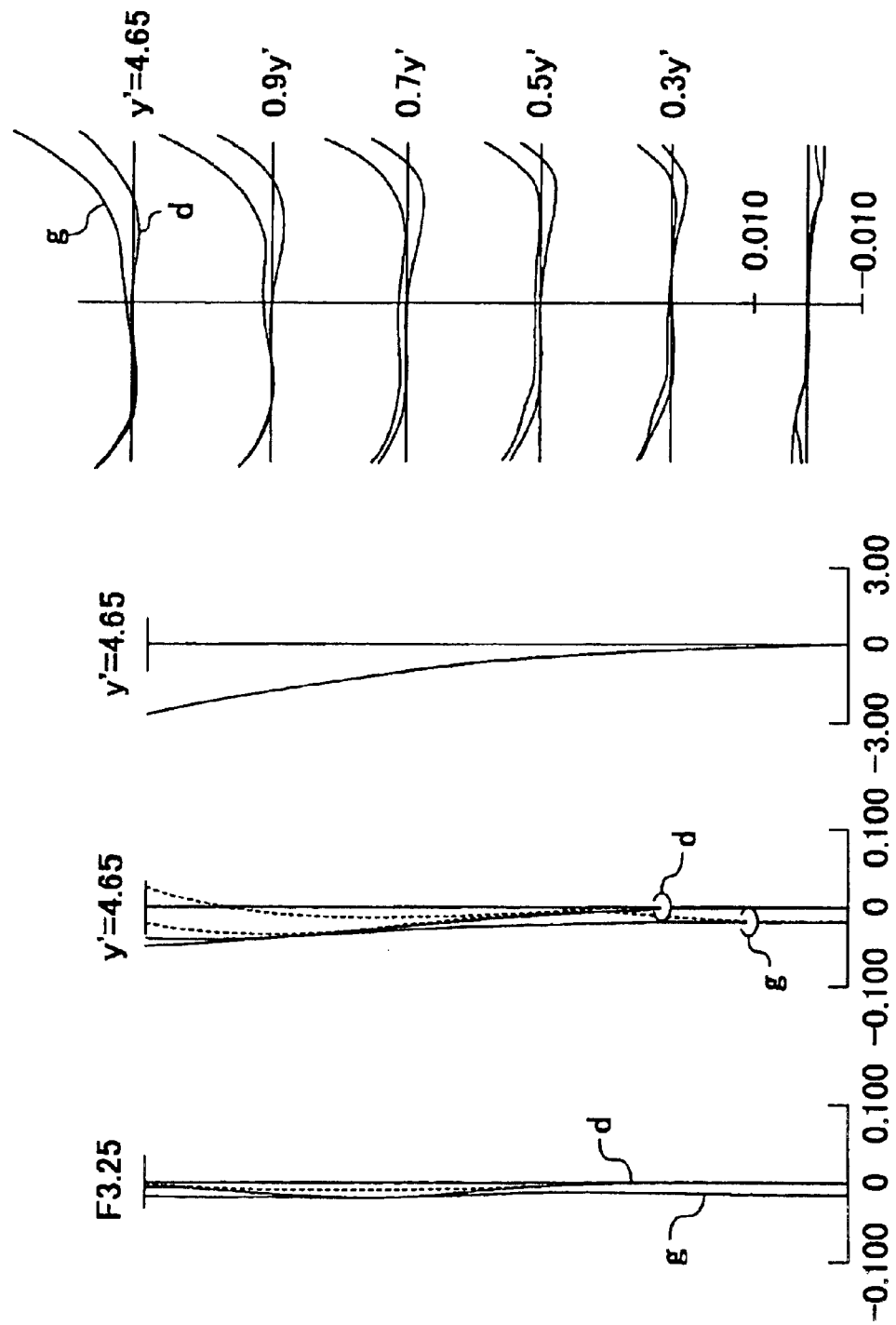
FIG. 46 is a view of the aberration curve at the intermediate focal length of the zoom lens of EMBODIMENT 10.
Figure 47:
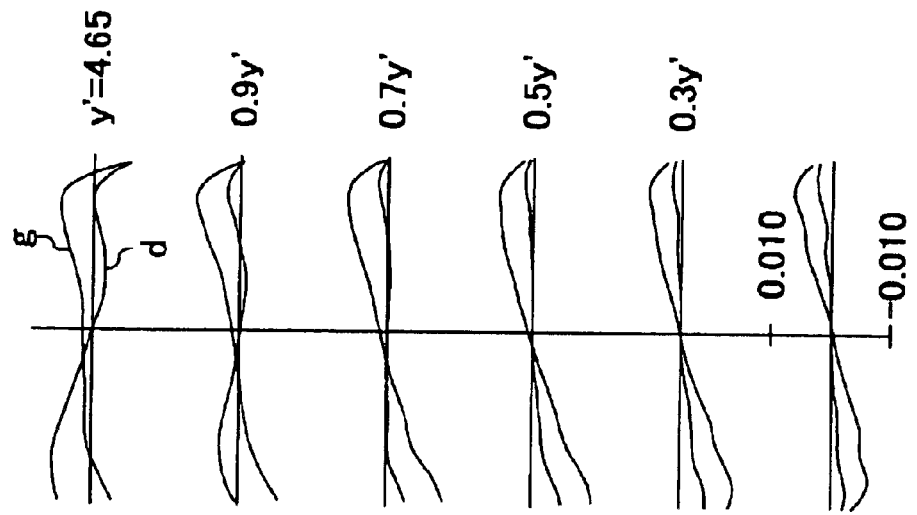
FIG. 47 is a view of the aberration curve at the end of the long focus of the zoom lens of EMBODIMENT 10.
Figure 47:
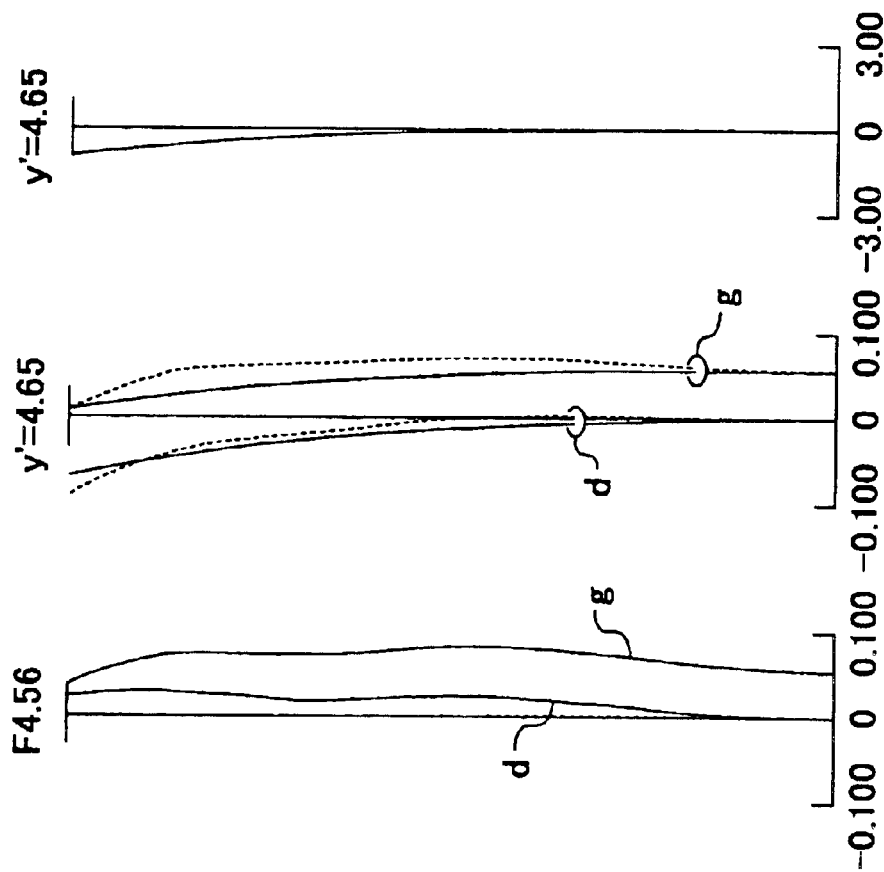

FIGS. 45 to 47 show the aberration curve of the zoom lens of EMBODIMENT 10. FIG. 45 is the aberration curve at the end of the short focus of the zoom lens of EMBODIMENT 10, FIG. 46 is the aberration curve at the intermediate focal length, and FIG. 47 is the aberration curve at the end of the long focus respectively.

Figure 48:
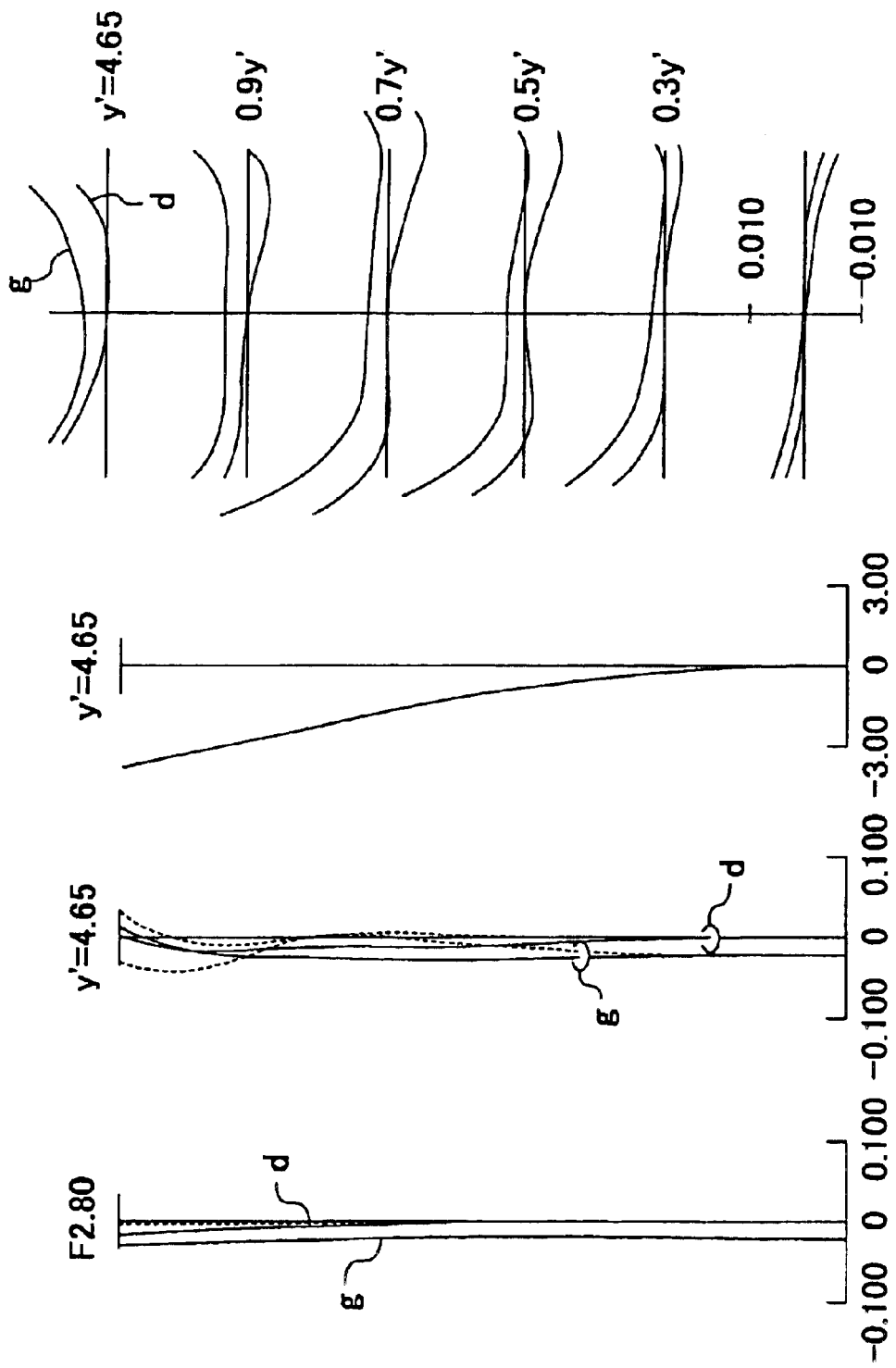
FIG. 48 is a view of an aberration curve at the end of the short focus of the zoom lens of EMBODIMENT 11.
Figure 49:
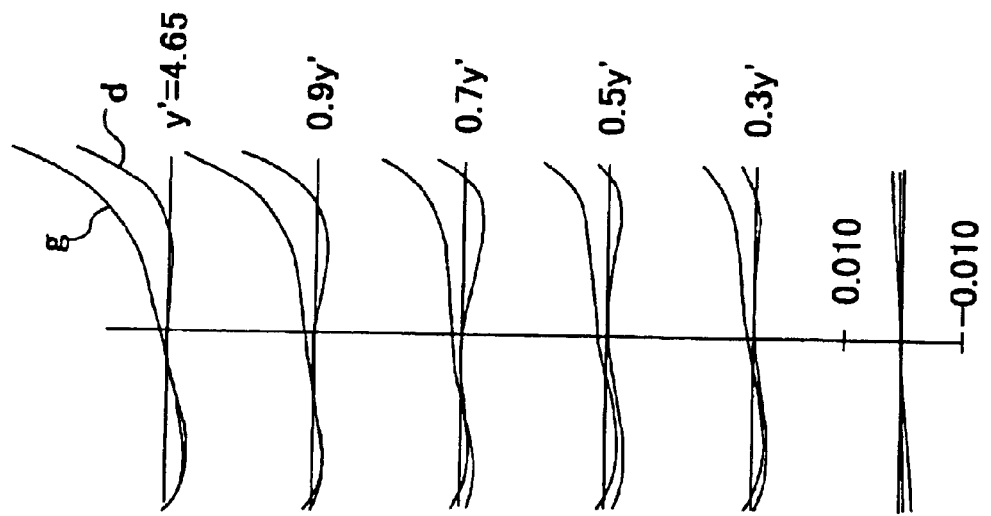
FIG. 49 is a view of the aberration curve at the intermediate focal length of the zoom lens of EMBODIMENT 11.
Figure 49:
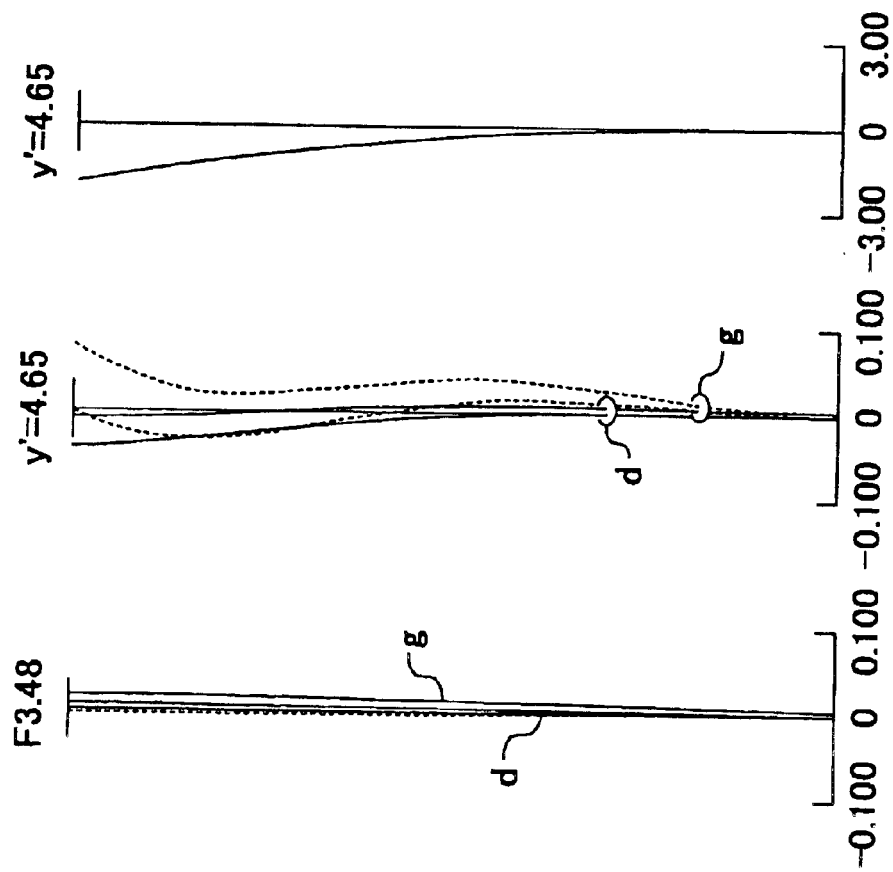
Figure 50:
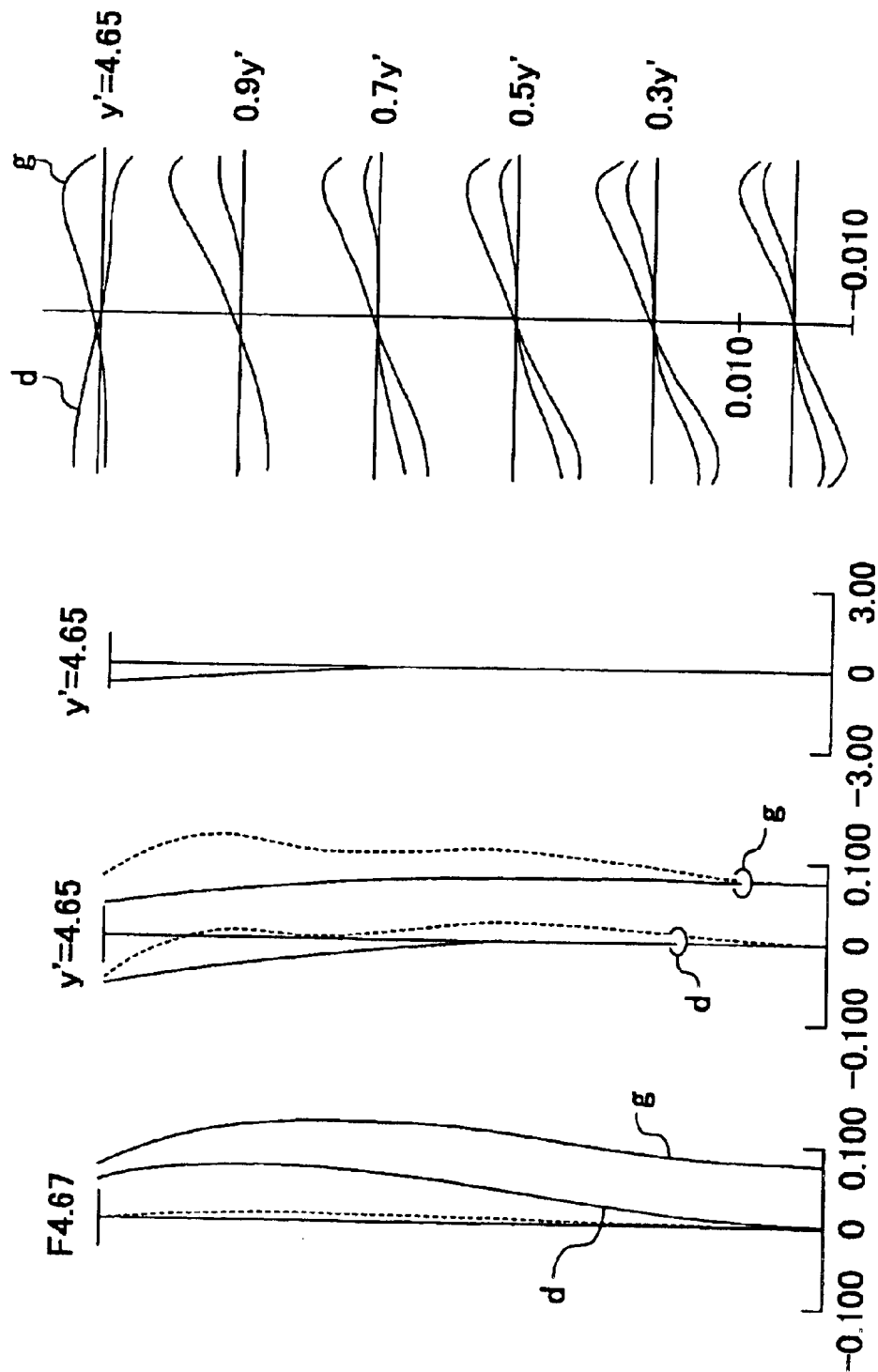
FIG. 50 is a view of the aberration curve at the end of the long focus of the zoom lens of EMBODIMENT 11.

FIGS. 48 to 50 show the aberration curve of the zoom lens of EMBODIMENT 11. FIG. 48 is the aberration curve at the end of the short focus of the zoom lens of EMBODIMENT 11, FIG. 49 is the aberration curve at the intermediate focal length, and FIG. 50 is the aberration curve at the end of the long focus respectively.

Figure 51:
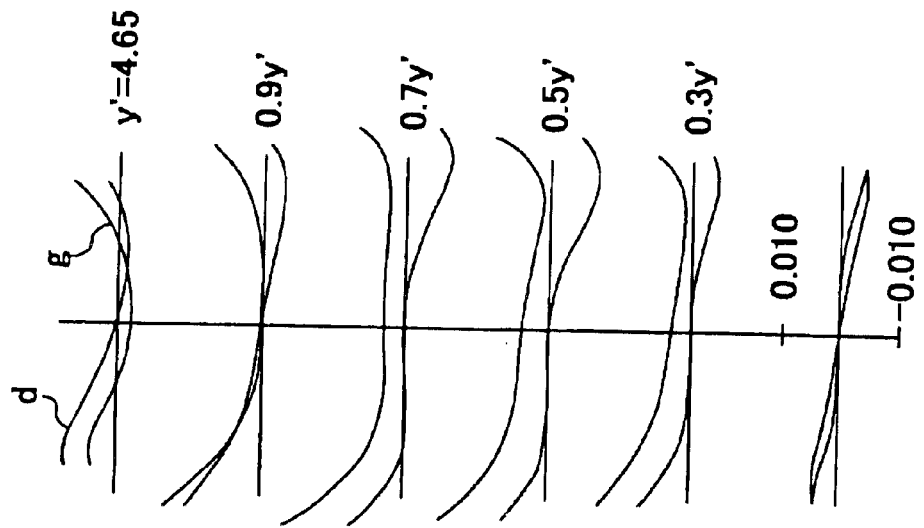
FIG. 51 is a view of an aberration curve at the end of the short focus of the zoom lens of EMBODIMENT 12.
Figure 51:
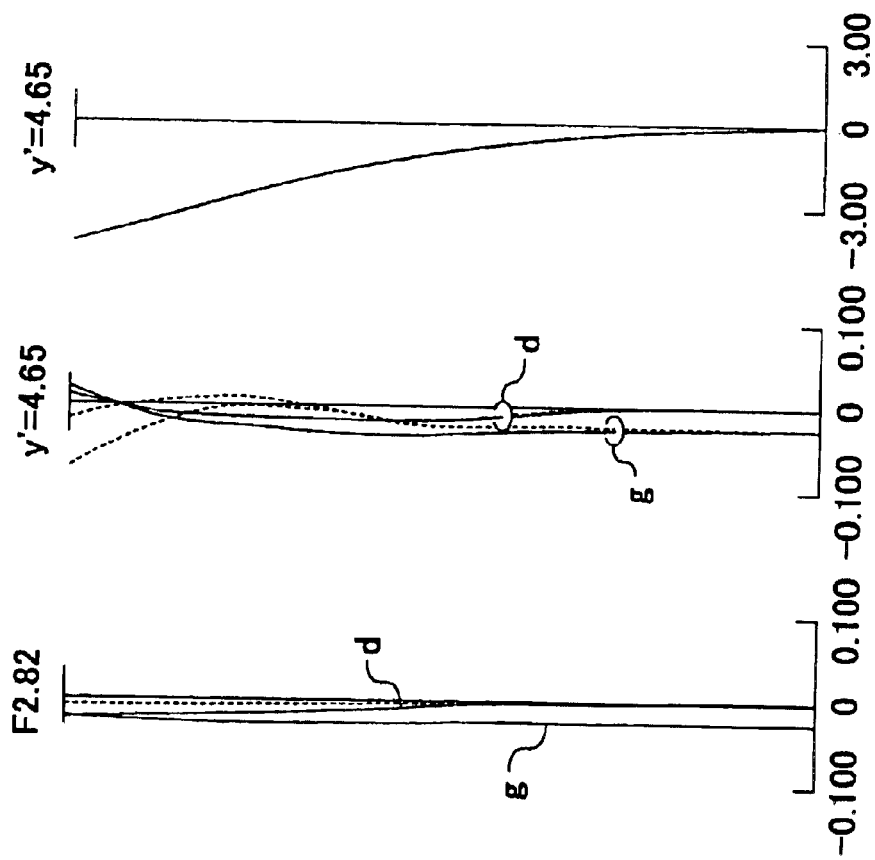
Figure 52:
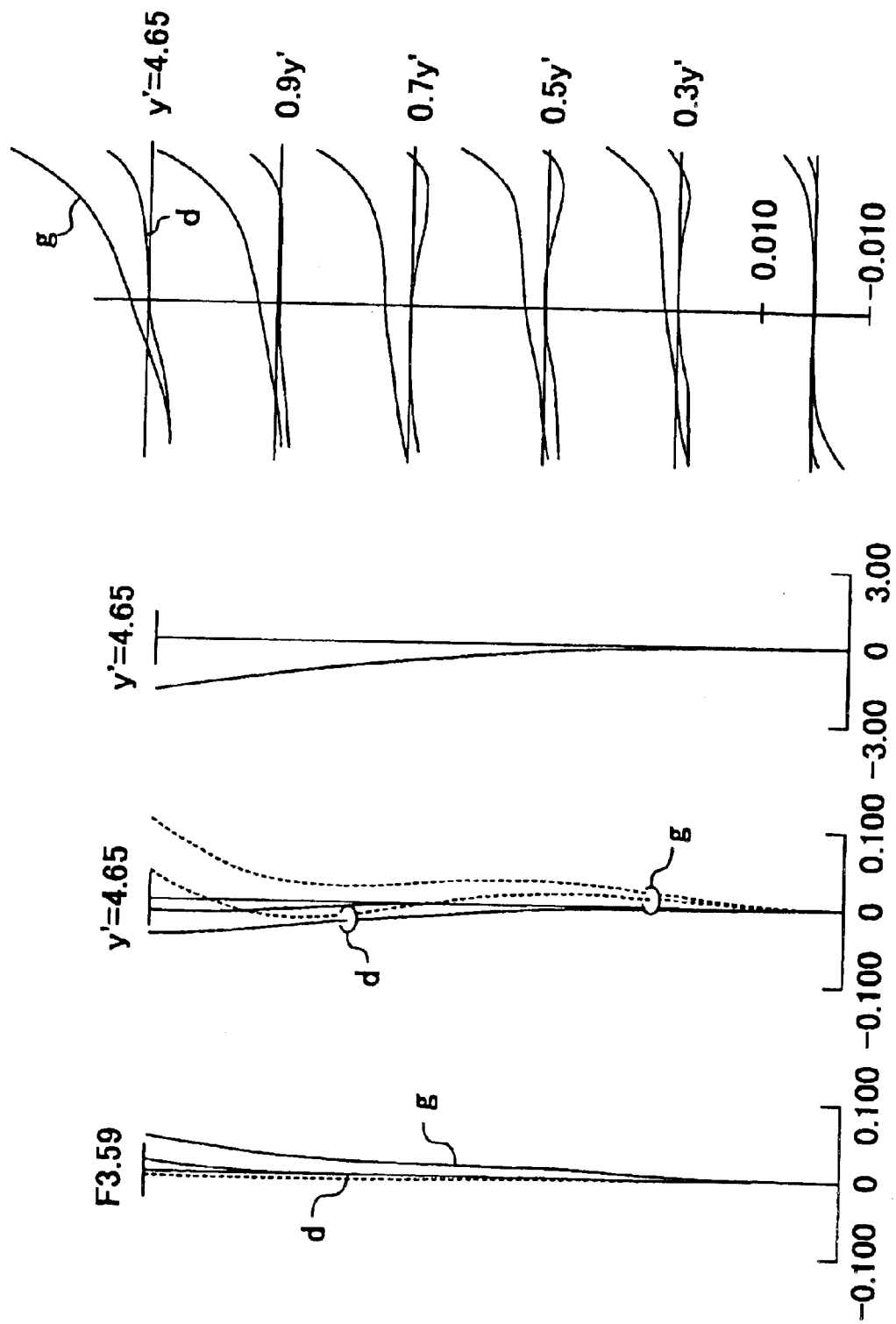
FIG. 52 is a view of the aberration curve at the intermediate focal length of the zoom lens of EMBODIMENT 12.
Figure 53:
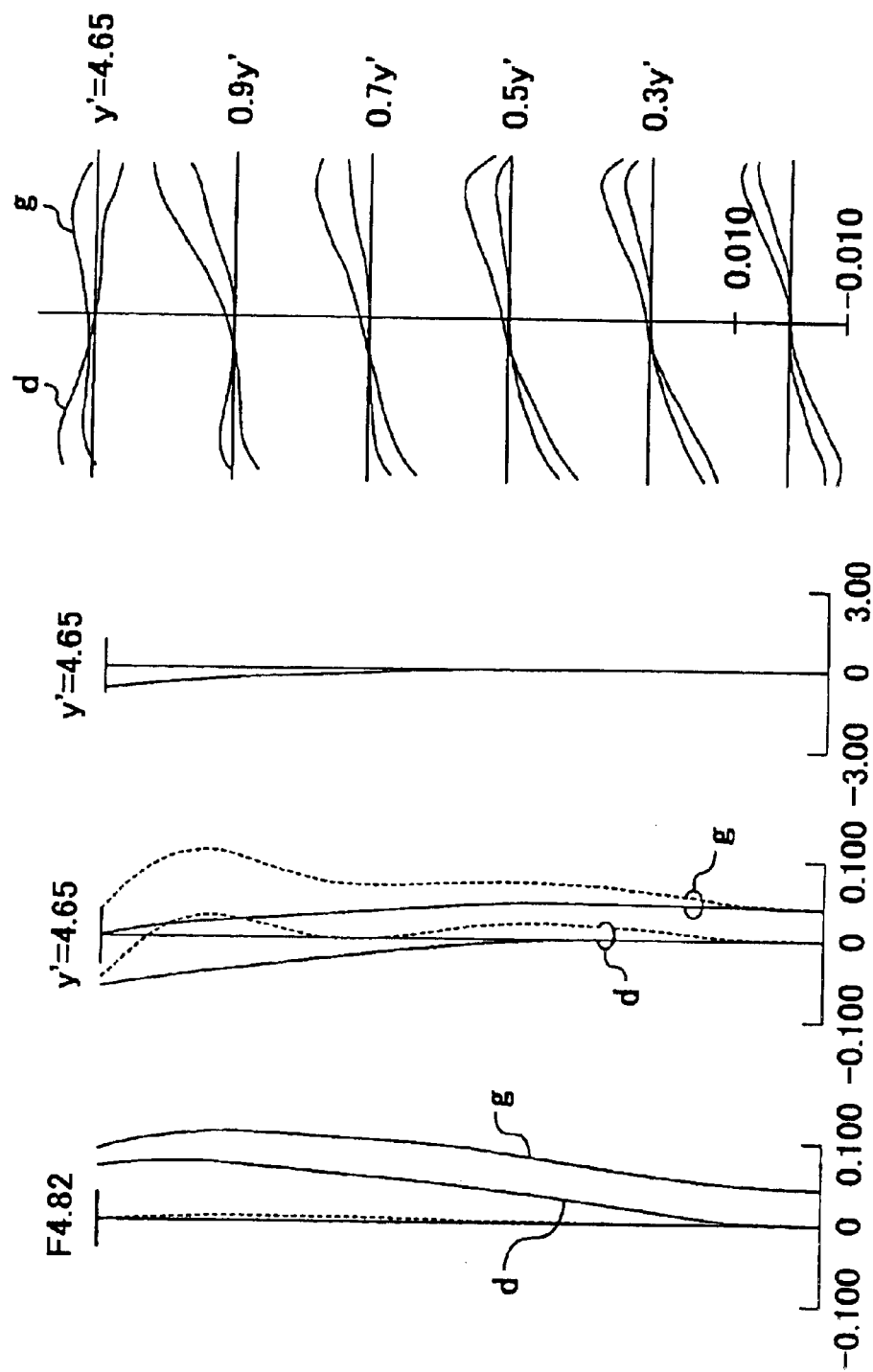
FIG. 53 is a view of the aberration curve at the end of the long focus of the zoom lens of EMBODIMENT 12.

FIGS. 51 to 53 show the aberration curve of the zoom lens of EMBODIMENT 12. FIG. 51 is the aberration curve at the end of the short focus of the zoom lens of EMBODIMENT 12, FIG. 52 is the aberration curve at the intermediate focal length, and FIG. 53 is the aberration curve at the end of the long focus respectively.

Figure 54:
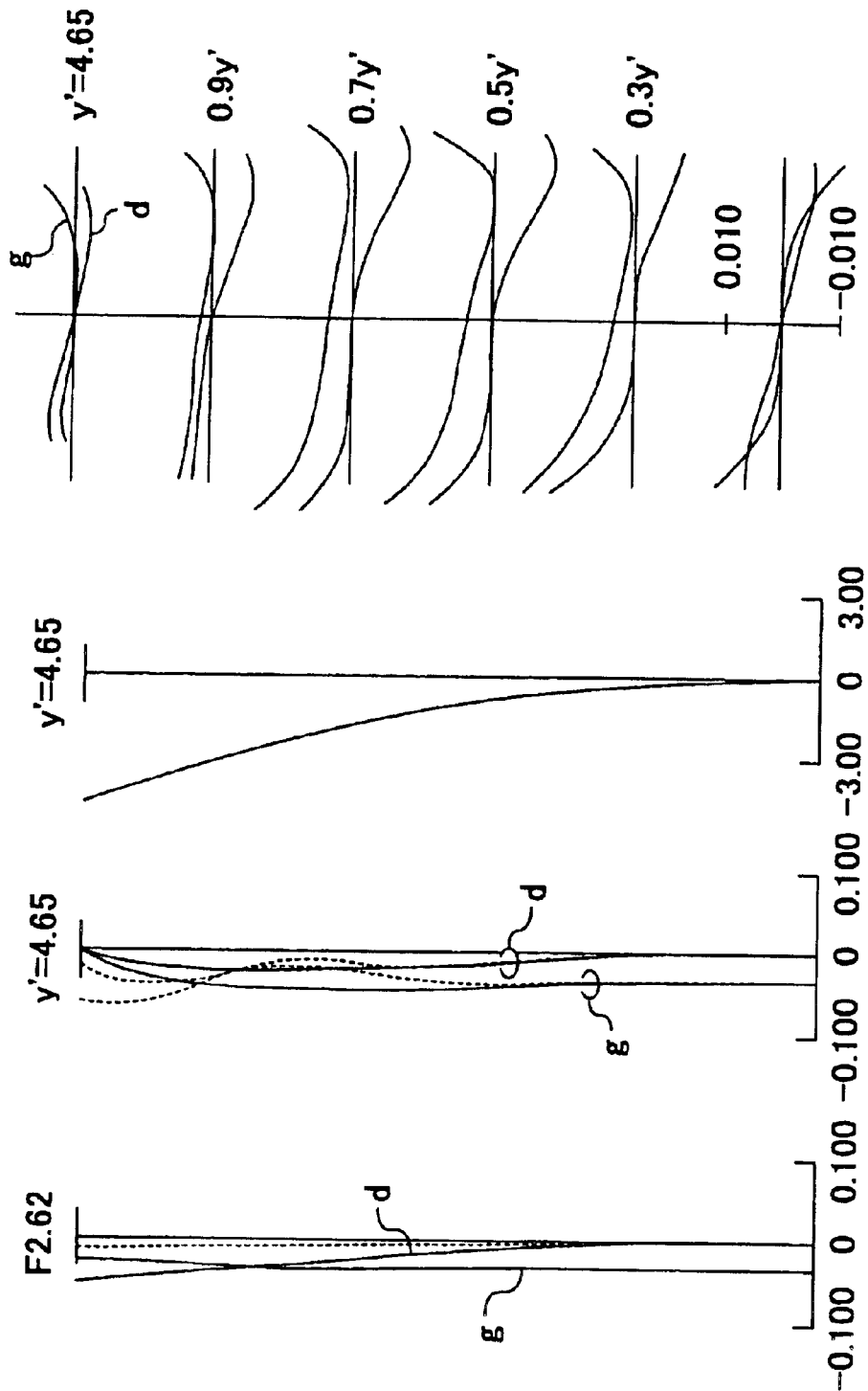
FIG. 54 is a view of an aberration curve at the end of the short focus of the zoom lens of EMBODIMENT 13.
Figure 55:
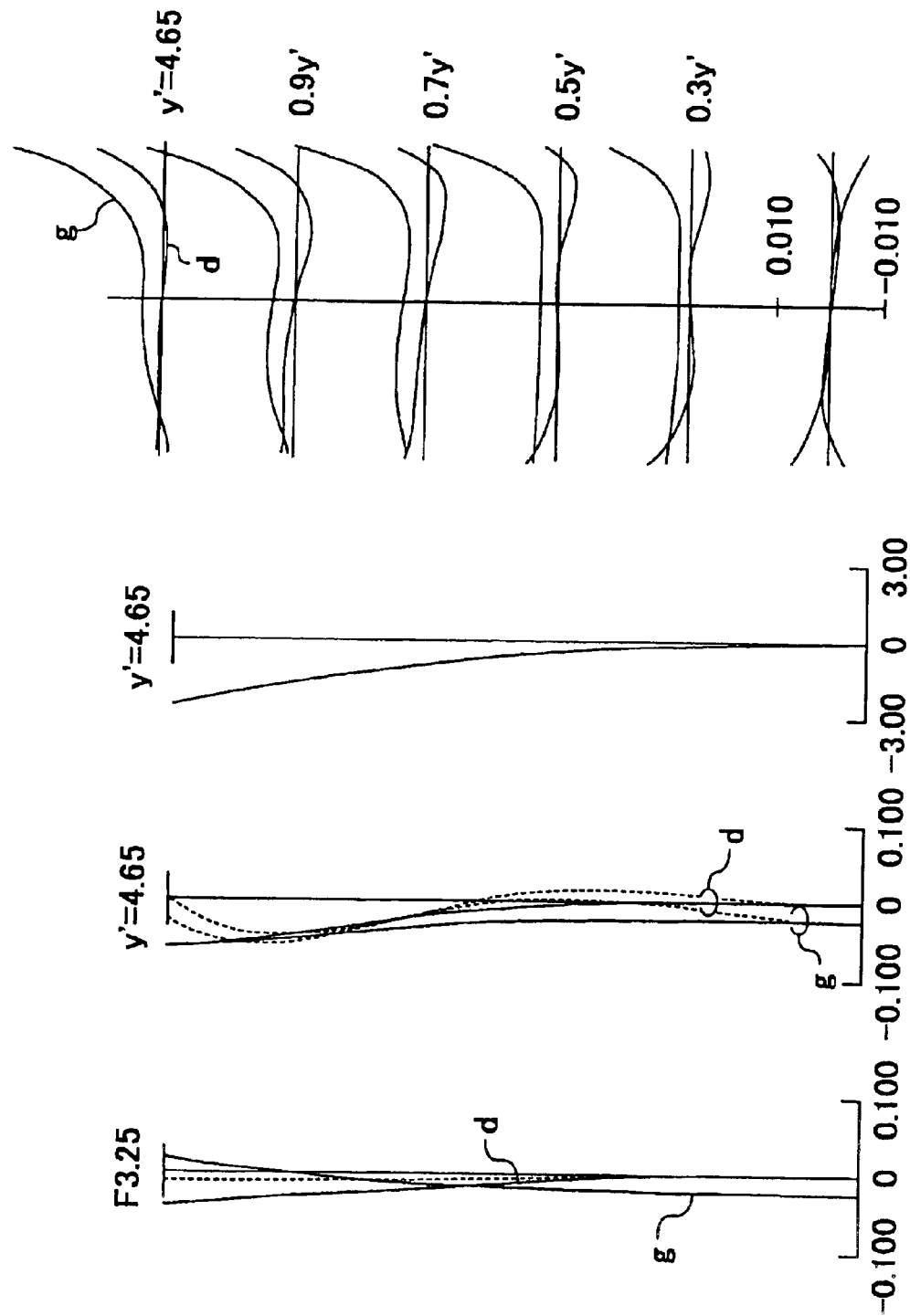
FIG. 55 is a view of the aberration curve at the intermediate focal length of the zoom lens of EMBODIMENT 13.
Figure 56:
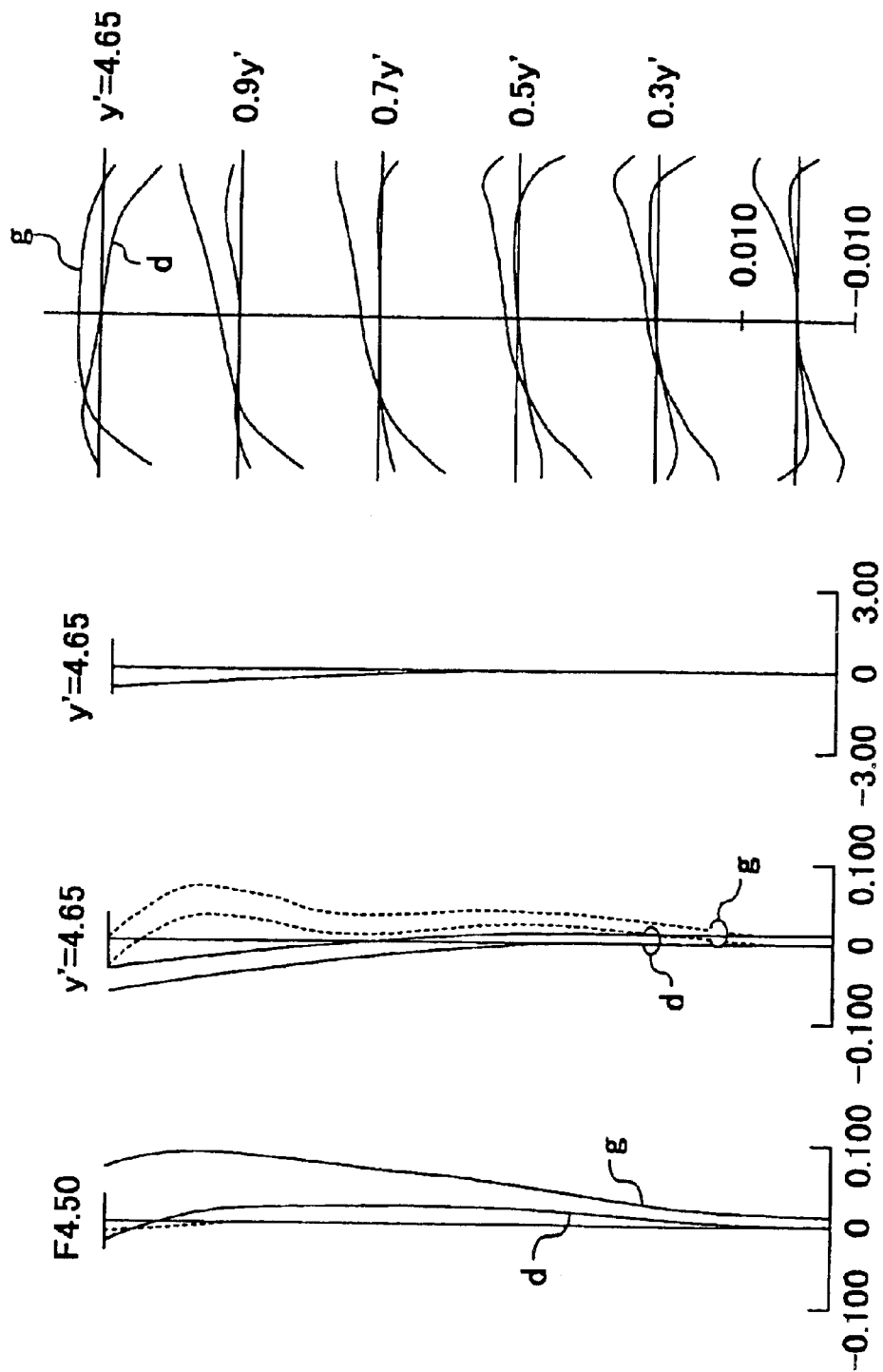
FIG. 56 is a view of the aberration curve at the end of the long focus of the zoom lens of EMBODIMENT 13.

FIGS. 54 to 56 show the aberration curve of the zoom lens of EMBODIMENT 13. FIG. 54 is the aberration curve at the end of the short focus of the zoom lens of EMBODIMENT 13, FIG. 55 is the aberration curve at the intermediate focal length, and FIG. 56 is the aberration curve at the end of the long focus respectively.

Figure 57:
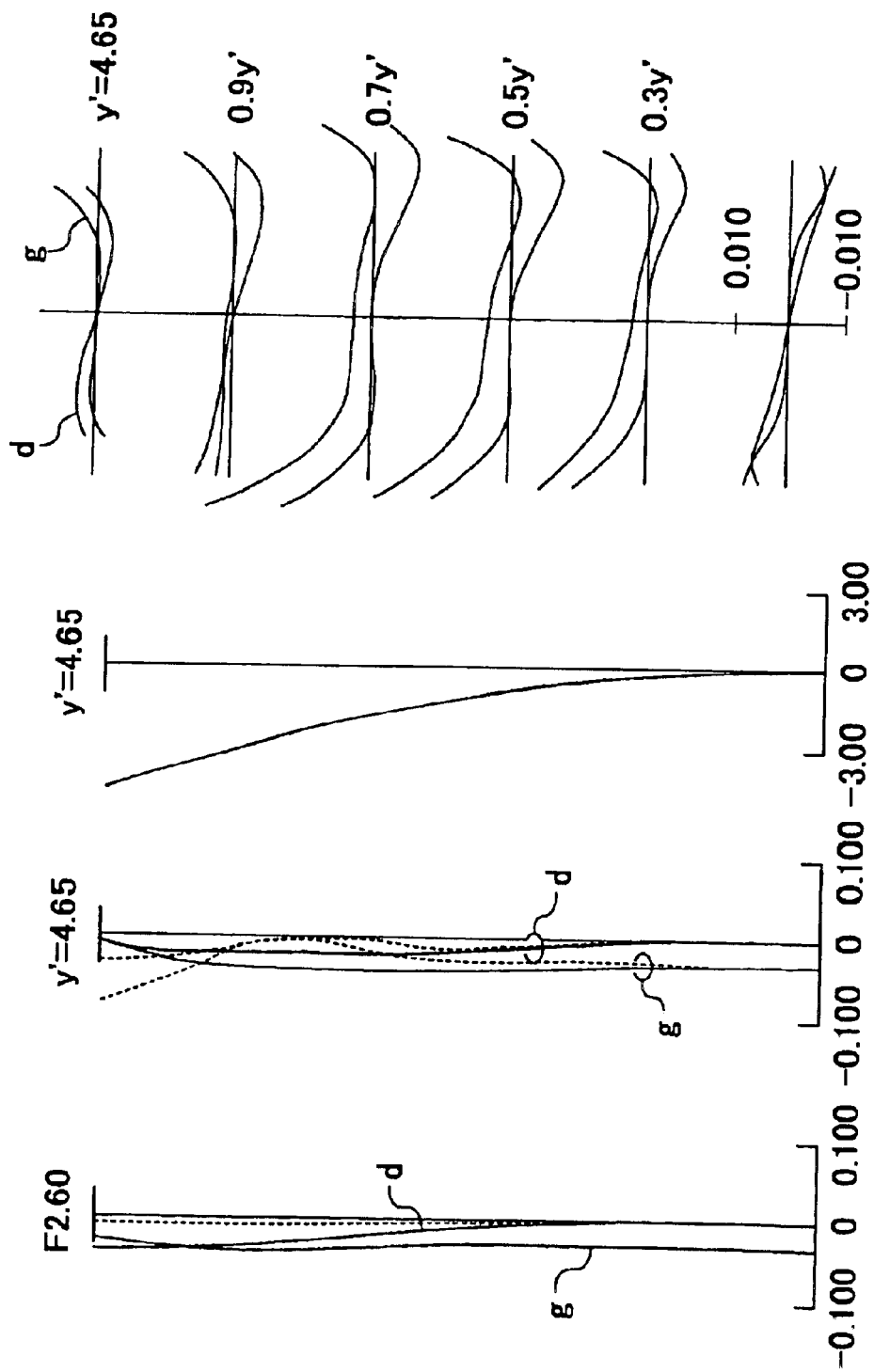
FIG. 57 is a view of an aberration curve at the end of the short focus of the zoom lens of EMBODIMENT 14.
Figure 58:
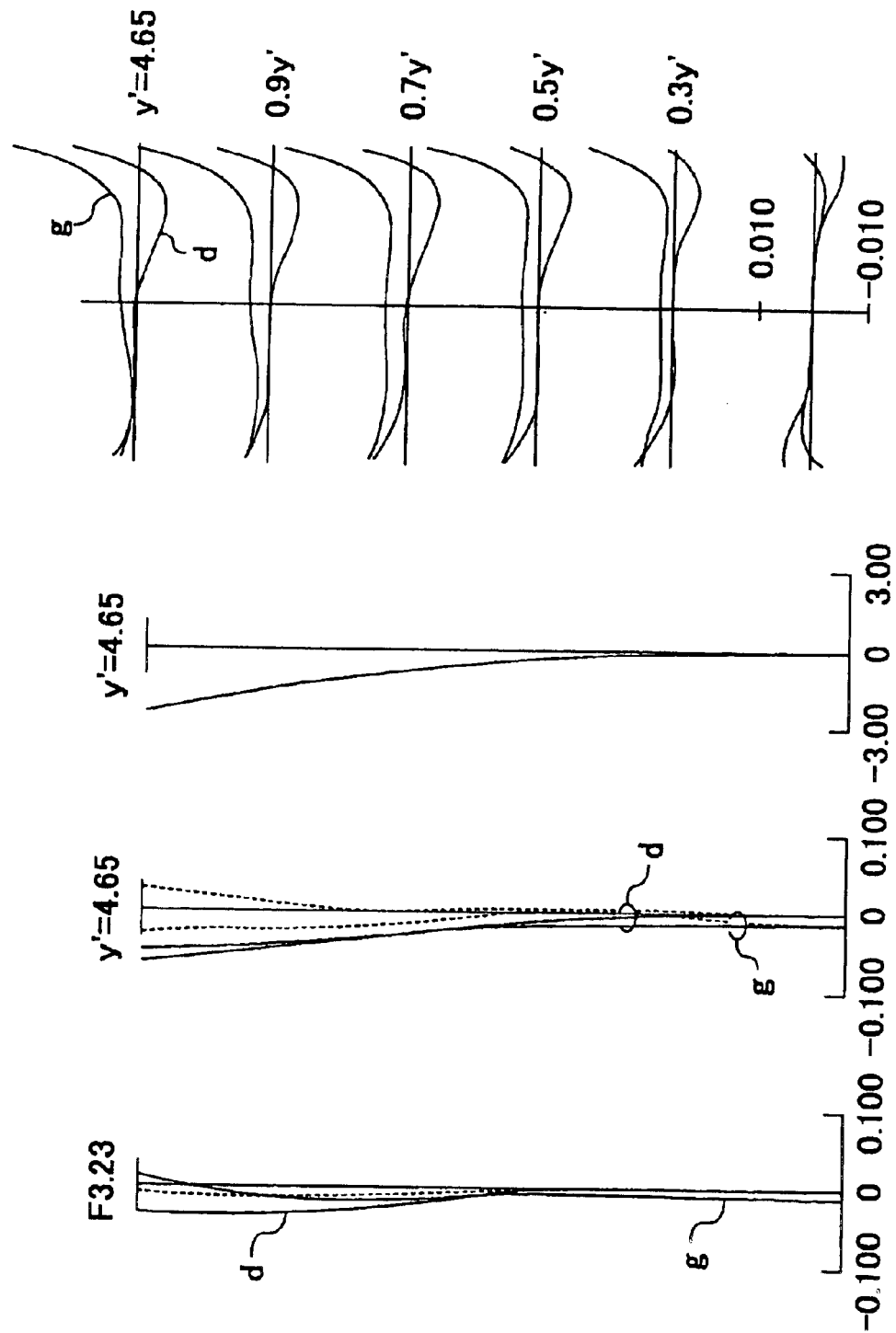
FIG. 58 is a view of the aberration curve at the intermediate focal length of the zoom lens of EMBODIMENT 14.
Figure 59:
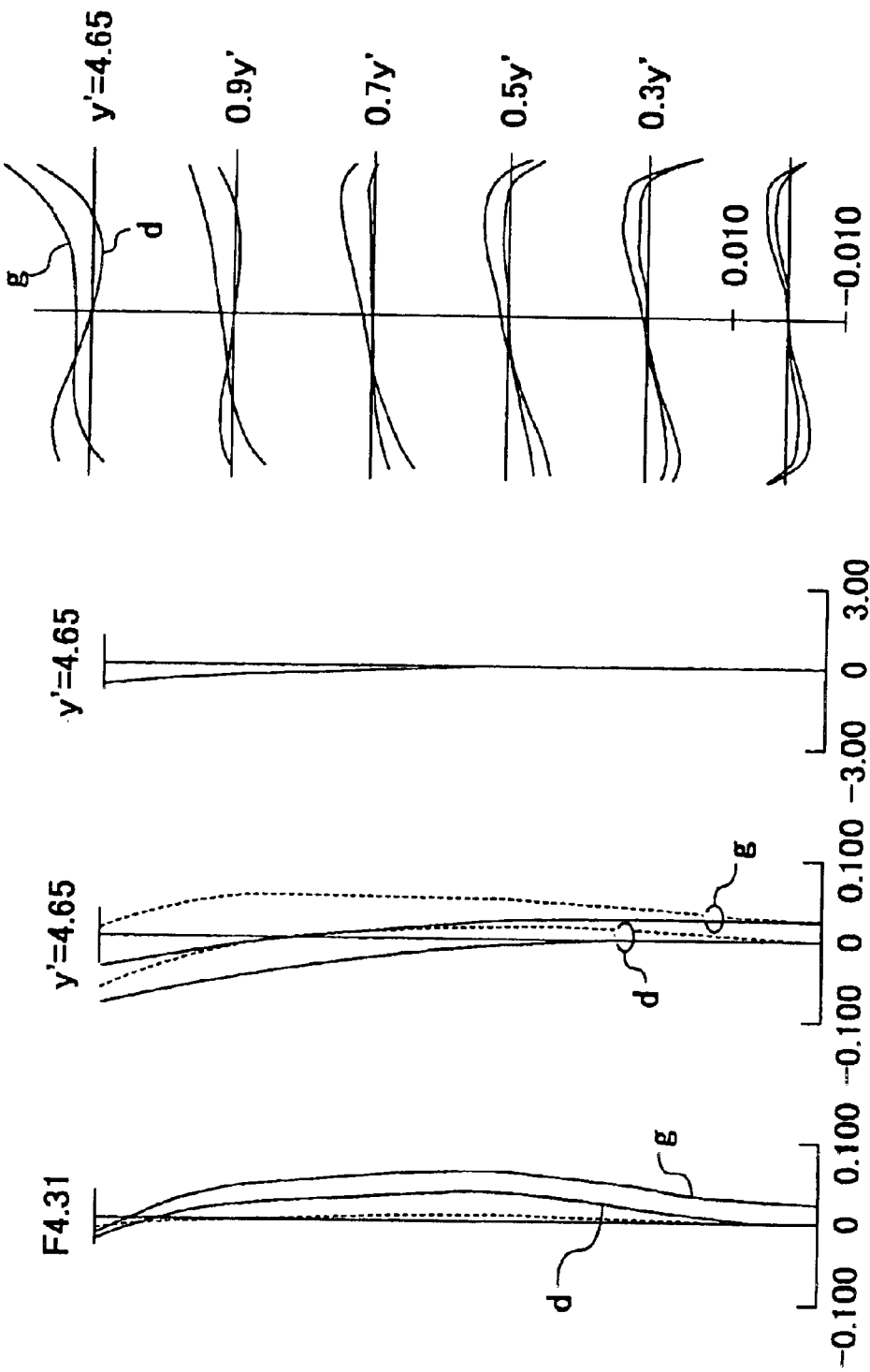
FIG. 59 is a view of the aberration curve at the end of the long focus of the zoom lens of EMBODIMENT 14.

FIGS. 57 to 59 show the aberration curve of the zoom lens of EMBODIMENT 14. FIG. 57 is the aberration curve at the end of the short focus of the zoom lens of EMBODIMENT 14, FIG. 58 is the aberration curve at the intermediate focal length, and FIG. 59 is the aberration curve at the end of the long focus respectively.

Figure 60:
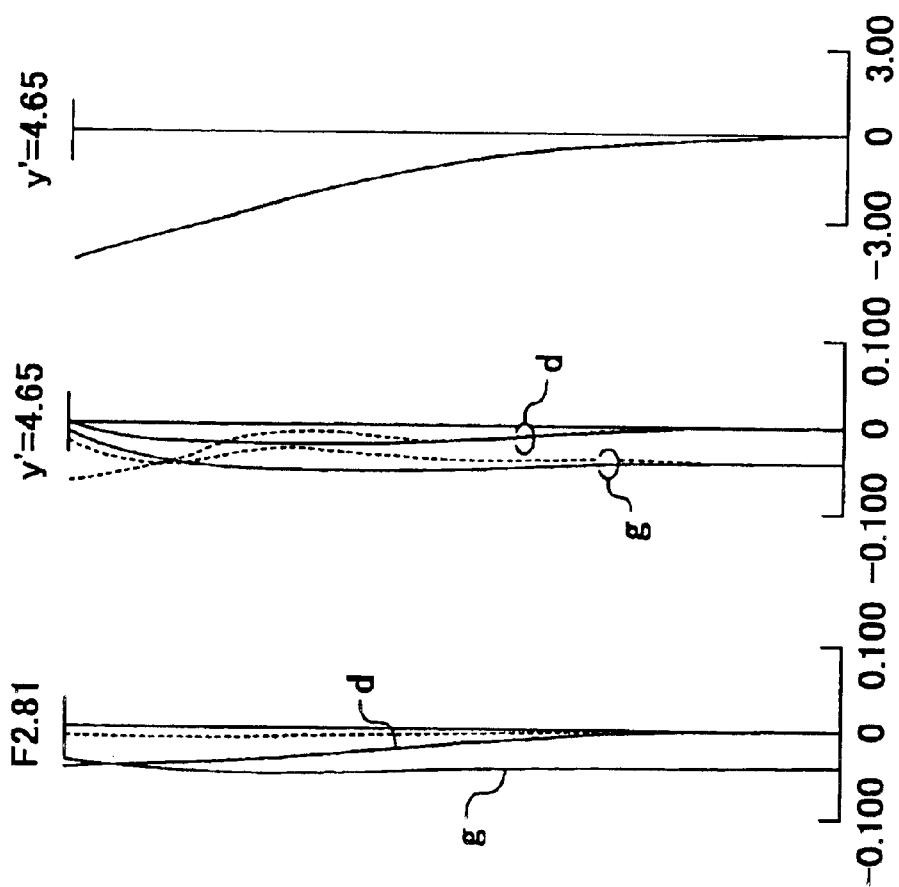
FIG. 60 is a view of an aberration curve at the end of the short focus of the zoom lens of EMBODIMENT 15.
Figure 61:
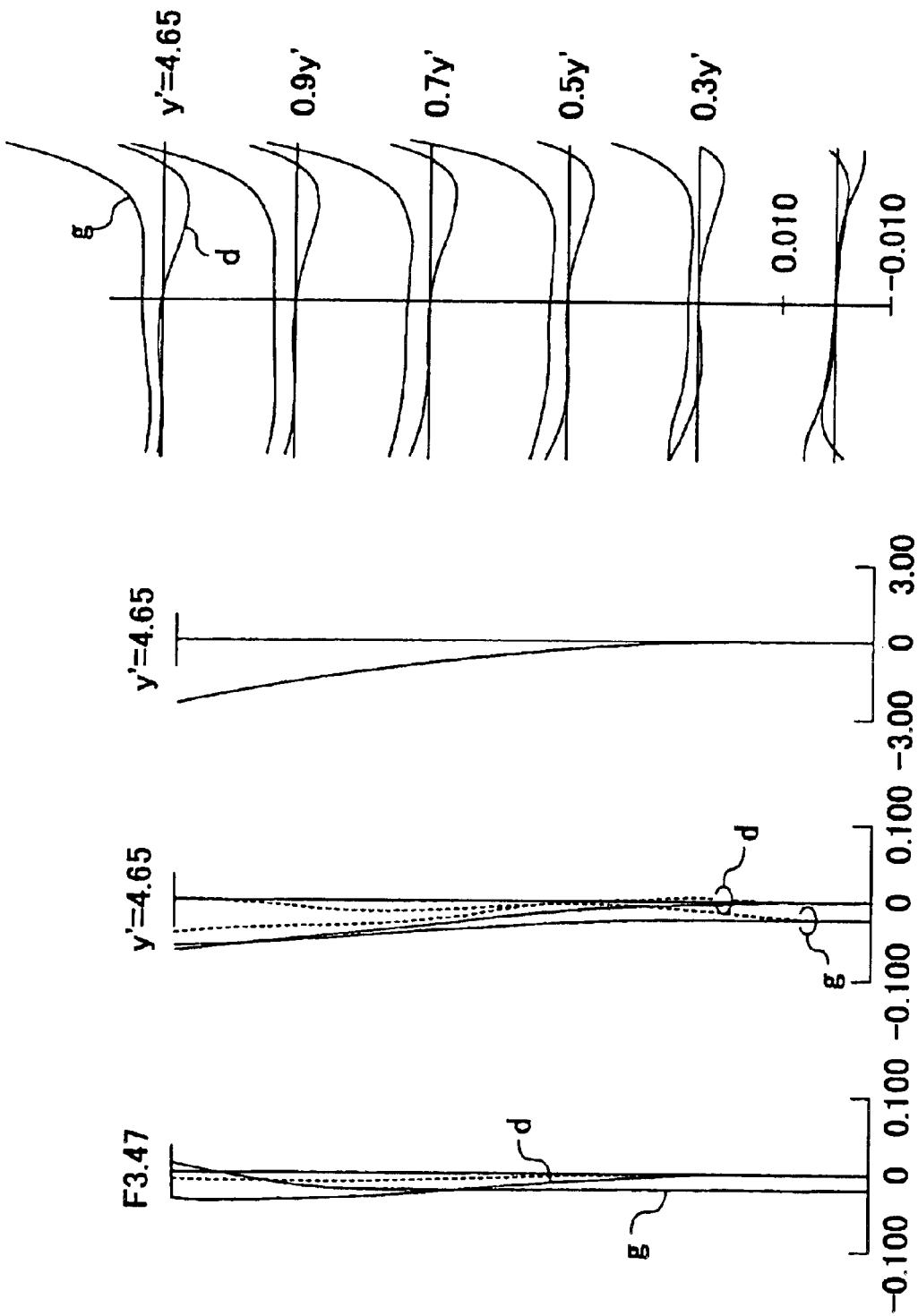
FIG. 61 is a view of the aberration curve at the intermediate focal distance of the zoom lens of EMBODIMENT 15.
Figure 62:
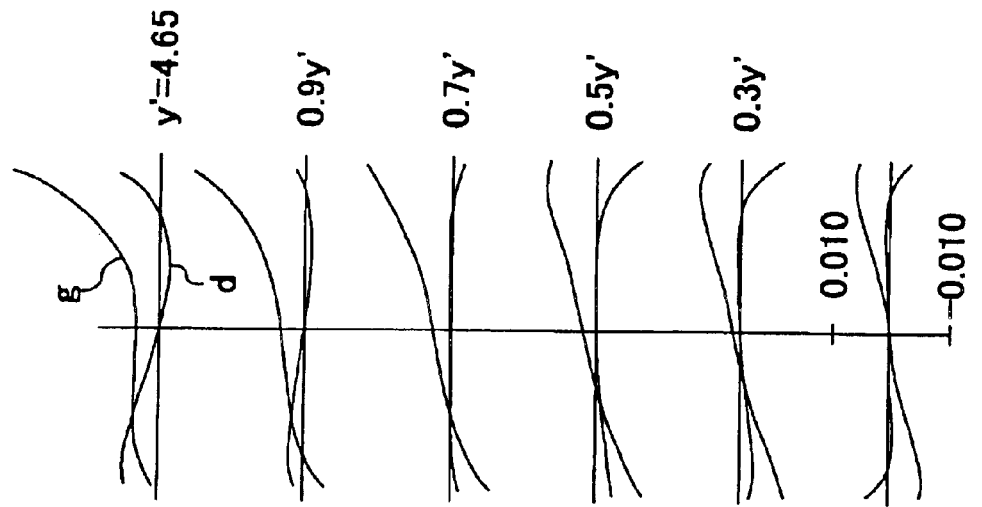
FIG. 62 is a view of the aberration curve at the end of the long focus of the zoom lens of EMBODIMENT 15.
Figure 62:
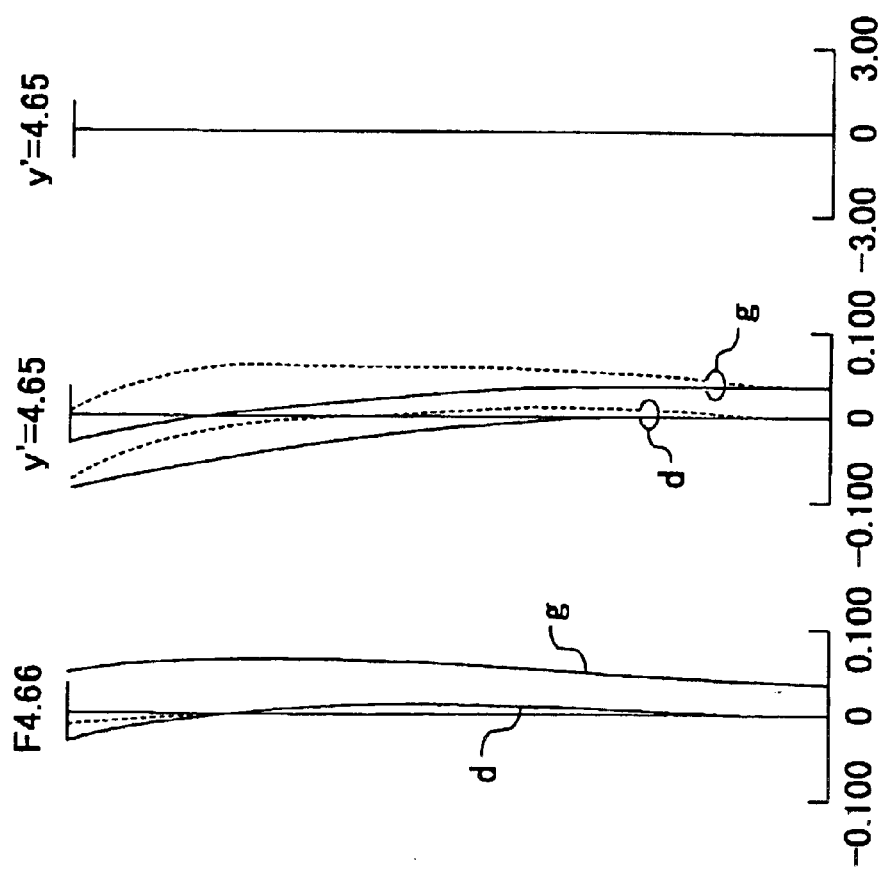

FIGS. 60 to 62 show the aberration curve of the zoom lens of EMBODIMENT 15. FIG. 60 is the aberration curve at the end of the short focus of the zoom lens of EMBODIMENT 15, FIG. 61 is the aberration curve at the intermediate focal length, and FIG. 62 is the aberration curve at the end of the long focus respectively.

In each view of the aberration, a broken line indicates "a sine condition" in the view of the spherical aberration. A solid line indicates sagittal and the broken line indicates meridional in the view of the aspheric aberration respectively.

Since the digital camera equipped with the zoom lens of the second mode has completely the same construction as the camera of the first mode, the description is omitted.

What is claimed is:

1. A zoom lens comprising: a first group of lenses having negative focal length, a second group of lenses having positive focal length, and a third group of lenses having the positive focal length in order from an object side, the second group of lenses moving monotonically from an image side to the object side and the first group of lenses moves so as to correct shift in a position of an image surface, which is attended with a change in magnification, when the magnification is changed from an end of short focus to the end of long focus, wherein the first group of lenses has at least two lenses and an air lens formed between the two lenses, both sides of the air lens are an aspheric surface, and the first group of lenses satisfies the following conditional expressions:

$no > 1.50$ and $ni > 1.60$ where no indicates a refractive index to d line of the lens arranged on the object side of the air lens and ni indicates a refractive index to the d line of the lens arranged on the image side of the air lens.

2. The zoom lens as claimed in claim 1, wherein the first group of lenses has at least one negative lens whose surface of a larger curvature faces the image side and at least one positive lens whose source of a larger curvature faces the object side in order from the object side, and both surfaces of the air lens formed between said negative lens and positive lens are the aspheric surface.

3. The zoom lens as claimed in claim 2, wherein the first group of lenses includes the negative lens whose surface of the larger curvature faces the image side and a positive meniscus lens whose convex surface faces the object side in order from the object side.

4. The zoom lens as claimed in claim 2, wherein the first group of lenses includes a negative meniscus lens whose convex surface faces the object side, a negative meniscus lens whose convex surface faces the object side, and the positive lens whose surface of the larger curvature faces the object side in order from the object side.

5. The zoom lens as claimed in claim 4, wherein the following conditional expression is satisfied:

$-20 < (Ro+Ri)/(Ro-Ri) < -3$, where Ro indicates a curvature radius of the surface of the object side and Ri indicates a curvature radius of the surface of the image side.

6. A zoom lens including a first group of lenses having negative focal length, a second group of lenses having positive focal length, and a third group of lenses having the positive focal length in order from an object side, the second group of lenses moving monotonically from an image side to the object side and the first group of lenses moves so as to correct shift in a position of an image surface, which is attended with a change in magnification, when the magnification is changed from an end of short focus to the end of long focus, wherein the second group of lenses includes a positive lens, a negative meniscus lens whose convex surface faces the object side, a positive meniscus lens whose convex surface faces the object side, and a positive lens in order from the object side.

7. The zoom lens as claimed in claim 6, the following conditional expressions is satisfied:

$$1.0 < (Rn+Rp)/2Y\max < 1.5$$

and $$-0.05 < (Rn-Rp)/(Rn+Rp) < 0,$$

where Rn indicates a curvature radius of an image side surface of the negative meniscus lens in the second group of lenses, Rp indicates a curvature radius of an object side surface of the positive meniscus lens in the second group of lenses, and Ymax indicates a maximum image height.

8. The zoom lens as claimed in claim 6, wherein at least the negative meniscus lens and positive meniscus lens in the second group of lenses are cemented.

9. The zoom lens as claimed in claim 8, the following conditional expression is satisfied:

$$0.8 < Rc/Y\max < 1.2,$$

where Rc indicates the curvature radius of a cemented surface and Ymax indicates a maximum image height.

10. The zoom lens as claimed in any one of claims 1 to 9, wherein it further comprises an iris which moves integrally with the second group of lenses on the object side of the second group of lenses, and at least a surface closest to the object side of the second group of lenses is formed to be an aspheric surface.

11. A camera having the zoom lens as claimed in any one of claims 1 to 9 for a photographing optical system.

12. A camera having the zoom lens as claimed in claim 10 for a photographing optical system.

13. A portable information terminal having the zoom lens as claimed in any one of claims 1 to 9 for a photographing optical system of a camera function portion.

14. A portable information terminal having the zoom lens as claimed in claim 10 for a photographing optical system of a camera function portion.

15. A zoom lens including a first group of lenses having negative focal length, a second group of lenses having positive focal length, a third group of lenses having the positive focal length in order from an object side, and an iris moving integrally with the second group of lenses toward the object side of the second group of lenses, in which the second group of lenses moves monotonically from an image side to the object side and the first group of lenses moves so as to correct shift in a position of an image surface, which is attended with a change in magnification, when the magnification is changed from an end of short focus to the end of long focus, wherein the second group of lenses has a three-element cemented lens including a negative lens, a positive lens, and a negative lens in order from the object side.

16. The zoom lens as claimed in claim 15, wherein the negative lens arranged on the most object side in the three element cemented lens of the second group of lenses has a meniscus shape whose concave surface faces the image side.

17. The zoom lens as claimed in claim 16, wherein a curvature radius of a cemented surface on the object side: Rc2 and a curvature radius of the surface on the most image side: Rc4 of the three-element cemented lens in the second group of lenses satisfy the following condition:

$$0.5 < (Rc2/Rc4) < 0.85. \quad (7)$$

18. The zoom lens as claimed in claim 17, wherein the second group has at least one positive lens on either the object side or the image side of the three-element cemented lens.

19. A camera having the zoom lens as claimed in claim 18 for a photographing optical system of a camera function portion.

20. The zoom lens as claimed in claim 16, wherein a curvature in a surface of the image side in the negative lens arranged on the most image side in the three-element cemented lens is larger than the curvature in a surface of the object side in the negative lens arranged on the most image side in the three-element cemented lens of the second group of lenses.

21. A camera having the zoom lens as claimed in claim 20 for a photographing optical system of a camera function portion.

22. The zoom lens as in claim 16, wherein the second group has at least one positive lens on either the object side or the image side of the three-element cemented lens.

23. The zoom lens as claimed in claim 22, wherein at least one of the positive lenses arranged on the object side and the image side of the three-element cemented lens has an aspheric surface.

24. A camera having the zoom lens as claimed in claim 23 for a photographing optical system of a camera function portion.

25. A camera having the zoom lens as claimed in claim 22 for a photographing optical system of a camera function portion.

26. A camera having the zoom lens as claimed in claim 17 for a photographing optical system of a camera function portion.

27. The zoom lens as claimed in claim 18, wherein at least one of the positive lenses arranged on the object side and the image side of the three-element cemented lens has an aspheric surface.

28. A camera having the zoom lens as claimed in claim 27 for a photographing optical system of a camera function portion.

29. The zoom lens as claimed in claim 15, wherein a curvature in a surface of the image side in the negative lens arranged on the most image side in the three-element cemented lens is larger than the curvature in a surface of the object side in the negative lens arranged on the most image side in the three-element cemented lens of the second group of lenses.

30. The zoom lens as claimed in claim 29, wherein a curvature radius of a cemented surface on the object side: Rc2 and a curvature radius of the surface on the most image side: Rc4 of the three-element cemented lens in the second group of lenses satisfy the following condition:

$$0.5 < (Rc2/Rc4) < 0.85. \quad (7)$$

31. The zoom lens as claimed in claim 30, wherein the second group has at least one positive lens on either the object side or the image side of the three-element cemented lens.

32. The zoom lens as claimed in claim 31, wherein at least one of the positive lenses arranged on the object side and the image side of the three-element cemented lens has tie an aspheric surface.

33. A camera having the zoom lens as claimed in claim 32 for a photographing optical system of a camera function portion.

34. The zoom lens as claimed in claim 29, wherein the second group has at least one positive lens on either the object side or the image side of the three-element cemented lens.

35. A camera having the zoom lens as claimed in claim 34 for a photographing optical system of a camera function portion.

36. The zoom lens as claimed in claim 34, wherein at least one of the positive lenses arranged on the object side and the image side of the three-element cemented lens has the an aspheric surface.

37. A camera having the zoom lens as claimed in claim 36 for a photographing optical system of a camera function portion.

38. A camera having the zoom lens as claimed in claim 29 for a photographing optical system of a camera function portion.

39. A camera having the zoom lens as claimed in claim 30 for a photographing optical system of a camera function portion.

40. A camera having the zoom lens as claimed in claim 31 for a photographing optical system of a camera function portion.

41. The zoom lens as claimed in claim 15, wherein a refractive index: $Nc2$ and Abbe number: $vc2$ of the positive lens arranged at the midpoint of the three-element cemented lens in the second group of lenses satisfy the following conditions:

$$1.45 < Nc2 < 1.52 \tag{1}$$

and $$68 < vc2 < 85. \tag{2}$$

42. The zoom lens as claimed in claim 41, wherein a curvature radius of a cemented surface on the object side: $Rc2$ and a curvature radius of the surface on the most image side: $Rc4$ of the three-element cemented lens in the second group of lenses satisfy the following condition:

$$0.5 < (Rc2/Rc4) < 0.85. \tag{7}$$

43. The zoom lens as claimed in claim 41, wherein the second group has at least one positive lens on either the object side or the image side of the three-element cemented lens.

44. A camera having the zoom lens as claimed in claim 41 for a photographing optical system of a camera function portion.

45. A camera having the zoom lams as claimed in claim 42 for a photographing optical system of a camera function portion.

46. A camera having the zoom lens as claimed in claim 43 for a photographing optical system of a camera function portion.

47. The zoom lens as claimed in claim 43, wherein at least one of the positive lenses arranged on the object side and the image side of the three-element cemented lens has an aspheric surface.

48. A camera having the zoom lens as claimed in claim 47 for a photographing optical system of a camera function portion.

49. The zoom lens as claimed in claim 41, wherein a refractive index: $Nc1$ and Abbe number: $vc1$ of the negative lens arranged on the most object side of the three-element cemented lens in the second group of lenses and a refractive index: $Nc3$ and Abbe number: $vc3$ of the negative lens arranged on the most image side of the three-element cemented lens in the second group of lenses satisfy the following conditions:

$$1.60 < Nc1 < 1.95, \tag{3}$$

$$20 < vc1 < 40, \tag{4}$$

$$1.60 < Nc3 < 1.95, \tag{5}$$

and $$20 < vc3 < 40. \tag{6}$$

50. The zoom lens as claimed in claim 49, wherein the refractive index: $Nc1$ and the Abbe number: $vc1$ of the negative lens arranged on the most object side of the three-element cemented lens in the second group of lenses satisfy the following conditions:

$$1.75 < Nc1 < 1.95 \tag{3-1}$$

and $$20 < vc1 < 35. \tag{4-1}$$

51. A camera having the zoom lens as claimed in claim 50 for a photographing optical system of a camera function portion.

52. The zoom lens as claimed in claim 49, wherein the refractive index: $Nc1$ and the Abbe numbers: $vc1$ of the negative lens arranged on the most object side of the three-element cemented lens in the second group of lenses satisfy the follow conditions:

$$1.75 < Nc1 < 1.95 \tag{3-1}$$

and $$35 < vc1 < 40. \tag{4-2}$$

53. A camera having the zoom lens as claimed in claim 52 for a photographing optical system of a camera function portion.

54. The zoom lens as claimed in claim 49, wherein the refractive index: $Nc1$ and the Abbe number: $vc1$ of the negative lens arranged on the most object side of the three-element cemented lens in the second group of lenses satisfy the following conditions:

$$1.60 < Nc1.1 \leq 1.75 \tag{3-2}$$

and $$20 < vc1 < 35. \tag{4-1}$$

55. A camera having the zoom lens as claimed in claim 54 for a photographing optical system of a camera function portion.

56. The zoom lens as claimed in claim 20, wherein a curvature radius of a cemented surface on the object side: $Rc2$ and a curvature radius of the surface on the most image side: $Rc4$ of the three-element cemented lens in the second group of lenses satisfy the following condition:

$$0.5 < (Rc2/Rc4) < 0.85. \tag{7}$$

57. A camera having the zoom lens as claimed in claim 56 for a photographing optical system of a camera function portion.

58. The zoom lens as claimed in claim 49, wherein the second group has at least one positive lens on either the object side or the image side of the three-element cemented lens.

59. The zoom lens as claimed in claim 58, wherein at least one of the positive lenses arranged on the object side and the image side of the three-element cemented lens has an aspheric surface.

60. A camera having the zoom lens as claimed in claim 59 for a photographing optical system of a camera function portion.

61. A camera having the zoom lens as claimed in claim 58 for optical system of a camera function portion.

62. A camera having the zoom lens as claimed in claim 49 for a photographing optical system of a camera function portion.

63. The zoom lens as claimed in claim 15, wherein a curvature radius of a cemented surface on the object side: Rc2 and a curvature radius of the surface on the most image side: Rc4 of the three-element cemented lens in the second group of lenses satisfy the following condition:

$$0.5 < (Rc2/Rc4) < 0.85. \qquad (7)$$

64. The zoom lens as claimed in claim 63, wherein the second group has at least one positive lens on either the object side or the image side of the three-element cemented lens.

65. A camera having the zoom lens as claimed in claim 63 for a photographing optical system of a camera function portion.

66. The zoom lens as claimed in claim 64, wherein at least one of the positive lenses arranged on the object side and the image side of the three-element cemented lens has an aspheric surface.

67. A camera having the zoom lens as claimed in claim 64 for a photographing optical system of a camera function portion.

68. A camera having the zoom lens as claimed in claim 66 for a photographing optical system of a camera function portion.

69. The zoom lens as in claim 15, wherein the second group has at least one positive lens on either the object side or the image side of the three-element cemented lens.

70. The zoom lens as claimed in claim 69, wherein at least one of the positive lenses arranged on the object side and the image aide of the three-element cemented lens has the an aspheric surface.

71. The zoom lens as claimed in claim 70, wherein the first group has two negative lenses and one positive lens in order from the object side.

72. A camera braving the zoom lens as claimed in claim 71 for a photographing optical system of a camera function portion.

73. The zoom lens as claimed in claim 69, wherein the first group has two negative lenses and one positive lens in order from the object side.

74. A camera having the zoom lens as claimed in claim 69 for the taking a photographing optical system of a camera function portion.

75. A camera having the zoom lens as claimed in claim 73 for a photographing optical system of a camera function portion.

76. A camera having the zoom lens as claimed in claim 15 for a photographing optical system of a camera function portion.

77. A camera having the zoom lens as claimed in claim 16 for a photographing optical system of a camera function portion.

78. A camera having the zoom lens as claimed in claim 70 for a photographing optical system of a camera function portion.

* * * * *